(12) United States Patent
Hioki et al.

(10) Patent No.: US 6,794,122 B2
(45) Date of Patent: Sep. 21, 2004

(54) SILVER HALIDE PHOTOGRAPHIC MATERIAL

(75) Inventors: Takanori Hioki, Kanagawa (JP); Tetsuo Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 39 days.

(21) Appl. No.: 10/309,004

(22) Filed: Dec. 4, 2002

(65) Prior Publication Data

US 2003/0190564 A1 Oct. 9, 2003

(30) Foreign Application Priority Data

Dec. 6, 2001 (JP) .................................... P2001-372657

(51) Int. Cl.$^7$ .................. G03C 1/005; G03C 1/494
(52) U.S. Cl. .................. 430/574; 430/576; 430/577; 430/581; 430/583; 430/584; 430/588; 430/567; 430/599; 430/603
(58) Field of Search .................. 430/574, 576–577, 430/581, 583–584, 588, 567, 599, 603

(56) References Cited

U.S. PATENT DOCUMENTS

| | | | |
|---|---|---|---|
| 6,458,524 B1 | 10/2002 | Nakamura et al. | |
| 6,566,044 B2 * | 5/2003 | Ohzeki et al. | 430/577 |
| 6,649,336 B2 * | 11/2003 | Ohzeki et al. | 430/584 |
| 2002/0058216 A1 * | 5/2002 | Nakamura et al. | 430/584 |
| 2002/0110764 A1 | 8/2002 | Ohzeki et al. | |
| 2002/0168599 A1 * | 11/2002 | Nakamura et al. | 430/574 |

* cited by examiner

*Primary Examiner*—Geraldine Letscher
(74) *Attorney, Agent, or Firm*—Sughrue Mion, PLLC

(57) ABSTRACT

A silver halide photographic material comprising a support having thereon at least one silver halide photographic emulsion layer, wherein the emulsion layer contains at least one compound of formulae (Ia), (Ib) and (Ic) and at least one compound of formula (II):

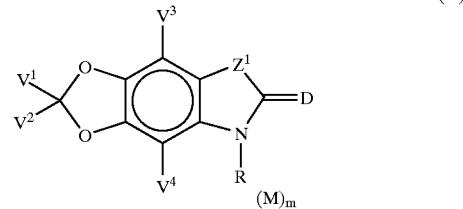

(Ia)

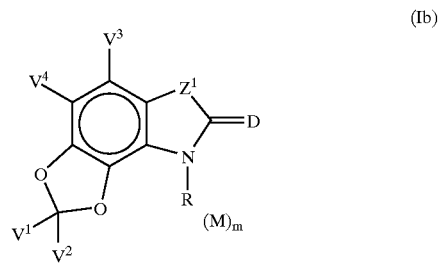

(Ib)

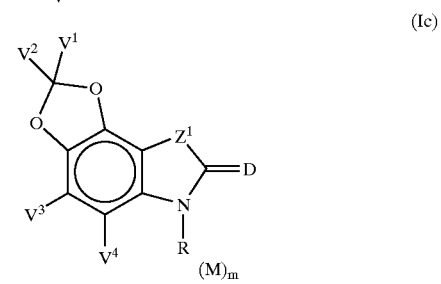

(Ic)

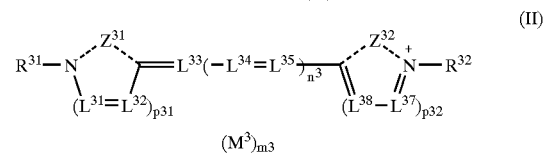

(II)

wherein $Z^1$ represents S, O, Se, Te, N or C; R, $R^{31}$ and $R^{32}$ each are an alkyl, aryl or heterocyclic group; D is a group necessary for forming a methine dye; $V^1$ to $V^4$ represent H or a monovalent substituent; M and $M^3$ each are a charge-balancing counter ion; m and $m^3$ each are a number or 0 or more necessary for neutralizing the charge of the molecule; $Z^{31}$ and $Z^{32}$ each are an atomic group necessary for forming the nitrogen-containing hetero-ring; $L^{31}$ to $L^{37}$ each represent a methine group; $p^{31}$ and $p^{32}$ each are 0 or 1; $n^3$ is 0, 1, 2, 3 or 4, but the compound of formula (II) does not include the compounds of formulae (Ia), (Ib) and (Ic).

14 Claims, No Drawings

SILVER HALIDE PHOTOGRAPHIC MATERIAL

FILED OF THE INVENTION

The present invention relates to a silver halide photographic emulsion and to a silver halide photographic material that contains the emulsion. More precisely, the invention relates to a silver halide photographic emulsion of good dissolution-storage stability, and to a silver halide photographic material that contains the emulsion, having the advantages that its sensitivity is high, its graininess is good, it is free from residual color even when processed rapidly, and its storage stability is good.

BACKGROUND OF THE INVENTION

It is known that sensitizing dyes for spectral sensitization of silver halide photographic materials have significant influences on the properties of the materials containing them. For example, some mere difference in the structure of sensitizing dyes may have significant influences on the photographic properties such as sensitivity, fog, storage stability, residual color after processed and graininess of photographic materials that contain any of such sensitizing dyes. Combining at least two different types of sensitizing dyes to be in photographic materials also has significant influences on the photographic properties of the materials. However, it is difficult to forecast the results of the sensitizing dyes used in photographic materials. Heretofore, accordingly, many scholars have produced many different types of sensitizing dyes and have tried many their combinations for investigating their influences on the photographic properties of photosensitive materials that contain any of them or their combinations. At present, however, it is still impossible to accurately forecast the influences of different types of sensitizing dyes on the photographic properties of photosensitive materials that contain any of them.

The recent tendency in the art is toward photographic materials of high sensitivity capable of forming high-quality images, while, on the other hand, it is much desired to rapidly process photographic materials and to reduce processing wastes so as not to cause environmental pollution. In particular, a technique of spectral sensitization of silver halide grains in photographic materials is being more and more important for making them have an increased sensitivity with no defects of fog and residual color in the processed photographic materials.

Tabular photographic grains are preferred for spectral sensitization, since they have a large surface area (specific surface area) relative to their volume and can therefore adsorb a larger amount of sensitizing dye molecules. Therefore, tabular grains are effective for improving the ratio of sensitivity/graininess of photographic materials containing them. After processed, however, color-sensitized tabular grains leave much residual color in the processed materials, and the problem of residual color from color-sensitized tabular grains is more serious than that from color-sensitized regular grains.

On the other hand, it is desired to shorten the time for processing photographic materials. However, when color-sensitized photographic materials are processed rapidly within a short period of time, then the amount of the sensitizing dye that remains in the processed emulsion increases and the problem of residual color in the rapidly processed photographic materials is more serious. Accordingly, a technique of reducing residual color in processed photographic materials is much desired in the art of photography.

Regarding the means of solving the problem of residual color in processed photographic materials, it is known that sensitizing dyes of increased hydrophilicity are effective for solving the problem. In general, however, sensitizing dyes of higher hydrophilicity are more poorly adsorbed by silver halide grains, and their negative influences on the photographic properties of the silver halide grains that have poorly adsorbed them are inevitable in that the sensitivity of the silver halide grains could not be increased so much. Accordingly, the ability of such sensitizing dyes of increased hydrophilicity to solve the problem of residual color in processed photographic materials is limited.

On the other hand, when a large amount of sensitizing dye is added to tabular silver halide grains, the grains adsorb many dye molecules and the dye molecules cover the grains to a great extent. Thus much covering the tabular grains, the sensitizing dye molecules detract from the protective colloidal property of gelatin around the tabular grains. Of the tabular grains, in particular, those having a higher aspect ratio readily contact with each other at their main face to aggregate into large aggregates. Accordingly, it has been clarified that, while the emulsion is dissolved in time, there occur various side effects of fog increase, sensitivity reduction and graininess reduction. To solve the problem, for example, there is known a method of adding an emulsion of substantially insoluble fine silver iodobromide grains to the tabular silver halide grain. emulsion while or after the tabular silver halide grain emulsion is chemically sensitized; as in JP-A 6-332091 (The term "JP-A" as used herein means an unexamined published Japanese Patent Application"). However, this method is not always applicable to any and every emulsion. For example, it could not be applied to a silver chloride-rich emulsion (i.e., a high silver chloride emulsion). Therefore, any other method substitutable for it is desired.

SUMMARY OF THE INVENTION

The object of the present invention is to provide a silver halide photographic emulsion of good dissolution-storage stability, and to provide a silver halide photographic material that contains the emulsion, having the advantages that its sensitivity is high, its graininess is good, it is free from residual color even when processed rapidly, and its shelf life is good.

Having assiduously studied, the present inventors have found that the object matter of the present invention can be attained by the following:

(1) A silver halide photographic material comprising a support having thereon at least one silver halide photographic emulsion layer, wherein the emulsion layer contains at least one compound selected from the group consisting of compounds represented by formulae (Ia), (Ib) and (Ic) and at least one compound represented by formula (II):

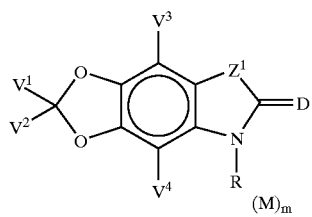
(Ia)

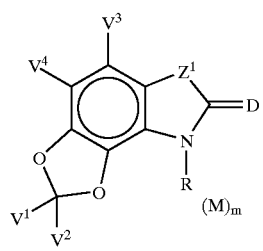
(Ib)

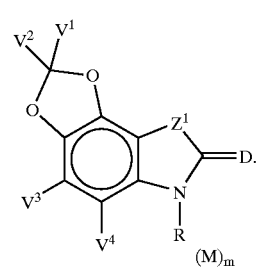
(Ic)

In formulae (Ia) (Ib) and (Ic), $Z^1$ represents a sulfur, oxygen, selenium, tellurium, nitrogen or carbon atom; R represents an optionally-substituted alkyl, aryl or heterocyclic group; D represents a group necessary for forming the methine dye; $V^1$, $V^2$, $V^3$ and $V^4$ each represent a hydrogen atom or a monovalent substituent; M represents a charge-balancing counter ion; and m indicates a number of 0 or more necessary for neutralizing the charge of the molecule.

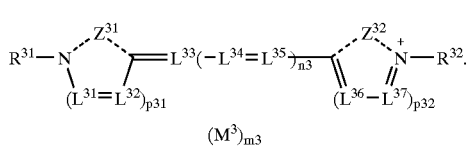
(II)

In formula (II), $Z^{31}$ and $Z^{32}$ each represent an atomic group necessary for forming the nitrogen-containing hetero-ring that may be optionally condensed with any other ring and may be optionally substituted; $R^{31}$ and $R^{32}$ each represent an alkyl, aryl or heterocyclic group; $L^{31}$, $L^{32}$, $L^{33}$, $L^{34}$, $L^{35}$, $L^{36}$ and $L^{37}$ each represent a methine group; $p^{31}$ and $p^{32}$ each indicate 0 or 1; $n^3$ indicates 0, 1, 2, 3 or 4; $M^3$ represents a charge-balancing counter ion; $m^3$ indicates a number of 0 or more necessary for neutralizing the charge of the molecule; but the compound of formula (II) does not include the compounds of formulae (Ia), (Ib) and (Ic).

(2) The silver halide photographic material of above (1), wherein D in formulae (Ia), (Ib) and (Ic) is a group necessary for forming a merocyanine dye or a cyanine dye.

(3) The silver halide photographic material of above (1), wherein D in formulae (Ia), (Ib) and (Ic) is a group necessary for forming a cyanine dye.

(4) The silver halide photographic material of any of above (1) to (3), wherein D in formulae (Ia), (Ib) and (Ic) is $D^1$ represented by the following formula:

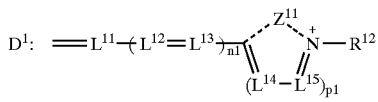

In $D^1$, $R^{12}$ represents an alkyl, aryl or heterocyclic group; $z^{11}$ represents an atomic group necessary for forming the nitrogen-containing hetero-ring that may be optionally condensed with any other ring and may be optionally substituted; $L^{11}$, $L^{12}$, $L^{13}$, $L^{14}$ and $L^{15}$ each represent a methine group; $p^1$ indicates 0 or 1; and n' indicates 0, 1, 2, 3 or 4.

(5) The silver halide photographic material of any of above (1) to (3), wherein D in formulae (Ia), (Ib) and (Ic) is $D^2$ represented by the following formula:

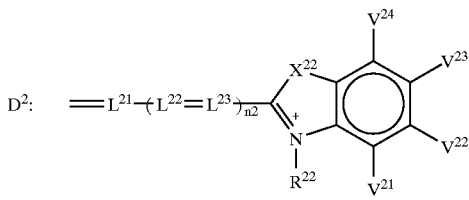

In $D^2$, $R^{22}$ represents an alkyl, aryl or heterocyclic group; $X^{22}$ represents a sulfur, oxygen, selenium, tellurium, nitrogen or carbon atom; $V^{21}$, $V^{22}$, $V^{23}$ and $V^{24}$ each represent a hydrogen atom or a substituent, provided that the two adjacent substituents do not bond to each other to form a saturated or unsaturated condensed ring; $L^{21}$, $L^{22}$ and $L^{23}$ each represent a methine group; and $n^2$ indicates 0, 1, 2, 3 or 4.

(6) The silver halide photographic material of any of above (1) to (5), wherein R in formulae (Ia), (Ib) and (Ic) is an alkyl group substituted with an acid group.

(7) The silver halide photographic material of any of above (1) to (6), wherein the emulsion layer contains at least one compound of formula (Ia) or (Ib) and at least one compound of formula (II).

(8) The silver halide photographic material of any of above (1) to (7), wherein $V^1$, $V^2$, $V^3$ and $V^4$ in formulae (Ia), (Ib) and (Ic) are all hydrogen atoms.

(9) The silver halide photographic material of any of above (1) to (8), wherein the compounds of formula (II) are selected from the group consisting of compounds represented by formula (IIa):

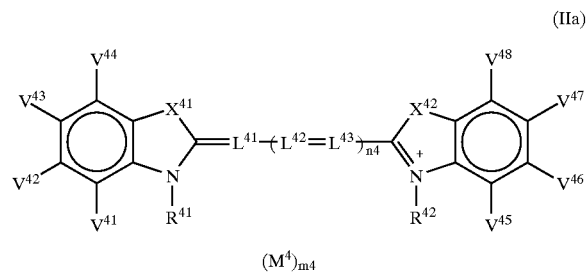
(IIa)

In formula (IIa), $X^{41}$ and $X^{42}$ each represent a sulfur, oxygen, selenium, tellurium, nitrogen or carbon atom; $V^{41}$, $V^{42}$, $V^{43}$, $V^{44}$, $V^{45}$, $V^{46}$, $V^{47}$ and $V^{48}$ each represent a hydrogen atom or a substituent, provided that the two adjacent substituents may bond to each other to form a saturated or unsaturated condensed ring; $R^{41}$ and $R^{42}$ each represent an alkyl, aryl or heterocyclic group; $L^{41}$, $L^{42}$ and $L^{43}$ each represent a methine group; $n^4$ indicates 0, 1, 2, 3 or 4; $M^4$ represents a counter ion; and $m^4$ indicates a number of 0 or more necessary for neutralizing the charge of the molecule.

(10) The silver halide photographic material of any of above (1) to (8), wherein the compounds of formula (II) are selected from the group consisting of compounds represented by formula (III) and (IV):

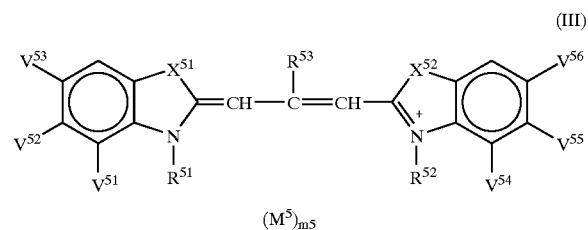

(III)

In formula (III), $X^{51}$ and $X^{52}$ each represent an oxygen or sulfur atom; $V^{51}$, $V^{52}$, $V^{53}$, $V^{54}$, $V^{55}$ and $V^{56}$ each represent a hydrogen atom or a substituent, provided that the two adjacent substituents do not bond to each other to form a saturated or unsaturated condensed ring; $R^{51}$, $R^{52}$ and $R^{53}$ each represent an alkyl, aryl or heterocyclic group; $M^5$ represents a counter ion; and $m^5$ indicates a number of 0 or more necessary for neutralizing the charge of the molecule.

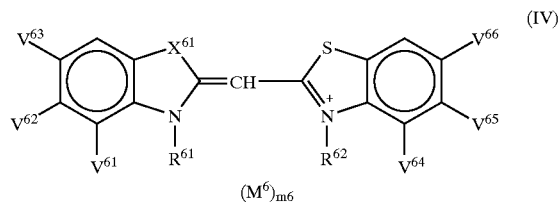

(IV)

In formula (IV), $X^{61}$ represents an oxygen or sulfur atom: $V^{61}$, $V^{63}$, $V^{64}$, $V^{65}$ and $V^{66}$ each represent a hydrogen atom or a substituent, provided that the two adjacent substituents do not bond to each other to form a saturated or unsaturated condensed ring; $R^{61}$ and $R^{62}$ each represent an alkyl, aryl or heterocyclic group; $M^6$ represents a counter ion; and $m^6$ indicates a number of 0 or more necessary for neutralizing the charge of the molecule.

(11) The silver halide photographic material of any of above (1) to (10), wherein tabular grains having an aspect ratio of at least 2 account for at least 50% of the overall projected area of all the silver halide grains in the emulsion.

(12) The silver halide photographic material of any of above (1) to (11), wherein the emulsion for the emulsion layer is sensitized with selenium.

(13) The silver halide photographic material of any of above (1) to (12), wherein silver chloride accounts for at least 95 mol % of the emulsion for the emulsion layer.

(14) The silver halide photographic material of any of above (1) to (12), wherein silver bromide accounts for at least 95 mol % of the emulsion for the emulsion layer.

DETAILED DESCRIPTION OF THE INVENTION

The present invention is described in detail hereinunder.

The "group" referred to herein means a specific part of a compound, and it may be or may not be substituted by itself with at least one (and up to a possible largest number) of substituents. For example, the "alkyl group" means a substituted or unsubstituted alkyl group. The substituent that may be in the compound in the present invention may be of any and every possible one, and may be or may not be further substituted with any other substituent.

The substituent will be represented by V. The substituent for V may be any and every one, not specifically defined. Example thereof includes a halogen atom, an alkyl group [including a cycloalkyl group, a bicycloalkyl group and a tricycloalkyl group, further including an alkenyl group (naturally including a cycloalkenyl group and a bicycloalkenyl group) and an alkynyl group], an aryl group, a heterocyclic group, a cyano group, a hydroxyl group, a nitro group, a carboxyl group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic-azo group, an imido group, a phosphino group, a phosphinyl group, a phosphinyloxy group, aphosphinylamino group, aphosphono group, a silyl group, ahydrazino group, anureido group, aboronic acid group (—B(OH)$_2$), a phosphato group (—OPO(OH)$_2$), a sulfato group (—OSO$_3$H), and other known substituents.

More precisely, V includes a halogen atom (e.g., fluorine, chlorine, bromine and iodine atoms), an alkyl group [it is a linear, branched or cyclic, substituted or unsubstituted alkyl group, and includes, for example, an alkyl group (preferably an alkyl group having from 1 to 30 carbon atoms, such as methyl, ethyl, n-propyl, isopropyl, t-butyl, n-octyl, eicosyl, 2-chloroethyl, 2-cyanoethyl and 2-ethylhexyl), a cycloalkyl group (preferably a substituted or unsubstituted cycloalkyl group having from 3 to 30 carbon atoms, e.g., cyclohexyl, cyclopentyl, 4-n-dodecylcyclohexyl), a bicycloalkyl group (preferably a substituted or unsubstituted bicycloalkyl group having from 5 to 30 carbon atoms, or that is, a monovalent group derived from a bicycloalkane having from 5 to 30 carbon atoms by removing one hydrogen atom from it; for example, this includes bicyclo[1,2,2]heptan-2-yl, bicyclo[2,2,2]octan-3-yl, and others having a tricyclo or more multi-cyclo structure—the alkyl group in the substituents mentioned below (for example, the alkyl moiety of alkylthio group) shall indicate the alkyl group of that conception, but shall further include an alkenyl group and an alkynyl group], an alkenyl group [this indicates a linear, branched or cyclic, substituted or unsubstituted alkenyl group, and includes an alkenyl group (preferably a substituted or unsubstituted alkenyl group having from 2 to 30 carbon atoms, e.g., vinyl, allyl, prenyl, geranyl, oleyl), acycloalkenyl group (preferably a substituted or unsubstituted cycloalkenyl group having from 3 to 30 carbon atoms, or that is, a monovalent group derived from a cycloalkene having from 3 to 30 carbon atoms by removing one hydrogen atom from it—for example, 2-cyclopenten-1-yl, 2-cyclohexen-1-yl), a bicycloalkenyl group (a substituted or unsubstituted bicycloalkenyl group, preferably a substituted or unsubstituted bicycloalkenyl group having from 5 to 30 carbon atoms, or that is, a monovalent group derived from a bicycloalkene having at least one double bond by removing one hydrogen atom from it—for example, bicyclo[2,2,1]hept-2-en-1-yl, bicyclo[2,2,2]oct-2-en-4-yl)], an alkynyl group (preferably a substituted or unsubstituted alkynyl group having from 2 to 30 carbon atoms, e.g., ethynyl, propargyl, trimethylsilylethynyl), an aryl group (preferably a substituted or unsubstituted aryl group having from 6 to 30 carbon atoms, e.g., phenyl, p-tolyl, naphthyl, m-chlorophenyl, o-hexadecanoylaminophenyl), a heterocyclic group (preferably a monovalent group derived from a 5-membered or 6-membered, substituted or unsubstituted, aromatic or non-aromatic heterocyclic compound by removing one hydrogen atom from it, more preferably a 5-membered or 6-membered aromatic heterocyclic group having from 3 to 30 carbon atoms, e.g., 2-furyl, 2-thienyl, 2-pyrimidinyl, 2-benzothiazolyl, as well as other cationic heterocyclic groups such as 1-methyl-2-pyridinio and 1-methyl-2-quinolinio groups), a cyano group, a hydroxyl group, a nitro group, a carboxyl group, an alkoxy group (preferably a substituted or unsubstituted alkoxy group having from 1 to 30 carbon atoms, e.g., methoxy, ethoxy, isopropoxy, t-butoxy, n-octyloxy, 2-methoxyethoxy), an aryloxy group (preferably a substituted or unsubstituted aryloxy group having from 6 to 30 carbon atoms, e.g., phenoxy, 2-methylphenoxy, 4-t-butylphenoxy, 3-nitrophenoxy, 2-tetradecanoylaminophenoxy), a silyloxy group (preferably a silyloxy group having from 3 to 20 carbon atoms, e.g., trimethylsilyloxy, t-butyldimethylsilyloxy), a heterocyclic-oxy group (preferably a substituted or unsubstituted heterocyclic-oxy group having from 2 to 30 carbon atoms, e.g., 1-phenyltetrazol-5-oxy, 2-tetrahydropyranyloxy), an acyloxy group (preferably a formyloxy group, a substituted or unsubstituted alkylcarbonyloxy group having from 2 to 30 carbon atoms, a substituted or unsubstituted arylcarbonyloxy group having from 6 to 30 carbon atoms, e.g., formyloxy, acetyloxy, pivaloyloxy, stearoyloxy, benzoyloxy, p-methoxyphenylcarbonyloxy), a carbamoyloxy group (preferably a substituted or unsubstituted carbamoyloxy group having from 1 to 30 carbon atoms, e.g., N,N-dimethylcarbamoyloxy, N,N-diethylcarbamoyloxy, morpholinocarbonyloxy, N,N-di-n-octylaminocarbonyloxy, N-n-octylcarbamoyloxy), an alkoxycarbonyloxy group (preferably a substituted or unsubstituted alkoxycarbonyloxy group having from 2 to 30 carbon atoms, e.g., methoxycarbonyloxy, ethoxycarbonyloxy, t-butoxycarbonyloxy, n-octyloxycarbonyloxy), an aryloxycarbonyloxy group (preferably a substituted or unsubstituted aryloxycarbonyl oxy group having from 7 to 30 carbon atoms, e.g., phenoxycarbonyloxy, p-methoxyphenoxycarbonyloxy, p-n-hexadecyloxyphenoxycarbonyloxy), an amino group (preferably an amino group, a substituted or unsubstituted alkylamino group having from 1 to 30 carbon atoms, a substituted or unsubstituted anilino group having from 6 to 30 carbon atoms, e.g., amino, methylamino, dimethylamino, anilino, N-methyl-anilino, diphenylamino), an ammonio group (preferably an ammonio group, an ammonio group substituted with a substituted or unsubstituted alkyl, aryl or heterocyclic group having from 1 to 30 carbon atoms, e.g., trimethylammonio, triethylamonio, diphenylmethlylammonio), an acylamino group (preferably a formylamino group, a substituted or unsubstituted alkylcarbonylamino group having from 1 to 30 carbon atoms, a substituted or unsubstituted arylcarbonylamino group having from 6 to 30 carbon atoms, e.g., formylamino, acetylamino, pivaloylamino, lauroylamino, benzoylamino, 3,4,5-tri-n-octyloxyphenylcarbonylamino), an aminocarbonylamino group (preferably a substituted or unsubstituted aminocarbonyl amino group having from 1 to 30 carbon atoms, e.g., carbamoylamino, N,N-dimethylaminocarbonylamino, N,N-diethylaminocarbonylamino, morpholinocarbonylamino), an alkoxycarbonylamino group (preferably a substituted or unsubstituted alkoxycarbonylamino group having from 2 to 30 carbon atoms, e.g., methoxycarbonylamino, ethoxycarbonylamino, t-butoxycarbonylamino, n-octadecyloxycarbonylamino, N-methyl-methoxycarbonylamino), an aryloxycarbonylamino group (e.g., a substituted or unsubstituted aryloxycarbonylamino group having from 7 to 30 carbon atoms, e.g., phenoxycarbonylamino, p-chlorophenoxycarbonylamino, m-n-octyloxyphenoxycarbonylamino), a sulfamoylamino group (preferably a substituted or unsubstituted sulfamoylamino group having from 0 to 30 carbon atoms, e.g., sulfamoylamino, N,N-dimethylaminosulfonylamino, N-n-octylaminosulfonylamino), an alkyl or arylsulfonylamino group (preferably a substituted or unsubstituted alkylsulfonylamino group having from 1 to 30 carbon atoms, or a substituted or unsubstituted arylsulfonylamino group having from 6 to 30 carbon atoms, e.g., methylsulfonylamino, butylsulfonylamino, phenylsulfonylamino, 2,3,5-trichlorophenylsulfonylamino, p-methylphenylsulfonylamino), a mercapto group, an alkylthio group (preferably a substituted or unsubstituted alkylthio group having from 1 to 30 carbon atoms, e.g., methylthio, ethylthio, n-hexadecylthio), an arylthio group (preferably a substituted or unsubstituted arylthio group having from 6 to 30 carbon atoms, e.g., phenylthio, p-chlorophenylthio, m-methoxyphenylthio), a heterocyclic-thio group (preferably a substituted or unsubstituted heterocyclic-thio group having from 2 to 30 carbon atoms, e.g., 2-benzothiazolylthio, 1-phenyltetrazol-5-ylthio), a sulfamoyl group (preferably a substituted or unsubstituted sulfamoyl group having from 0 to 30 carbon atoms, e.g., N-ethylsulfamoyl, N-(3-dodecyloxypropyl)sulfamoyl, N,N-dimethylsulfamoyl, N-acetylsulfamoyl, N-benzoylsulfamoyl, N-(N'-phenylcarbamoyl)sulfamoyl), a sulfo group, an alkyl or arylsulfinyl group (preferably a substituted or unsubstituted alkylsulfinyl group having from 1 to 30 carbon atoms, or a substituted or unsubstituted arylsulfinyl group having from 6 to 30 carbon atoms, e.g., methylsulfinyl, ethylsulfinyl, phenylsulfinyl, p-methylphenylsulfinyl), an alkyl or arylsulfonyl group (preferably a substituted or unsubstituted alkylsulfonyl group having from 1 to 30 carbon atoms, or a substituted or unsubstituted arylsulfonyl group having from 6 to 30 carbon atoms, e.g., methylsulfonyl, ethylsulfonyl, phenylsulfonyl, p-methylphenylsulfonyl), an acyl group (preferably a formyl group, a substituted or unsubstituted alkylcarbonyl group having from 2 to 30 carbon atoms, a substituted or unsubstituted arylcarbonyl group having from 7 to 30 carbon atoms, or a substituted or unsubstituted heterocyclic-carbonyl group having from 4 to 30 carbon atoms and bonding to the carbonyl group via its carbon atom, e.g., acetyl, pivaloyl, 2-chloroacetyl, stearoyl, benzoyl, p-n-octyloxyphenylcarbonyl, 2-pyridylcarbonyl, 2-furylcarbonyl), an aryloxycarbonyl group (preferably a substituted or unsubstituted aryloxycarbonyl group having from 7 to 30 carbon atoms, e.g., phenoxycarbonyl, o-chlorophenoxycarbonyl, m-nitrophenoxycarbonyl, p-t-butylphenoxycarbonyl), an alkoxycarbonyl group (preferably a substituted or unsubstituted alkoxycarbonyl group having from 2 to 30 carbon atoms, e.g., methoxycarbonyl, ethoxycarbonyl, t-butoxycarbonyl, n-octadecyloxycarbonyl), a carbamoyl group (preferably a substituted or unsubstituted carbamoyl group having from 1 to 30 carbon atoms, e.g., carbamoyl, N-methylcarbamoyl, N,N-dimethylcarbamoyl, N,N-di-n-octylcarbamoyl, N-(methylsulfonyl)carbamoyl), an aryl or heterocyclic-azo group (preferably a substituted or unsubstituted arylazo group having from 6 to 30 carbon atoms, or a substituted or unsubstituted heterocyclic-azo group having from 3 to 30 carbon atoms, e.g., phenylazo, p-chlorophenylazo, 5-othylthio-1,3,4-thiadiazol-2-ylazo), an imido group (preferably N-succinimido, N-phthalimido), a phosphino group (preferably a substituted or unsubstituted phosphino group having from 2 to 30 carbon atoms, e.g., dimethylphosphino, diphenylphosphino, methylphenoxyphosphino), a phosphinyl group (preferably a substituted or unsubstituted phosphinyl group having from 2 to 30 carbon atoms, e.g., phosphinyl, dioctyloxyphosphinyl, diethoxyphosphinyl), a phosphinyloxy group (preferably a substituted or unsubstituted phosphinyloxy group having from 2 to 30 carbon atoms, e.g., diphenoxyphosphinyloxy, dioctyloxyphosphinyloxy), a phosphinylamino group (preferably a substituted or unsubstituted phosphinylamino group having from 2 to 30 carbon atoms, e.g., dimethoxyphosphinylamino, dimethylaminophosphinylamino), a phospho group, a silyl group (preferably a substituted or unsubstituted silyl group having from 3 to 30 carbon atoms, e.g., trimethylsilyl, t-butyldimethylsilyl, phenyldimethylsilyl), a hydrazino group (preferably a substituted or unsubstituted hydrazino group having from 0 to 30 carbon atoms, e.g., trimethylhydrazino), an ureido group (preferably a substituted or unsubstituted ureido group having from 0 to 30 carbon atoms, e.g., N,N-dimethylureido).

Two V's may together form a ring (e.g., aromatic or non-aromatic hydrocarbon rings, or heterocyclic rings— these rings may bond to each other to form polycyclic condensed rings; for example, the rings include benzene ring, naphthalene ring, anthracene ring, phenanthrene ring, fluorene ring, triphenylene ring, naphthacene ring, biphenyl ring, pyrrole ring, furan ring, thiophene ring, imidazole ring, oxazole ring, thiazole ring, pyridine ring, pyrazine ring, pyrimidine ring, pyridazine ring, indolidine ring, indole ring, benzofuran ring, benzothiophene ring, isobenzofuran ring, quinolidine ring, quinoline ring, phthalazine ring, naphthyridine ring, quinoxaline ring, quinoxazoline ring, isoquinoline ring, carbazole ring, phenanthridine ring, acridine ring, phenanthroline ring, thianthrene ring, chromene ring, xanthene ring, phenoxazine ring, phenothiazine ring, phenazine ring).

Of the above-mentioned substituents V's, those having a hydrogen atom may be further substituted at its hydrogen atom with any of the above-mentioned substituents. Examples of such substituents are —CONHSO$_2$— (sulfonylcarbamoyl, carbonylsulfamoyl), —CONHCO— (carbonylcabamoyl), —SO$_2$NHS$_2$— (sulfonylsulfamoyl).

More concretely, they include an alkylcarbonylaminosulfonyl group (e.g., acetylaminosulfonyl), an arylcarbonylaminosulfonyl group (e.g., benzoylaminosulfonyl), an alkylsulfonylaminocarbonyl group (e.g., methylsulfonylaminocarbonyl), an arylsulfonylaminocarbonyl group (e.g., p-methylphenylaulfonylaminocarbonyl).

Methine dyes of formulae (Ia), (Ib) and (Ic) for use in the present invention are described in detail hereinunder. The groups of $Z^1$, R, D, $V^1$, $V^2$, $V^3$, $V^4$, M and m may have the same or different meanings as in these formulae (Ia), (Ib) and (Ic).

Of the dyes of formulae (Ia), (Ib) and (Ic), preferred are those of formulae (Ia) and (Ib).

$Z^1$ represents a sulfur atom, an oxygen atom, a selenium atom, a tellurium atom, a nitrogen atom (N—$V^a$), or a carbon atom ($CV^bV^c$). $V^a$, $V^b$ and $V^c$ each represent a hydrogen atom, or a substituent (e.g., V mentioned above), but are preferably any of a hydrogen atom, an alkyl group, an aryl group or a heterocyclic group. For the alkyl group, the aryl group and the heterocyclic group for these, referred to are those to be mentioned herein under for R. For these, preferred are the same groups as those for R. More preferably, these $V^a$, $V^b$ and $V^c$ are alkyl groups.

Preferably, $Z^1$ is a sulfur, oxygen, selenium or nitrogen atom, more preferably a sulfur, oxygen or selenium atom, even more preferably a sulfur or oxygen atom, most preferably a sulfur atom.

R represents an alkyl, aryl or heterocyclic group, but is preferably an alkyl or aryl group, more preferably an alkyl group. Concretely, the alkyl, aryl and heterocyclic groups for R include, for example, an unsubstituted alkyl group having from 1 to 18, preferably from 1 to 7, more preferably from 1 to 4 carbon atoms (e.g., methyl, ethyl, propyl, isopropyl, butyl, isobutyl, hexyl, octyl, dodecyl, octadecyl), a substituted alkyl group having from 1 to 18, preferably from 1 to 7, more preferably from 1 to 4 carbon atoms (for example, it is an alkyl group substituted with V mentioned above, preferably an alkyl group having an acid group such as that mentioned above; concretely, it includes an aralkyl group (e.g., benzyl, 2-phenylethyl), an unsaturated hydrocarbon group (e.g., allyl and vinyl, that is, the substituted alkyl group shall include an alkenyl group and an alkynyl group), a hydrosyalkyl group (e.g., 2-hydroxyethyl, 3-hydroxypropyl), a carboxyalkyl group (e.g., 2-carboxyethyl, 3-carboxypropyl, 4-carboxybutyl, carboxymethyl), an alkoxyalkyl group (e.g., 2-methoxyethyl, 2-(2-metboxyethoxy)ethyl), an aryloxyalkyl group (e.g., 2-phenoxyethyl, 2-(1-naphthoxy; ethyl), an alkoxycarbonylalkyl group (e.g., ethoxycarbonylmethyl, 2-benzyloxycarbonylethyl), anaryloxycarbonylalkyl group (e.g., 3-phenoxycarbonylpropyl), an acyloxyalkyl group (e.g., 2-acetyloxyethyl), an acylalkyl group (e.g., 2-acetylethyl), a carbamoylalkyl group (e.g., 2-morpholinocarbonylethyl), a sulfamoylalkyl group (e.g., N,N-dimethylsulfamoylmethyl), a sulfoalkyl group (e.g., 2-sulfoethyl, 3-sulfopropyl, 3-sulfobutyl, 4-sulfobutyl, 2-(3-sulfoppropoxy)ethyl, 2-hydroxy-3-sulfopropyl, 3-sulfopropoxyethoxyethyl), a sulfoalkenyl group, a sulfatoalkyl group (e.g., 2-sulfatoethyl, 3-sulfatopropyl, 4-sulfatobutyl), a heterocyclic group-substituted alkyl group (e.g., 2-(pyrrolidin-2-on-1-yl)ethyl, tetrahydrofurfuryl), an alkylsulfonylcarbamoylalkyl group (e.g., methanesulfonylcarbamoylmethyl), an acylcarbamoylalkyl group (e.g., acetylcarbamoylmethyl), an acylsulfamoylalkyl group (e.g., acetylsulfamoylmethyl), analkylsulfonylsulfamoylalkyl group (e.g., methanesulfonylsulfamoylmethyl)}, a substituted or unsubstituted aryl group having from 6 to 20, preferably from 6 to 10, more preferably from 6 to 8 carbon atoms (examples of its substituent are V mentioned above—this includes, for example, phenyl, 1-naphthyl, p-methoxyphenyl, p-methylphenyl, p-chlorophenyl), a substituted or unsubstituted heterocyclic group having from 1 to 20, preferably from 3 to 10, more preferably from 4 to 8 carbon atoms (examples of its substituent are V mentioned above—this includes, for example, 2-furyl, 2-thienyl, 2-pyridyl, 3-pyrazolyl, 3-isoxazolyl, 3-isothiazolyl, 2-imidazolyl, 2-oxazolyl, 2-thiazolyl, 2-pyridazyl, 2-pyrimidiyl, 3-pyrazyl, 2-(1,3,5-triazolyl), 3-(1,2,4-triazolyl), 5-tetrazolyl, 5-methyl-2-thienyl, 4-methoxy-2-pyridyl).

R is preferably an unsubstituted alkyl group or a substituted alkyl group. The substituted alkyl group for it is preferably an alkyl group substituted with an acid group.

The acid group is described below. It is a group having a dissociating proton. Concretely, for example, it includes a sulfo group, a carboxyl group, a sulfato group, a group of —CHNHSO$_2$— (sulfonylcarbamoyl, carbonylsulfamoyl), a group of —CONHCO— (carbonylcarbamoyl), a group of —SO$_2$NHSO$_2$— (sulfonylsulfamoyl), a sulfonamido group, a sulfamoyl group, a phosphato group, a phosphono group, a boronic acid group, and a phenolic hydroxyl group, from which a proton is dissociated depending on its pKa and on the pH around it. Preferably, it is a proton-dissociating acid group capable of dissociating at least 90% proton dissociation at pH of from 5 to 11.

More preferably, it is a sulfo group, a carboxyl group, a group of —CHNHSO$_2$—, a group of —CONHCO—, or a group of —SO$_2$NHSO$_2$—, even more preferably a sulfo group or a carboxyl group, and most preferably a sulfo group.

Concretely, preferred examples of the acid group-having alkyl group are 3-sulfopropyl, 4-sulfobutyl, 3-sulfobutyl, 2-sulfoethyl, carboxymethyl, carboxyethyl, carboxypropyl and methanesulfonylcarbamoylethyl; and most preferred are 3-sulfopropyl, 4-sulfobutyl, 3-sulfobutyl, 2-sulfoethyl, carboxymethyl and methanesulfonylcarbamoylethyl.

Preferred examples of the alkyl group substituted with any of a sulfo group, a carboxyl group, a group of —CHNHSO$_2$—, a group of —CONHCO—, or a group of —SO$_2$NHSO$_2$—may be represented by the following formula:

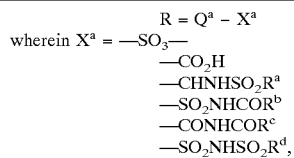

wherein $X^a$ = —SO$_3$—
—CO$_2$H
—CHNHSO$_2$R$^a$
—SO$_2$NHCOR$^b$
—CONHCOR$^c$
—SO$_2$NHSO$_2$R$^d$, $Q^a$ represents a linking group (preferably a divalent linking group) necessary for R to form an alkyl group; $R^a$, $R^b$, $R^c$ and $R^d$ each represent an alkyl group, an aryl group, a heterocyclic group, an alkoxy group, an aryloxy group, a heterocyclic-oxy group or an amino group.

$Q^a$ may be any and every linking group that satisfies the requirement as above, and is, for example, an atom or an atomic group that contains at least one of carbon, nitrogen, sulfur and oxygen atoms. Preferably, it is a linking group having from 0 to 10, more preferably from 1 to 5 carbon atoms of an alkylene group (e.g., methylene, ethylene, trimethylene, tetramethylene, pentamethylene, methyltrimethylene), an alkenylene group (e.g., ethenylone, propenylene), an alkynylene group (e.g. ethynylene, propenylene), an amido group, an ester group, a sulfonamido group; a sulfonate group, an ureido group, a sulfonyl group, a sulfinyl group, a thioether group, an ether group, a carbonyl group or a group of —N(V$^d$)— (in which V$^d$ represents a hydrogen atom or a monovalent substituent, and the monovalent substituent may be any of V mentioned above) alone, or a combination of two or more of these groups.

The linking group may be further substituted with V mentioned above, and may have a ring (aromatic or non-aromatic hydrocarbon ring or hetero-ring).

More preferably, however, the linking group does not contain a hetero-atom. Also more preferably, the liking group is not substituted with a substituent of V mentioned above.

Even more preferably, the linking group is a divalent linking group having from 1 to 5 carbon atoms of an alkylene group having from 1 to 5 carbon atoms (e.g., methylene, ethylene, trimethylene, tetramethylene, pentamethylene, methyltrimethylene), an alkenylene group having from 2 to 5 carbon atoms (e.g., ethenylene, propenylene) or an alkynylene group having from 2 to 5 carbon atoms (e.g., ethynylene, propynylene) alone, or a combination of two or more of these groups. Especially preferably, the linking group is an alkylene group having from 1 to 5 carbon atoms (more preferably, methylene, ethylene, trimethylene, tetramethylene).

In case where $X^a$ is a sulfo group, $Q^a$ is more preferably ethylene, trimethylene, tetramethylene or methyltrimethylene, even more preferably trimethylene. In case where $X^a$ is a carboxyl group, $Q^a$ is more preferably methylene, ethylene or trimethylene, even more preferably methylene.

In case where $X^a$ is —CHNHSO$_2$R$^a$, —SO$_2$NHCOR$^b$, —CONHCOR$^c$ or —SO$_2$NHSO$_2$R$^d$, $Q^a$ is more preferably methylene, ethylene or trimethylene, even more preferably methylene.

$R^a$, $R^b$, $R^c$ and $R^d$ each represent an alkyl group, an aryl group, a heterocyclic group, an alkoxy group, an aryloxy group, a heterocyclic-oxy group or an amino group. Preferably, these are any of the following groups.

Preferred examples of these groups are an unsubstituted alkyl group having from 1 to 18, preferably from 1 to 10, more preferably from 1 to 5 carbon atoms (e.g., methyl, ethyl, propyl, butyl), a substituted alkyl group having from 1 to 18, preferably from 1 to 10, more preferably from 1 to 5 carbon atoms (e.g., hydroxymethyl, trifluoromethyl, benzyl, carboxyethyl, ethoxycarbonylmethyl, acetylaminomethyl— the substituted alkyl group shall include an unsaturated hydrocarbon group having from 2 to 18, preferably from 3 to 10, more preferably from 3 to 5 carbon atoms (e.g., vinyl, ethynyl, 1-cyclohexenyl, benzylidyne, benzylidene)), a substituted or unsubstituted aryl group having from 6 to 20, preferably from 6 to 15, more preferably from 6 to 10 carbon atoms (e.g., phenyl, naphthyl, p-carboxyphenyl, p-nitrophenyl, 3,5-dichlorophenyl, p-cyanophenyl, m-fluorophenyl, p-tolyl), an optionally-substituted heterocyclic group having from 1 to 20, preferably from 2 to 10, more preferably from 4 to 6 carbon atoms (e.g., pyridyl, 5-methylpyridiyl, thienyl, furyl, morpholino, tetrahydrofurfuryl), an alkoxy group having from 1 to 10, preferably from 1 to 8 carbon atoms (e.g., methoxy, ethoxy, 2-methoxyethoxy, 2-hydroxyethoxy, 2-phenoxyethoxy), an aryloxy group having from 6 to 20, preferably from 6 to 12, more preferably from 6 to 10 carbon atoms (e.g., phenoxy, p-methylphenoxy, p-chlorophenoxy, naphthoxy), a heterocyclic-oxy group having from 1 to 20, preferably from 3 to 12, more preferably from 3 to 10 carbon atoms (this means an oxy group substituted with a heterocyclic group, including, for example, 2-thienyloxy, 2-morpholinoxy), and an amino group having from 0 to 20, preferably from 0 to 12, more preferably from 0 to 8 carbon atoms (e.g., amino, methylamino, dimethylamino, ethylamino, diethylamino, hydroxyethylamino, benzylamino, anilino, diphenylamino, cyclic morpholino, pyrrolidino). These may be further substituted with any of V mentioned above.

More preferably, they are any of methyl, ethyl and hydroxyethyl groups, and even more preferably they are methyl groups.

For its expression, the carboxyl group and the dissociating nitrogen atom of the acid group may be expressed as their non-dissociated forms, (CO₂H) or (NH), or may also be expressed as their dissociated forms (CO₂—) or (N—). In fact, the acid group is either dissociated or non-dissociated, depending on the ambient condition such as pH in which the dye is kept.

In case where the acid group has a counter cation, it may be expressed, for example, as ($CO_2^-$, $Na^+$) or ($N^-$, $Na^+$). In its non-dissociated condition, the acid group is expressed as ($CO_2H$) or (NH), but it may also be expressed as ($CO_2^-$, $H^+$) or ($N^-$, $H^+$) in which the proton serves as the counter cation.

$V^1$, $V^2$, $V^3$ and $V^4$ each independently represent a hydrogen atom or a monovalent substituent. The monovalent substituent for these is, for example, V mentioned above. Preferably, the monovalent substituent is more hydrophilic than iodine atom, more preferably its hydrophilicity is the same as or is higher than that of chlorine atom. Concretely, for example, the monovalent substituent is any of a bromine atom, a chlorine atom, a fluorine atom, a hydroxyl group, a carboxyl group, a methyl group, or a methoxy group.

Of $V^1$, $V^2$, $V^3$ and $V^4$, preferably, $V^3$ and $V^4$ are hydrogen atoms and $V^1$ and $V^2$ are hydrogen atoms or monovalent substituents; and more preferably, $V^1$, $V^2$, $V^3$ and $V^4$ are all hydrogen atoms.

M is in the formulae, and this indicates the presence of a cation or an anion that is needed for neutralizing the ionic charge of the dye (molecule). The matter as to whether a dye is cationic or anionic or has a net ionic charge depends on the substituents in the dye and on the ambient condition (e.g., pH) of the dye solution. Typical cations for M are inorganic cations such as hydrogen ion ($H^+$), alkali metal ions (e.g., sodium ion, potassium ion, lithium ion), alkaline earth metal ions (e.g., calcium ion); and organic ions such as ammonium ions (e.g., ammonium ion, tetraalkylamnonium ion, triethylamonium ion, pyridinium ion, ethylpyridinium ion, 1,8-diazabicyclo[5.4.0]-7-undecenium ion). The anion may be either an inorganic anion or an organic anion, including, for example, halide anions (e.g., fluoride ion, chloride ion, bromide ion, iodide ion), substituted arylsulfonate ions (e.g., p-toluenesulfonate ion, p-chlorobenzenesulfonate ion), aryldisulfonate ions (e.g., 1,3-benzenedisulfonate ion, 1,5-naphthalenedisulfonate ion, 2,6-naphthalenedisulfonate ion), alkylsulfate ions (e.g., methylsulfate ion), sulfate ion, thiocyanate ion, perchlorate ion, tetrafluoroborate ion, picrate ion, acetate ion, and trifluoromethanesulfonate ion. If desired, the dyes may be combined with ionic polymers or with any other reverse-charged dyes.

Preferably, the cation is any of sodium ion, potassium ion, triethylammonium ion, tetraethylammonium ion, pyridinium ion, ethylpyridinium ion, or methylpyridinium ion; more preferably, any of sodium, potassium, triethylammonium, pyridinium or N-ethylpyridinium ion. Also preferably, the anion is any of perchlorate ion, iodide ion, bromide ion, or substituted arylsulfonate ion (e.g., p-toluenesulfonate ion). Especially preferably, M is cation.

m indicates a number of 0 or more necessary for neutralizing the charge of the dye molecule. When the dye forms an internal salt, m is 0. Preferably, m is a number of from 0 to 4, more preferably 0, 1, 2 or 3.

D is a group necessary for forming the methine dye. Depending on D, any desired dye may be formed. Preferably, the dye is any of cyanine dye, merocyanine dye, rhodacyanine dye, trinuclear merocyanine dye, tetranuclear merocyanine dye, allopolar dye, helmicyanine dye, and styryl dye. The details of these dyes are described in, for example, F. M. Hamer's *Heterocyclic Compounds—Cyanine Dyes and Related Compounds*, John Wiley & Sons, New York, London, 1964; D. M. Sturmer's *Heterocyclic Compounds—special Topics in Heterocyclic Chemistry*, Chap. 18, Sci. 15, pp. 482–515, John Wiley & Sons, New York, London, 1977.

Preferred dyes for use in the present invention are those of formulae in columns 32–36 of U.S. Pat. No. 5,994,051; and those of formulae in columns 30–34 of U.S. Pat. No. 5,747,236. Also preferred for use herein are cyanine dyes, merocyanine dyes and rhodacyanine dyes of formulae (XI), (XII) and (XIII) in columns 21–22 of U.S. Pat. No. 5,340, 694, in which, however, the numbers of $n_{12}$, $n_{15}$, $n_{17}$ and $n_{18}$ are not specifically defined and may be an integer of 0 or more, but is preferably at most 4.

For the methine dyes to be formed by D, more preferred are cyanine dyes and merocyanine dyes. When combined with the compound of formula (II), these dyes are more effective for improving the photographic properties of the silver halide photographic materials that contain them. More preferably, the methine dyes to be formed by D are cyanine dyes. When combined with the compound of formula (II), the cyanine dyes are even more effective for improving the photographic properties of the silver halide photographic materials that contain them.

Cyanine dyes of formulae (Ia), (Ib) and (Ic) with D therein may be expressed as the following resonance formulae.

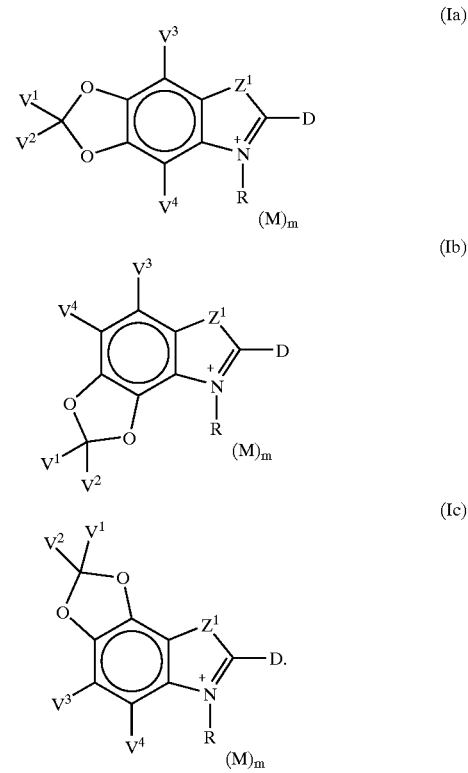

In formulae (Ia), (Ib) and (Ic), D is preferably $D^1$ mentioned above, or any of $D^a$, $D^b$ or $D^c$ mentioned below. More preferably, D is $D^1$ or $D^a$. When combined with the compound of formula (II), the dyes of the preferred type are more effective for improving the photographic properties of the silver halide photographic materials that contain them. Most preferably, $D^1$ is selected from $D^2$ mentioned above. When combined with the compound of formula (II), the dyes of the most preferred type are still more effective for improving the photographic properties of the silver halide photographic materials that contain them.

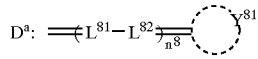

In $D^a$, $L^{81}$ and $L^{82}$ each represent a methine group; $n^8$ indicates 0, 1, 2, 3 or 4; $Y^{81}$ represents an atomic group necessary for forming an acid nucleus or an acyclic acid terminal group. The atomic group may be condensed with any additional ring, or may be substituted with any other group.

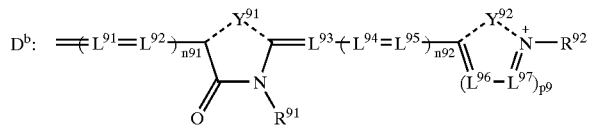

In $D^b$, $L^{91}$, $L^{92}$, $L^{93}$, $L^{94}$, $L^{95}$, $L^{96}$ and $L^{97}$ each represent a methine group; $p^9$ indicates 0 or 1; $n^{91}$ and $n^{92}$ each indicate 0, 1, 2, 3 or 4; $Y^{91}$ and $Y^{92}$ each represent an atomic group necessary for forming a nitrogen-containing hetero-ring that may be condensed with any additional ring or may be substituted; $R^{91}$ and $R^{92}$ each represent a substituted or unsubstituted alkyl, aryl or heterocyclic group.

ring, tetrazole ring, pyrimidine ring, and these rings condensed with benzene ring.

More preferably, the hetero-ring is any of benzoxazole ring, benzothiazole ring, benzimidazole ring or quinoline ring; even more preferably benzoxazole ring or benzothiazole ring. These rings may be substituted with any of V mentioned above. Concretely, examples of $Z_{11}$, $Z_{12}$, $Z_{13}$, $Z_{14}$ and $Z_{16}$ described in columns 23–24 of U.S. Pat. No. 5,340,694 are referred to for specific examples of the rings.

$Y^{81}$ is an atomic group necessary for forming an acyclic or cyclic acid nucleus, and it may form any and every acid nucleus generally in ordinary merocyanine dyes. In one preferred form of the acid nucleus, a thiocarbonyl group or a carbonyl group is adjacent to the methine chain-bonding site of $Y^{81}$.

The acid nucleus referred to herein is defined, for example, as in T. H. James' *The Theory of the Photographic Process*, 4th Ed., MacMillan Publishing, 1977, p. 198. Concretely, it is described in, for example, U.S. Pat. Nos. 3,567,719, 3,575,869, 3,804,634, 3,837,862, 4,002,480, 4,925,777, and JP-A 3-167546.

Preferably, the acid nucleus is a 5- or 6-membered nitrogen-containing hetero-ring with any of carbon, nitrogen and chalcogen (typically, oxygen, sulfur, selenium and tellurium) atoms. For example, it includes the following:

2-Pyrazolin-5-one, pyrazolidine-3,5-dione, imidazolin-5-one, hydantoin, 2 or 4-thiohydantoin, 2-iminoxazolidin-4-

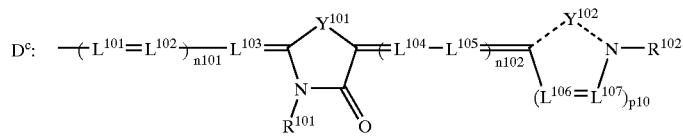

In $D^c$, $L^{101}$, $L^{102}$, $L^{103}$, $L^{104}$, $L^{105}$, $L^{106}$ and $L^{107}$ each represent a methine group; $p^{10}$ indicates 0 or 1; $n^{101}$ and $n^{102}$ each indicate 0, 1, 2, 3 or 4; $Y^{101}$ and $Y^{102}$ each represent anatomic group necessary for forming a nitrogen-containing hetero-ring that may be condensed with any additional ring or may be substituted; $R^{101}$ and $R^{102}$ each represent a substituted or unsubstituted alkyl, aryl or heterocyclic group.

The nitrogen-containing hetero-ring represented by $Z^{11}$, $Y^{92}$ or $Y^{102}$ is preferably a 5-membered or 6-membered nitrogen-containing hetero-ring, and this may be condensed with any additional ring (e.g., aromatic or non-aromatic carbon ring or hetero-ring, concretely V mentioned above). Preferably, the ring with which the hetero-ring represented by $Z^{11}$, $Y^{92}$ or $Y^{102}$ is condensed is a 5-membered or 6-membered non-aromatic carbon ring or hetero-ring. More preferably, the carbon ring is a benzene ring or a naphthalene ring; and the hetero-ring is a furan ring or thiophene ring. Especially preferably, the ring to be condensed with the hetero-ring represented by $Z^{11}$, $Y^{92}$ or $Y^{102}$ is a carbon ring, even more preferably a benzene ring.

Preferred examples of the nitrogen-containing hetero-ring with any of $Z^{11}$, $Y^{92}$ or $Y^{102}$ are thiazoline ring, thiazole ring, benzothiazole ring, oxazoline ring, oxazole ring, benzoxazole ring, selenazoline ring, selenazole ring, benzoselenazole ring, tellurazoline ring, tellurazole ring, benzotellurazole ring, 3,3-dialkylindolenine ring (e.g., 3,3-dimethylindolenine), imidazoline ring, imidazole ring, benzimidazole ring, isoxazole ring, isothiazole ring, pyrazole ring, 2-pyridine ring, 4-pyridine ring, 2-quinoline ring, 4-quinoline ring, 1-isoquinoline ring, 3-isoquinoline ring, isidazo[4,5-b]quinoxaline ring, oxadiazole ring, thiadiazole one, 2-oxazolin-5-one, 2-thioxazoline-2,4-dione, isoxazolin-5-one, 2-thiazolin-4-one, thiazolidin-4-one, thiazolidine-2,4-dione, rhodanine, thiazolidine-2,4-dithione, isorhodanine, indane-1,3-dione, thiophen-3-one, thiophen-3-one-1,1-dioxide, indolin-2-one, indolin-3-one, 2-oxoindazolinium, 3-oxoindazolinium, 5,7-dioxo-6,7-dihydrothiazolo [3,2-a]pyrinlidine, cyclohexane-1,3-dione, 3,4-dihydroisoquinolin-4-one, 1,3-dioxane-4,6-dione, barbituric acid, 2-thiobarbituric acid, chromane-2,4-dione, indazolin-2-one, pyridol[1,2-a]pyrimidine-1,3-dione, pyrazolo[1,5-b]quinazolone, pyrazolo[1,5-a]benzimidazole, pyrazolopyridone, 1,2,3,4-tetrahydroquinoline-2,4-dione, 3-oxo-2,3-dihydrobenzo[d]thiopnene-1,1-dioxide, and 3-dicyanomethylene-2,3-dihydrobenzo[d]thiophene-1,1-dioxide nuclei; exomethylene-structured nuclei derived from these nuclei by substituting the carbonyl or thiocarbonyl group in these with an active methylone moiety of ketomethylene or cyanomethylene-structured active methylene compounds; and nuclei of their repetitions.

Preferably, $Y^{81}$ is hydantoin, 2 or 4-thiohydantoin, 2-oxazolin-5-one, 2-thioxazoline-2,4-dione, thiazolidine-2, 4-dione, rhodanine, thiazolidine-2,4-dithione, barbituric acid or 2-thiobarbituric acid, more preferably hydantoin, 2 or 4-thiohydantoin, 2-oxazolin-5-one, rhodanine, barbituric acid or 2-thiobarbituric acid. Even more preferably, it is 2 or 4-thiohydantoin, 2-oxazoline-5-one or rhodanine, and most preferably rhodanine.

The nitrogen-containing hetero-ring to be formed with $Y^{91}$ or $Y^{101}$ is preferably 5- or 6-membered, and more preferably it is derived from the hetero-ring of $Y^{91}$ by removing the oxo or thioxo group from it. Even sore preferably, it is derived from hydantoin, 2 or 4-thiohydantoin, 2-oxazolin-5-one, 5-thioxazoline-2,4-dione, thiazolidine-2,4-dione, rhodanine, thiazolidine-2,4-dione, barbituric acid or 2-thiobarbituric acid by removing the oxo or thioxo group. Even more preferably, it is derived from hydantoin, 2 or 4-thiohydantoin, 2-oxazlin-5-one, rhodanine, barbituric acid or 2-thiobarbituric acid by removing the oxo or thioxo group; still more preferably, it is derived from 2 or 4-thiohydantoin, 2-oxazolin-5-one or rhodanine by removing the oxo or thioxo group; and most preferably, it is derived from rhodanine by removing the thioxo group.

$R^{12}$, $R^{22}$, $R^{91}$, $R^{92}$, $R^{101}$, $R^{102}$, and the substituent (if any, it is represented by $R^{81}$) on the nitrogen atom of the acid nucleus $Y^{81}$ each are a substituted or unsubstituted alkyl, aryl or heterocyclic group, for which preferred are those mentioned hereinabove for R in the methine dyes of formulae (Ia), (Ib) and (Ic).

More preferably, $R^{12}$, $R^{22}$, $R^{81}$, $R^{91}$, $R^{92}$, $R^{101}$ and $R^{102}$ each are a substituted or unsubstituted alkyl group, and even more preferably an alkyl group substituted with an acid group. Concretely, for the acid group-substituted alkyl group for these, referred to are those mentioned hereinabove for R; and the preferred examples of the group for these may be the same as those mentioned hereinabove for R.

$L^{11}$, $L^{12}$, $L^{13}$, $L^{14}$, $L^{15}$, $L^{21}$, $L^{22}$, $L^{23}$, $L^{81}$, $L^{82}$, $L^{91}$, $L^{92}$, $L^{93}$, $L^{94}$, $L^{95}$, $L^{96}$, $L^{97}$, $L^{101}$, $L^{102}$, $L^{103}$, $L^{104}$, $L^{105}$, $L^{106}$ and $L^{107}$ each independently represent a methine group. The methine group for these may be optionally substituted, for which referred to are the substituents V mentioned above.

It may form a ring along with any other methine group, or may form a ring along with any of $Z^{11}$, $Y^{81}$, $Y^{91}$, $Y^{92}$, $Y^{101}$, $Y^{102}$, R, $R^{12}$, $R^{22}$, $R^{91}$, $R^{92}$, $R^{101}$ or $R^{102}$.

Preferably, $L^{14}$, $L^{15}$, $L^{96}$, $L^{97}$, $L^{106}$ and $L^{107}$ are unsubstituted methine groups.

$n^1$, $n^2$, $n^8$, $n^{91}$, $n^{92}$, $n^{101}$ and $n^{102}$ each indicate 0, 1, 2, 3 or 4. When they are 2 or more, the dyes have multiple methine groups in one molecule, in which however, the multiple methine groups may not be the same. Preferably, $n^1$, $n^2$, $n^8$, $n^{91}$ and $n^{102}$ each are 0, 1, 2 or 3, more preferably 0, 1 or 2, even more preferably 0 or 1. Also preferably, $n^{92}$ and $n^{101}$ each are 0 or 1, and more preferably they are both 0.

In case where $n^1$ is 0, $L^{11}$ is preferably an unsubstituted methine group; and in case where $n^1$ is 1, $L^{12}$ is preferably a methine group substituted with an unsubstituted alkyl group, and $L^{11}$ and $L^{13}$ are both unsubstituted methine groups. More preferably, $L^{12}$ is a methyl-substituted methine group or an ethyl-substituted methine group, even more preferably an ethyl-substituted methine group.

In case where $n^2$ is 0, $L^{21}$ is preferably an unsubstituted methine group; and in case where $n^2$ is 1, $L^{22}$ is preferably a methine group substituted with an unsubstituted alkyl group, and $L^{21}$ and $L^{23}$ are both unsubstituted methine groups. More preferably, $L^{22}$ is a methyl-substituted methine group or an ethyl-substituted methine group, even more preferably an ethyl-substituted methine group.

$p^1$, $p^9$ and $p^{10}$ each independently indicate 0 or 1, but preferably they are 0.

$X^{22}$ represents a sulfur atom, an oxygen atom, a selenium atom, a tellurium atom, a nitrogen atom (N—$V^e$), or a carbon atom ($CV^fV^g$). $V^e$, $V^f$ and $V^g$ each represent a hydrogen atom, or a substituent (e.g., V mentioned above), and are preferably any of a hydrogen atom, an alkyl group, an aryl group or a heterocyclic group. For the alkyl group, the aryl group and the heterocyclic group for these, referred to are those mentioned hereinabove for R. For these, preferred are the same groups as those for R. More preferably, these $V^e$, $V^f$ and $V^g$ are alkyl groups.

Preferably, $X^{22}$ is a sulfur, oxygen, selenium or nitrogen atom, more preferably a sulfur, oxygen or selenium atom, even more preferably a sulfur or oxygen atom, most preferably a sulfur In case where D is $D^1$ or $D^2$ in formulae (Ia), (Ib) and (Ic), it is desirable that R and $R^{12}$, or R and $R^{22}$ are both acid group-substituted alkyl groups. Regarding the combination of R and $R^{12}$, and that of R and $R^{22}$, it is desirable that any one of R and $R^{12}$, and any one of R and $R^{22}$ are sulfo group-substituted alkyl groups, and the others each are an alkyl group substituted with an acid group except sulfo group.

For the sulfo group-substituted alkyl group, and the alkyl group substituted with an acid group except sulfo group, referred to are those mentioned hereinabove for R. For these, preferred are the same as those mentioned hereinabove for R.

More preferably, the sulfo group-having alkyl group is a 3-sulfopropyl, 4-sulfobutyl, 3-sulfobutyl or 2-sulfoethyl group, even more preferably a 2-sulfopropyl group. The alkyl group having an acid group except sulfo group is, for example, a carboxymethyl or methanesulfonylcarbamoylmethyl group.

$V^{21}$, $V^{22}$, $V^{23}$ and $V^{24}$ each represent a hydrogen atom or a substituent. For the substituent for these, referred to are those mentioned hereinabove for V. However, two adjacent substituents do not bond to each other to form a saturated or unsaturated condensed ring. Preferably, the substituent for these is not an aryl or aromatic heterocyclic group. Preferably, $V^{21}$ and $V^{24}$ are hydrogen atoms; and $V^{22}$ and $V^{23}$ each are a hydrogen atom, or an alkyl group (e.g., methyl), an alkoxy group (e.g., methoxy), an alkylthio group (e.g., methylthio), a cyano group, or a halogen atom (e.g., fluorine, chlorine, bromine, iodine). More preferably, $V^{23}$ is a hydrogen atom, and $V^{22}$ is an alkyl group, an alkoxy group or a halogen atom. Even more preferably, $V^{22}$ is a halogen atom, still more preferably a chlorine or bromine atom, most preferably a chlorine atom. The preferred embodiments produce better results.

When the dye of formula (Ia) (Ib) or (Ic) is combined with the compound of formula (II) in the present invention, they are preferably so combined that their spectral sensitivity peak wavelength is not longer than 100 nm, more preferably not longer than 70 nm, even more preferably not longer than 50 nm, still more preferably not longer than 40 nm.

Preferred combinations of the cyanine dye of formula (Ia), (Ib) or (Ic) and the compound of formula (II) are discussed in point of the structural viewpoint of the compounds. Preferably, the cyanine dye of formula (Ia), (Ib) or (Ic) having three methine chains is combined with the compound of formula (II) also having three methine chains; and the cyanine dye of formula (Ia), (Ib) or (Ic) having one methine chain is preferably combined with the compound of formula (II) also having one methine chain. When the dye of formula (Ia), (Ib) or (Ic) is combined with the compound of formula (II) all having three methine chains and when the dye of formula (Ia), (Ib) or (Ic) has a benzothiazole nucleus and a benzoxazole nucleus, then it is desirable that the compound of formula (II) has two benzothiazole nuclei; but when the dye of formula (Ia), (Ib) or (Ic) has two benzoxazole nuclei, then it is desirable that the compound of formula (II) has two benzoxazole nuclei. When the dye of formula (Ia), (Ib) or (Ic) and the compound of formula (II) all have one methine chain and when the dye of formula (Ia), (Ib) or (Ic) has two benzothiazole nuclei, then it is desirable that the compound of formula (II) has two benzothiazole nuclei.

Next described in detail is the cyanine dye of formula (II) to be combined with the methine dye of formulae (Ia), (Ib) and (Ic).

In formula (II), the nitrogen-containing hetero-ring with any of $Z^{31}$ and $Z^{32}$ is preferably 5-membered or 6-membered, and it may be condensed with any other ring (e.g., aromatic or non-aromatic carbon ring or hetero-ring, concretely, V mentioned above). The ring with which the hetero-ring with $Z^{31}$ or $Z^{32}$ is condensed is preferably a 5-membered or 6-membered aromatic carbon ring, more preferably a benzene or naphthalene ring, even more preferably a benzene ring.

The compound of formula (II) does not include the compounds of formulae (Ia), (Ib) and (Ic). In formula (II' the nitrogen-containing hetero-ring with any of $Z^{31}$ and $Z^{32}$ is not condensed with any other ring such as dioxolane ring, different from that in formula (Ia), (Ib) or (Ic). In formula (II), the other hetero-rings may be condensed with any additional ring, but preferably they are not.

Preferably, $Z^{31}$ and $Z^{32}$ are any of thiazoline ring, thiazole ring, benzothiazole ring, oxazoline ring, oxazole ring, benzoxazole ring, selenazoline ring, selenazole ring, benzoselenazole ring, tellurazoline ring, tellurazole ring, benzotellurazole ring, 3,3-dialkylindolenine ring (e.g., 3,3-dimethylindolenine), imidazoline ring, imidazole ring, benzimidazole ring, isoxazole ring, isothiazole ring, pyrazole ring, 2-pyridine ring, 4-pyridine ring, 2-quinoline ring, 4-quinoline ring, 1-isoquinoline ring, 3-isoquinoline ring, imidazo[4,5-b]quinoxaline ring, oxadiazole ring, thiadiazole ring, tetrazole ring, pyriraidine ring; and these rings condensed with any carbon ring such as benzene ring or naphthalene ring.

More preferably, they are benzoxazole ring, benzothiazole ring, benzimidazole ring and quinoline ring; even more preferably benzoxazole ring or benzothiazole ring. These may be substituted with any substituent of V mentioned above. Concretely referred to for their examples are the examples of $Z_{11}$, $Z_{12}$, $Z_{13}$, $Z_{14}$ and $Z_{16}$ mentioned in columns 23–24 of U.S. Pat. No. 5,340,694.

For the alkyl, aryl and heterocyclic groups for $R^{31}$ and $R^{32}$, referred to are those mentioned hereinabove for R. Preferably, $R^{31}$ and $R^{32}$ each are a substituted or unsubstituted alkyl group. More preferably at least one of them is an alkyl group substituted with an acid group. More preferably, $R^{31}$ and $R^{32}$ are both acid group-substituted alkyl groups. For preferred examples of the acid group-substituted alkyl group for $R^{31}$ and $R^{32}$, concretely referred to are those mentioned hereinabove as preferred examples for R.

Regarding the combination of $R^{31}$ and $R^{32}$, it is desirable that any one of $R^{31}$ and $R^{32}$ is a sulfo group-substituted alkyl group and the other one is an alkyl group substituted with an acid group except sulfo group, like the combination of R and $R^{12}$ and the combination of R and $R^{22}$ in formulae (Ia), (Ib) and (Ic) where D is $D^1$ or $D^2$.

For the preferred examples of the sulfo group-substituted alkyl group and the alkyl group substituted with an acid group except sulfo group, referred to are the same as those mentioned hereinabove for R.

More preferably, the sulfo group-having alkyl group is a 3-sulfopropyl, 4-sulfobutyl, 3-sulfobutyl or 2-sulfoethyl group, even more preferably a 3-sulfopropyl group. Also preferably, the alkyl group substituted with any acid group except sulfo group is a carboxymethyl or methanesulfonyl-carbamoylmethyl group.

The methine group for $L^{31}$, $L^{32}$, $L^{33}$, $L^{34}$, $L^{35}$, $L^{36}$ and $L^{37}$ may be substituted or unsubstituted. For the substituent for the group, referred to are those of V mentioned above.

Preferably, $L^{31}$, $L^{32}$, $L^{36}$ and $L^{37}$ are unsubstituted methine groups.

$n^3$ indicates 0, 1, 2, 3 or 4. When $n^3$ is 2 or more, the dye of formula (II) has multiple methine groups in one molecule, in which, however, the multiple methine groups may not be the same. Preferably, $n^3$ is 0, 1, 2 or 3, more preferably 0, 1 or 2, even more preferably 0 or 1.

In case where $n^3$ is 0, $L^{33}$ is preferably an unsubstituted methine group; and in case where $n^3$ is 1, $L^{34}$ is preferably a methine group substituted with an unsubstituted alkyl group, and $L^{33}$ and $L^{35}$ are both unsubstituted methine groups. More preferably, $L^{34}$ is a methyl-substituted methine group or an ethyl-substituted methine group, even more preferably an ethyl-substituted methine group.

$p^{31}$ and $p^{32}$ each indicate 0 or 1, but preferably they are 0.

$M^3$ is an ion mentioned hereinabove for M, and is preferably a cation. More preferably, the cation for $M^3$ is sodium, potassium, triethylammonium, pyridinium or N-ethylpyridinium.

$m^3$ indicates a number of 0 or more necessary for neutralizing the charge of the molecule, and it is 0 when the compound of formula (II) forma an internal salt. Preferably, it is 0, 1, 2 or 3.

Preferably, the methine dye of formula (II) is represented by formula (IIa) mentioned above.

In formula (IIa), $X^{41}$ and $X^{42}$ each represent a sulfur atom, an oxygen atom, a selenium atom, a tellurium atom, a nitrogen atom (N—$V^h$), or a carbon atom ($CV^iV^j$). $V^h$, $V^i$ and $V^j$ each represent a hydrogen atom, or a substituent (e.g., V mentioned above), but are preferably any of a hydrogen atom, an alkyl group, an aryl group or a heterocyclic group. For the alkyl group, the aryl group and the heterocyclic group for these, referred to are those mentioned hereinunder for R. For these, preferred are the same groups as those for R. More preferably, these $V^h$, $V^i$ and $V^j$ are alkyl groups.

Preferably, $X^{41}$ and $X^{42}$ each are a sulfur, oxygen, selenium or nitrogen atom, more preferably a sulfur, oxygen or selenium atom, even more preferably a sulfur or oxygen atom, most preferably a sulfur atom.

The alkyl, aryl and heterocyclic groups for $R^{41}$ and $R^{42}$, referred to are those mentioned hereinabove for R. Preferably, $R^{41}$ and $R^{42}$ are the same as $R^{31}$ and $R^{32}$ in formula (II), or are in the same combination as that of $R^{31}$ and $R^{32}$ in formula (II).

For the substituent for $V^{41}$, $V^{42}$, $V^{43}$, $V^{44}$, $V^{45}$, $V^{46}$, $V^{47}$ and $V^{48}$, referred to are those of V mentioned above, and the two adjacent substituents may bond to each other to form a saturated or unsaturated condensed ring. Preferably, the condensed ring is with a carbon ring. Examples of the saturated or unsaturated carbon ring are benzene ring, cyclohexene ring and naphthalene ring. Preferably, however, the groups do not form a condensed ring.

Preferably, $V^{41}$, $V^{42}$, $V^{45}$ and $V^{48}$ are hydrogen atoms; $V^{42}$, $V^{43}$, $V^{46}$ and $V^{47}$ each are a hydrogen atom, an alkyl group (e.g., methyl), an aryl group (e.g., phenyl), an aromatic heterocyclic group (e.g., 1-pyrrolyl), an alkoxy group (e.g., methoxy), an alkylthio group (e.g., methylthio), a cyano group or a halogen atom (e.g., fluorine, chlorine, bromine, iodine). More preferably, $V^{43}$ and $V^{47}$ are hydrogen atoms; and $V^{42}$ and $V^{46}$ are halogen atoms (even more preferably, chlorine or bromine), still more preferably chlorine atoms.

The methine group for $L^{41}$, $L^{42}$ and $L^{43}$ may be unsubstituted or substituted. For the substituent for the group, referred to are those of V mentioned above.

$n^4$ indicates 0, 1, 2, 3 or 4. When $n^4$ is 2 or more, the compound has multiple methine groups in one molecule, in which, however, the multiple methine groups may not be the same. Preferably, $n^4$ is 0, 1, 2 or 3, more preferably 0, 1 or 2, even more preferably 0 or 1.

In case whore $n^4$ is 0, $L^{41}$ is preferably an unsubstituted methine group; and in case where $n^4$ is 1, $L^{42}$ is preferably a methine group substituted with an unsubstituted alkyl group, and $L^{41}$ and $L^{43}$ are both unsubstituted methine groups. More preferably, $L^{42}$ is a methyl-substituted methine group or an ethyl-substituted methine group, even more preferably an ethyl-substituted methine group.

For $M^4$, referred to are the ions mentioned hereinabove for M. Especially preferably, $M^4$ is a cation. Preferred examples of the cation are sodium, potassium, triethylamfonium, pyridinium, and N-ethylpyridinium.

$m^4$ indicates a number of 0 or more necessary for neutralizing the charge of the molecule. In case where the dye forms an internal salt, $m^4$ is 0. Preferably, $m^4$ is 0, 1, 2 or 3.

The methine dye of formula (IIa) is more preferably represented by formula (III) mentioned above in case where it is used in green-sensitive to red-sensitive emulsions, or by formula (IV) also mentioned above in case where it is used in blue-sensitive emulsions.

The dyes of formula (III) are described in detail hereinunder.

In formula (III), $X^{51}$ and $X^{52}$ each represent an oxygen or sulfur atom. When the dye of formula (III) is in a green-sensitive emulsion, $X^{51}$ is preferably an oxygen or sulfur atom, and $X^{52}$ is preferably an oxygen atom; and more preferably $X^{51}$ and $X^{52}$ are both oxygen atoms. When the dye is in a red-sensitive emulsion, $X^{51}$ is preferably an oxygen or sulfur atom, and $X^{52}$ is preferably a sulfur atom; but more preferably $X^{51}$ and $X^{52}$ are both sulfur atoms.

For the alkyl, aryl and heterocyclic groups for $R^{51}$, $R^{52}$ and $R^{53}$, referred to are those mentioned hereinabove for R. Preferably, $R^{51}$ and $R^{52}$ are the same as those of $R^{31}$ and $R^{32}$ in formula (II), and their combination is also preferably the same as the combination of $R^{31}$ and $R^{32}$ in formula (II).

Also preferably, $R^{53}$ is an unsubstituted alkyl group, more preferably a methyl or ethyl group.

For the substituent for $V^{51}$, $V^{52}$, $V^{53}$, $V^{54}$, $V^{55}$ and $V^{56}$, referred to are those of V mentioned above, but the two adjacent substituents of these $V^{51}$, $V^{52}$, $V^{53}$, $V^{54}$, $V^{55}$ and $V^{56}$ do not bond to each other to form a saturated or unsaturated condensed ring. Preferably, $V^{51}$, $V^{53}$, $V^{54}$ and $V^{56}$ are hydrogen atoms; $V^{52}$ and $V^{55}$ each are an alkyl group (e.g., methyl), an aryl group (e.g., phenyl), an aromatic heterocyclic group (e.g., 1-pyrrolyl), an alkoxy group (e.g., methoxy), an alkylthio group (e.g., methylthio), a cyano group or a halogen atom (e.g., fluorine, chlorine, bromine, iodine). More preferably, $V^{52}$ and $V^{55}$ each are a halogen atom, even more preferably a chlorine or bromine atom, and most preferably they are both chlorine atoms.

For $M^5$, referred to are the ions mentioned hereinabove for M. Preferably, $M^5$ is a cation. Preferred examples of the cation for it are sodium, potassium, triethylammonium, pyridinium and N-ethylpyridinium.

$m^5$ indicates a number of 0 or more necessary for neutralizing the charge of the molecule. When the dye forms a internal salt, $m^5$ is 0. Preferably, $m^5$ is 0, 1, 2 or 3.

The dyes of formula (IV) are described in detail hereinunder.

In formula (IV), $X^{61}$ represents an oxygen or sulfur atom, and is preferably a sulfur atom.

For the alkyl, aryl and heterocyclic groups for $R^{61}$ and $R^{62}$, referred to are those mentioned hereinabove for R. Preferably, $R^{61}$ and $R^{62}$ are the same as those of $R^{31}$ and $R^{32}$ in formula (II), and their combination is also preferably the same as the combination of $R^{31}$ and $R^{32}$ in formula (II).

For the substituent for $V^{61}$, $V^{62}$, $V^{63}$, $V^{64}$, $V^{65}$ and $V^{66}$, referred to are those of V mentioned above, but the two adjacent substituents of these $V^{61}$, $V^{62}$, $V^{63}$, $V^{64}$, $V^{65}$ and $V^{66}$ do not bond to each other to form a saturated or unsaturated condensed ring. Preferably, $V^{61}$, $V^{63}$, $V^{64}$ and $V^{66}$ are hydrogen atoms; $V^{62}$ and $V^{65}$ each are an alkyl group (e.g., methyl), an aryl group (e.g., phenyl), an aromatic heterocyclic group (e.g., 1-pyrrolyl), an alkoxy group (e.g., methoxy), an alkylthio group (e.g., methylthio), a cyano group or a halogen atom (e.g., fluorine, chlorine, bromine, iodine). More preferably, $V^{62}$ and $V^{65}$ each are a halogen atom, even more preferably a chlorine or bromine atom, and most preferably they are both chlorine atoms.

For $M^6$, referred to are the ions mentioned hereinabove for M. Preferably, $M^6$ is a cation. Preferred examples of the cation for it are sodium, potassium, triethylammonium, pyridinium and N-ethylpyridinium.

$m^6$ indicates a number of 0 or more necessary for neutralizing the charge of the molecule. When the dye forms an internal salt, $m^6$ is 0. Preferably, $m^6$ is 0, 1, 2 or 3.

To be in the silver halide emulsion in the present invention, preferred combinations of the compound of formula (Ia), (Ib) or (Ic) and the compound of formula (II) are mentioned below.

In a red-sensitive emulsion layer, the compound of formula (II) is preferably one of formula (III) in which $X^{51}$ and $X^{52}$ are both sulfur atoms; $R^{51}$ and $R^{52}$ each are a sulfoalkyl group, a carboxyalkyl group or an alkylsulfonylcarbamoylalkyl group; $R^{53}$ is a methyl or ethyl group; $V^{51}$, $V^{53}$, $V^{54}$ and $V^{56}$ are all hydrogen atoms; $V^{52}$ and $V^{55}$ each are an alkyl group (e.g., methyl), an alkoxy group (e.g., methoxy), an alkylthio group (e.g., methylthio), a cyano group or a halogen atom (e.g., fluorine, chlorine, bromine, iodine), more preferably a halogen atom, and even more preferably they are both chlorine atoms; $M^5$ is an organic or inorganic monovalent cation; and $m^5$ is 0 or 1.

The compound of formula (Ia), (Ib) or (Ic) to be combined with the compound of that formula (III) is preferably any one of formula (Ia) or (Ib) in which D is $D^2$; one of $Z^1$ and $X^{22}$ is an oxygen atom and the other is a sulfur atom; $V^1$, $V^2$, $V^3$ and $V^4$ are all hydrogen atoms; R and $R^{22}$ each are a sulfoalkyl group, a carboxyalkyl group or an alkylsulfonylcarbamoylalkyl group; $n^2$ is 1; $L^{21}$ and $L^{23}$ are both unsubstituted methine groups; $L^{22}$ is a methyl-substituted methine group or an ethyl-substituted methine group; $V^{21}$, $V^{23}$ and $V^{24}$ are hydrogen atoms; $V^{22}$ is an alkyl group (e.g., methyl), an alkoxy group (e.g., methoxy), an alkylthio group (e.g., methylthio), a cyano group or a halogen atom (e.g., fluorine, chlorine, bromine, iodine), more preferably a halogen atom; M is an organic or inorganic monovalent cation; and m is 0 or 1.

In a green-sensitive emulsion layer, the compound of formula (II) is preferably one of formula (III) in which $X^{51}$ and $X^{52}$ are both oxygen atoms; $R^{51}$ and $R^{52}$ each are a sulfoalkyl group, a carboxyalkyl group or an alkylsulfonylcarbamoylalkyl group; $R^{53}$ is a methyl or ethyl group; $V^{51}$, $V^{53}$, $V^{54}$ and $V^{56}$ are all hydrogen atoms; $V^{52}$ and $V^{55}$ each are an alkyl group (e.g., methyl), an aryl group (e.g., phenyl), an aromatic heterocyclic group (e.g., 2-thienyl), an alkoxy group (e.g., methoxy), an alkylthio group (e.g., methylthio), a cyano group or a halogen atom (e.g., fluorine, chlorine, bromine, iodine), more preferably a halogen atom; $M^5$ is an organic or inorganic monovalent cation; and $m^5$ is 0 or 1.

The compound of formula (Ia), (Ib) or (Ic) to be combined with the compound of that formula (III) is preferably any one of formula (Ia) or (Ib) in which D is $D^2$; one of $Z^1$ and $X^{22}$ is an oxygen atom and the other is a sulfur atom, or both of these are oxygen atoms, more preferably $Z^1$ and $X^{22}$ are both oxygen atoms; $V^1$, $V^2$, $V^3$ and $V^4$ are all hydrogen atoms; R and $R^{22}$ each are a sulfoalkyl group, a carboxyalkyl group or an alkylsulfonylcarbamoylalkyl group; $n^2$ is 1; $L^{21}$ and $L^{23}$ are both unsubstituted methine groups; $L^{22}$ is a methyl-substituted methine group or an ethyl-substituted methine group; $V^{21}$, $V^{23}$ and $V^{24}$ are hydrogen atoms; $V^{22}$ is an alkyl group (e.g., methyl), an aryl group (e.g., phenyl), an aromatic heterocyclic group (e.g., 2-thienyl), an alkoxy group (e.g.,methoxy), an alkylthio group (e.g., methylthio), a cyano group or a halogen atom (e.g., fluorine, chlorine, bromine, iodine), more preferably a halogen atom; M is an organic or inorganic monovalent cation; and m is 0 or 1.

In a blue-sensitive emulsion layer, the compound of formula (II) is preferably one of formula (IV) in which $X^{61}$ is an oxygen atom; $R^{61}$ and $R^{62}$ each are a sulfoalkyl group, a carboxyalkyl group or an alkylsulfonylcarbamoylalkyl group; $V^{61}$, $V^{63}$, $V^{64}$ and $V^{66}$ are all hydrogen atoms; $V^{62}$ and $V^{65}$ each are an alkyl group (e.g., methyl), an aryl group (e.g., phenyl), an aromatic heterocyclic group (e.g., 1-pyrrolyl), an alkoxy group (e.g., methoxy), an alkylthio group (e.g., methylthio), a cyano group or a halogen atom (e.g., fluorine, chlorine, bromine, iodine), more preferably a halogen atom, even more preferably they are both chlorine atoms; $M^6$ is an organic or inorganic monovalent cation; and $m^6$ is 0 or 1.

The compound of formula (Ia), (Ib) or (Ic) to be combined with the compound of that formula (IV) is preferably any one of formula (Ia) or (Ib) in which D is $D^2$; $Z^1$ and $X^{22}$ are both sulfur atoms; $V^1$, $V^2$, $V^3$ and $V^4$ are all hydrogen atoms; R and $R^{22}$ each are a sulfoalkyl group, a carboxyalkyl group or an alkylsulfonylcarbamoylalkyl group; $n^2$ is 0; $L^{21}$ is an unsubstituted methine group; $V^{21}$, $V^{23}$ and $V^{24}$ are hydrogen atoms; $V^{22}$ is an alkyl group (e.g., methyl), an alkoxy group (e.g., methoxy), an alkylthio group (e.g., methylthio), a cyano group or a halogen atom (e.g., fluorine, chlorine, bromine, iodine), more preferably a halogen atom, even more preferably a chlorine or bromine atom; M is an organic or inorganic monovalent cation; and m is 0 or 1.

Specific examples of the compounds of formula (Ia), (Ib) and (Ic) for use in the present invention (including those of a more specific concept) are shown below, which, however, are not intended to restrict the scope of the present invention.

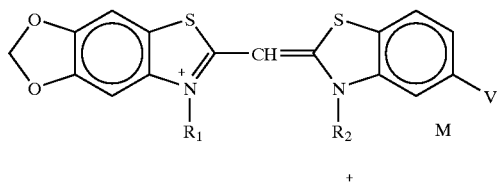

(I-1)

$R_1 = R_2 = (CH_2)_3SO_3^-$, V = Cl, M = $\overset{+}{HN}(C_2H_5)_3$ (I-2)

$R_1 = R_2 = (CH_2)_3SO_3^-$, V = Br, M = $\overset{+}{HN}(C_2H_5)_3$ (I-3)

$R_1 = CH_2CO_2H$, $R_2 = (CH_2)_3SO_3^-$, V = Cl, M = ——

(I-4)

$R_1 = CH_2CONHSO_2CH_3$, $R_2 = (CH_2)_3SO_3^-$, V = Cl, M = ——

(I-5)

$R_1 = CH_2CO_2^-$, $R_2 = (CH_2)_3SO_3^-$, V = Cl, M = $\overset{+}{HN}(C_2H_5)_3$

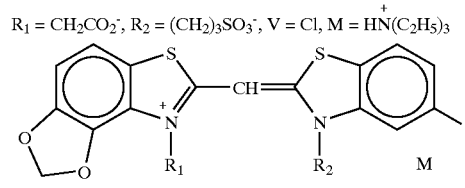

(I-6)

$R_1 = R_2 = (CH_2)_3SO_3^-$, V = Cl, M = $\overset{+}{HN}(C_2H_5)_3$ (I-7)

$R_1 = R_2 = (CH_2)_3SO_3^-$, V = CN, M = $\overset{+}{HN}(C_2H_5)_3$ (I-8)

$R_1 = (CH_2)_3SO_3^-$, $R_2 = CH_2CO_2H$, V = Cl, M = ——

(I-9)

$R_1 = (CH_2)_3SO_3^-$, $R_2 = CH_2CONHSO_2CH_3$, V = Cl, M = ——

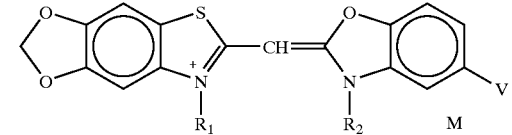

(I-10)

$R_1 = R_2 = (CH_2)_3SO_3^-$, V = Cl, M = $\overset{+}{HN}(C_2H_5)_3$ (I-11)

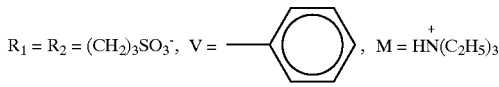

(I-12)

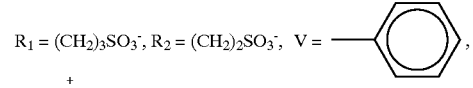

$M = \overset{+}{HN}(C_2H_5)_3$ (I-13)

$R_1 = CH_2CO_2H$, $R_2 = (CH_2)_4SO_3^-$, V = Cl, M = ——

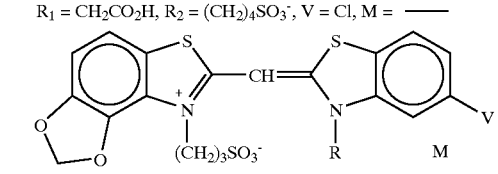

(I-14)

$R = (CH_2)_3SO_3^-$, V = Cl, M = $\overset{+}{HN}(C_2H_5)_3$ (I-15)

$R = (CH_2)_2CHCH_3SO_3^-$, V = Br, M = $\overset{+}{HN}(C_2H_5)_3$ (I-16)

$R = CH_2CONHSO_2CH_3$, V = Cl, M = ——

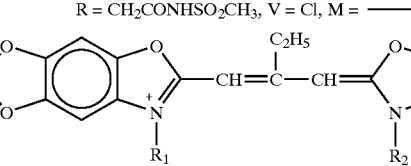

(I-17)

$R_1 = R_2 = (CH_2)_3SO_3^-$, V = Cl, M = Na⁺

(I-18)

$R_1 = R_2 = (CH_2)_4SO_3^-$, V = Br, M = K⁺

(I-19)

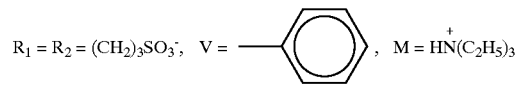

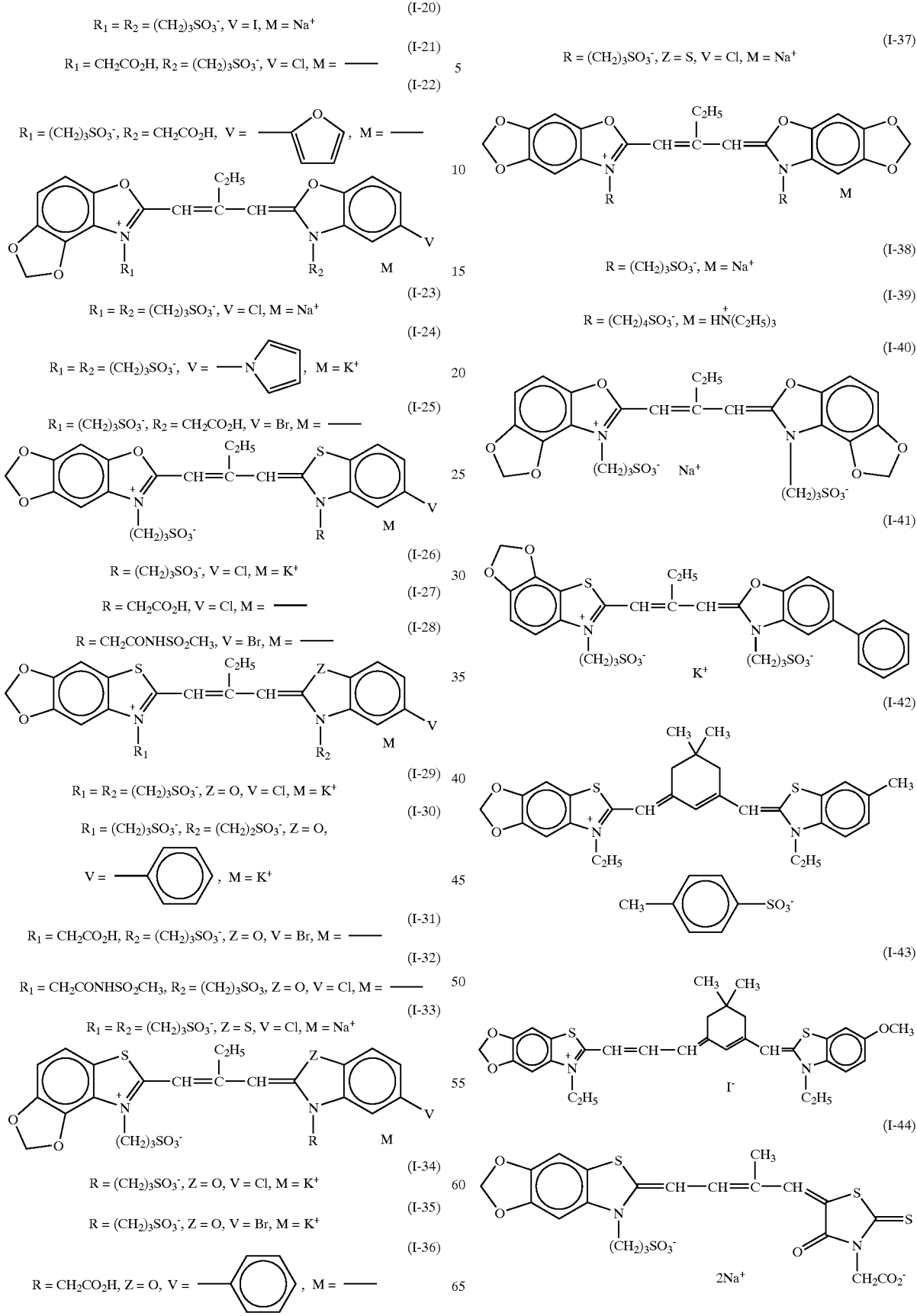

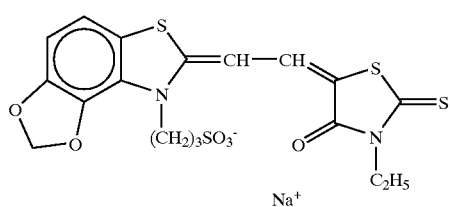
(I-45)

Specific examples of the compounds of formula (II) for use in the invention (including those of a more specific concept, compounds of formula (IIa), compounds of formula (III) and compounds of formula (IV)) are shown below, which, however, are not intended to restrict the scope of the present invention.

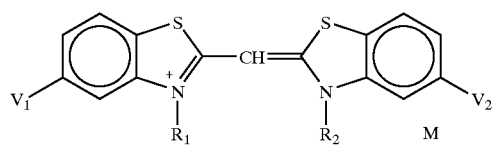

(II-1) $R_1 = R_2 = (CH_2)_3SO_3^-, V_1 = V_2 = Cl, M = \overset{+}{H}N(C_2H_5)_3$ (II-2) $R_1 = R_2 = (CH_2)_4SO_3^-, V_1 = V_2 = Br, M = \overset{+}{H}N(C_2H_5)_3$ (II-3) $R_1 = CH_2CO_2H, R_2 = (CH_2)_3SO_3^-, V_1 = V_2 = Cl, M = \text{———}$ (II-4) $R_1 = CH_2CONHSO_2CH_3, R_2 = (CH_2)_3SO_3^-, V_1 = V_2 = Cl, M = \text{———}$ (II-5) $R_1 = CH_2CO_2^-, R_2 = (CH_2)_3SO_3^-, V_1 = V_2 = Cl, M = \overset{+}{H}N(C_2H_5)_3$ (II-6) $R_1 = CH_2CO_2H, R_2 = (CH_2)_3SO_3^-, V_1 = F, V_2 = Cl, M = \overset{+}{H}N(C_2H_5)_3$ (II-7) $R_1 = R_2 = (CH_2)_3SO_3^-, V_1 = $ —N-pyrrolyl$, V_2 = Cl, M = \overset{+}{H}N(C_2H_5)_3$

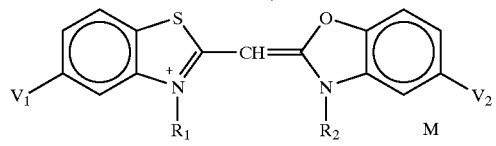

(II-8) $R_1 = R_2 = (CH_2)_3SO_3^-, V_1 = Cl, V_2 = $ —phenyl$, M = \overset{+}{H}N(C_2H_5)_3$ (II-9) $R_1 = (CH_2)_3SO_3^-, R_1 = (CH_2)_2SO_3^-, V_1 = Cl, V_2 = $ —phenyl$, M = \overset{+}{H}N(C_2H_5)_3$ (II-10) $R_1 = R_2 = (CH_2)_3SO_3^-, V_1 = Cl, V_2 = Br, M = \overset{+}{H}N(C_2H_5)_3$ (II-11) $R_1 = CH_2CO_2H, R_2 = (CH_2)_4SO_3^-, V_1 = V_2 = Cl, M = \text{———}$ (II-12) $R_1 = CH_2CONHSO_2CH_3, R_2 = (CH_2)_3SO_3^-, V_1 = Cl, V_2 = Br, M = \text{———}$

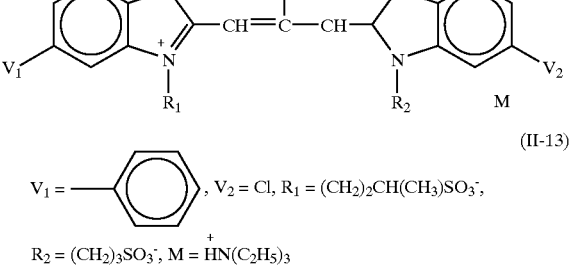

(II-13) $V_1 = $ —phenyl$, V_2 = Cl, R_1 = (CH_2)_2CH(CH_3)SO_3^-,$
$R_2 = (CH_2)_3SO_3^-, M = \overset{+}{H}N(C_2H_5)_3$ (II-14) $V_1 = V_2 = Cl, R_1 = R_2 = (CH_2)_3SO_3^-, M = Na^+$ (II-15) $V_1 = V_2 = Br, R_1 = R_2 = (CH_2)_4SO_3^-, M = Na^+$ (II-16) $V_1 = $ —phenyl$, V_2 = Cl, R_1 = (CH_2)_2SO_3^-, R_2 = (CH_2)_3SO_3^-,$
$M = \overset{+}{H}N(C_2H_5)_3$ (II-17) $V_1 = V_2 = I, R_1 = R_2 = (CH_2)_3SO_3^-, M = K^+$ (II-18) $V_1 = V_2 = F, R_1 = R_2 = (CH_2)_3SO_3^-, M = \overset{+}{H}N(C_2H_5)_3$

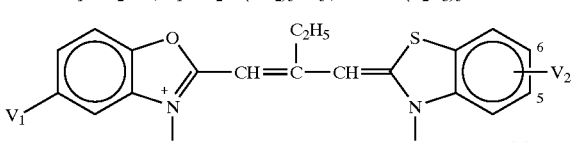

(II-19) $R_1 = R_2 = (CH_2)_3SO_3^-, V_1 = Cl, V_2 = 5\text{-}Cl, M = Na^+$ (II-20) $R_1 = (CH_2)_2SO_3^-, R_2 = (CH_2)_4SO_3^-, V_1 = $ —phenyl$, V_2 = 5,6\text{-}(CH_3)_2,$
$M = Na^+$ (II-21) $R_1 = (CH_2)_3SO_3^-, R_2 = CH_2CONHSO_2CH_3, V_1 = $ —phenyl$,$
$V_2 = H, M = \text{———}$ (II-22) $R_1 = (CH_2)_2SO_3^-, R_2 = CH_2CO_2H, V_1 = $ —phenyl$,$
$V_2 = H, M = \text{———}$

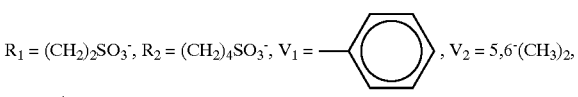

(II-23) $V = Cl, R = (CH_2)_3SO_3^-, M = Na^+$ (II-24) $V = Br, R = (CH_2)_4SO_3^-, M = K^+$ (II-25) $V = I, R = (CH_2)_2CH(CH_3)SO_3^-, M = H^+$

-continued

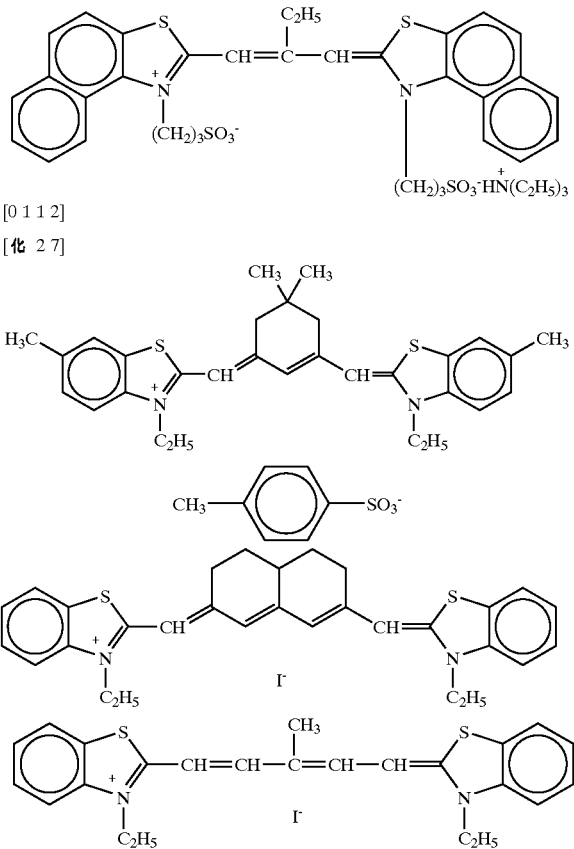

(II-26)

The compounds of formulae (Ia), (Ib), (Ic) and (II) for use in the present invention (including those of a more specific concept) are produced, for example, according to the methods described in F. M. Hamer's, *Heterocyclic Compounds—Cyanine Dyes and Related Compounds*, John Wiley & Sons, New York, London, 1964; D. M. Sturmer's, *Heterocyclic Compounds—Special Topics in Heterocyclic Chemistry*, Chap. 18, Sec. 14, pp. 482–515, John Wiley & Sons, New York, London, 1977; and *Rodd's Chemistry of Carbon Compound*, 2nd Ed., Vol. IV, Part B, 1977, Chap. 15, pp. 369–422, Elsevier Science Publishing Company, Inc., New York.

Regarding the combination of the compound of formula (Ia), (Ib) or (Ic) and the compound of formula (II) to be in the photosensitive emulsion in the present invention, one or more different types of the former compounds may be combined with one or more different types of the latter compounds in one and the same emulsion.

The ratio of the compound of formula (Ia), (Ib) or (Ic) to the compound of formula (II) to be in one and the same emulsion in the present invention is not specifically defined and may be determined in any desired manner, depending on the use and the object of the photographic material of the present invention. Preferably, the ratio falls between 1000/1 and 1/1000, more preferably between 100/1 and 1/100, further more preferably between 10/1 and 1/10, still more preferably between 5/1 and 1/5.

The compound of formula (Ia), (Ib) or (Ic) and the compound of formula (II) may be combined with any other sensitizing dye in one and the same emulsion. Preferred examples of the additional dyes that may be combined with the specific sensitizing dyes in the present invention are cyanine dyes, merocyanine dyes, rhodacyanine dyes, trinuclear merocyanine dyes, tetranuclear merocyonine dyes, allopolar dyes, hemicyanine eyes and styryl dyes. More preferred are cyanine dyes, merocyanine dyes and rhodacyanine dyes; and even more preferred are cyanine dyes. The details of these dyes are described, for example, in F. M. Hamer's, *Heterocyclic Compounds—Cyanine Dyes and Related Compounds*, John Wiley & Sons, New York, London, 1964; D. M. Sturmer's, *Heterocyclic Compounds—Special Topics in Heterocyclic Chemistry*, Chap. 18, Sec. 14, pp. 482–515, John Wiley & Sons, New York, London, 1977.

For further information, the dyes described in RD 17643, pp. 23–24; RD 18716, from page 648, right column to page 649, right column; RD 308119, from page 996, right column to page 998, right column; EP 0565096A1, p.65, lines 7–10 are preferred for use in the present invention. In addition, also preferred are the sensitizing dyes described and exemplified as their general formulae and concrete examples in U.S. Pat. No. 5,747,236 (especially, pp. 30–39) and in U.S. Pat. No. 5,340,694 (especially, pp. 21–60; sensitizing dyes of general formulae (XI), (XII) and (XIII) in which the numbers of $n_{12}$, $n_{15}$, $n_{17}$ and $n_{18}$ are not defined and may be integers of 0 or more, but preferably at most 4).

One or more of these additional sensitizing dyes may be used herein. In case where two or more such additional sensitizing dyes are used, those effective for supersensitization are preferred. Their typical examples are described, for example, in U.S. Pat. Nos. 2,688,545, 2,977,229, 3,397,060, 3,522,052, 3,527,641, 3,617,293, 3,628,964, 3,666,480, 3,672,898, 3,679,428, 3,303,377, 3,769,301, 3,814,609, 3,837,862, 4,026,707; BP 1,344,281, 1,507,803; JP-B 43-49336 (The term "JP-B" as used herein means an examined Japanese Patent Publication"), JP-B 53-12375, JP-A 52-110618, and JP-A 52-109925.

Dyes not having the capability of spectral sensitization by themselves or substances not substantially absorbing visible light, but those having the capability of supersensitization maybe contained in the emulsion along with the sensitizing dyes.

Supersonsitizers useful for spectral sensitization in the present invention (e.g., pyrimidylamino compounds, triazinylamino compounds, azolium compounds, aminostyryl compounds, aromatic organic acid-formaldehyde condensates, azaindene compounds, cadmium salts), and the combination of supersensitizers and sensitizing dyes are described in, for example, U.S. Pat. Nos. 3,511,664, 3,615, 613, 3,615,632, 3,615,641, 4,596,767, 4,945,038, 4,965,182, 4,965,182, 2,933,390, 3,635,721, 3,743,510, 3,617,295, 3,635,721. Regarding the method of using them, preferably referred to are the disclosures in these patent specifications.

The silver halide photographic emulsion and the silver halide photographic material of the present invention are described in detail hereinunder.

The methine dyes of formulae (Ia), (Ib) and (Ic) and those of formula (II) for use in the present invention serve as sensitizing dyes. These methine dyes (and also any other additional sensitizing dyes and supersensitizers) may be added to silver halide emulsions in any stage heretofore considered good in the art of emulsion preparation. For example, as in U.S. Pat. Nos. 2,735,766, 3,628,960, 4,183, 756, 4,225,666; JP-A58-184142, JP-A 60-196749, they may be added to the emulsions in any stage of silver halide grain formation and/or before desalting, during desalting and/or after desalting but before the start of chemical ripening; or as in JP-A 58-113920, in any stage just before chemical ripening or during chemical ripening, or after chemical ripening but before emulsion coating. As in U.S. Pat. No. 4,225,666 and JP-A 58-7629, one compounder two or more compounds having foreign structures may be added to emulsions in two or more divided portions, for example, during silver halide grain formation and chemical ripening, or after chemical ripening, or before, during or after chemical ripening. In case where the compounds are added in such divided portions, the type of the compound to be added singly may be varied and the combination of the compounds to be added together may also be varied.

The amount of the methine dyes to be added to the emulsions may be varied in any desired manner, depending on the shape and the size of the silver halide grains in the emulsions (the same shall apply also to other sensitizing dyes and supersensitizers). Preferably, for example, it may be from $1 \times 10^{-8}$ mols to $8 \times 10^{-1}$ mols, more preferably from $1 \times 10^{-6}$ to $8 \times 10^{-3}$ mols, per mol of the silver halide. For example, when the grain size of the silver halide grains to be sensitized is from 0.2 to 1.3 $\mu$m, the amount of the sensitizing dye to be added to the grains is preferably from $2 \times 10^{-6}$ to $3.5 \times 10^{-3}$ mols, more preferably from $7.5 \times 10^{-6}$ to $1.5 \times 10^{-3}$ mols.

In the present invention, the methine dyes may be directly dispersed in emulsions (the same shall apply also to other sensitizing dyes and supersensitizers). Alternatively, they maybe first dissolved in a suitable solvent such as methylalcohol, ethyl alcohol, methyl cellosolve, acetone, water, pyridine or a mixed solvent of these, and the resulting solution may be added to emulsions. In this case, additives such as base, acid and surfactant maybe in the solution. If desired, ultrasonic waves may be used for dissolving the dyes. For adding the compounds to emulsions, for example, employable area method of dissolving the compounds in a volatile organic solvent, dispersing the resulting solution in a hydrophilic colloid, and adding the resulting dispersion to emulsions, as in U.S. Pat. No. 3,469,987; a method of dispersing the compounds in a water-soluble solvent, and adding the resulting dispersion to emulsions, as in JP-B 46-24185; a method of dissolving the compounds in a surfactant, and adding the resulting solution to emulsions, as in U.S. Pat. No. 3,822,135; a method of dissolving the compounds along with a red-shift compound and adding the resulting solution to emulsions, as in JP-A 51-74624; and a method of dissolving the compounds in an acid not substantially containing water, and adding the resulting solution to emulsions, as in JP-A 50-80826. In addition, other methods such as those described in U.S. Pat. Nos. 2,912,343, 3,342, 605, 2,996,287, 3,429,835 are also employable herein for adding the compounds to emulsions.

The organic solvent to be used in the present invention to dissolve the methine dyes includes, for example, methyl alcohol, ethyl alcohol, n-propanol, isopropanol, n-butanol, isobutanol, t-butanol, benzyl alcohol, fluorine-containing alcohol, methyl cellosolve, acetone, pyridine, and their mixed solvents.

When the methine dye of the present invention is dissolved in water, or in the organic solvent as above, or in their mixed solvent, it is desirable to add a base thereto. The base may be any of organic bases or inorganic bases, including, for example, amine derivatives (e.g., triethylamine, triethanolamine), pyridine derivatives, sodium hydroxide, potassium hydroxide, sodium acetate, and potassium acetate. One preferred method of dissolving the sensitizing dye in such a solvent comprises adding the dye to a mixed solvent of water and methanol followed by adding thereto triethylamine of which the amount is equimolar to that of the dye.

The silver halide grains to be in the silver halide emulsions for use in the present invention may be any of silver chloride, silver bromide, silver chlorobromide, silver iodobromide, silver iedochloride and silver chloroiodobromide. For color print paper, preferred are silver chloride emulsions or silver chlorobromide emulsions for rapid and simplified processing. More preferred are emulsions in which at least 95 mol % of grains are of silver chloride (including silver chloride, silver bromochloride, silver chloroiodobromide). For shortening the time for development, especially preferred is silver chlorobromide or silver chloride substantially free from silver iodide. For color films (negative and reversal films), preferred are silver bromide emulsions or silver iodobromide emulsions. More preferred are emulsions in which at least 95 mol % of grains are of silver bromide (including silver bromide, silver iodobromide, silver chloroiodobromide).

Preferably, the mean grain size of the silver halide grains of the silver halide emulsions for use in the present invention is from 0.1 to 2 m. The grain size corresponds to the diameter of the circle of which the area is equivalent to the projected area of the grain, and the number average of the grain sizes thus actually measured is the mean grain size.

Regarding the grain size distribution thereof, the silver halide grains are preferably mono-dispersed to have a grain size distribution variation coefficient (this is obtained by dividing the standard deviation of the grain size distribution by the mean grain size) of 20% or less, more preferably 15% or less, further more preferably 10% or less. For broadening the latitude of the photographic material in processing it, it is also desirable that the mono-dispersed emulsions are blended to form one layer, or are coated to from two or more layers.

Regarding the shape of the silver halide grains in the photographic emulsions, the grains may have a regular crystal shape of, for example, cubic, octahedral or tetradecahedral grains, or may have an irregular crystal shape of, for example, spherical or tabular grains, or may be mixtures of such regular crystals and irregular crystals. Preferably, regular crystal grains account for at least 50%, more preferably at least 70%, even more preferably at least 90% of all the silver halide grains in the emulsion for use in the present invention.

The emulsions for use in the present invention may be prepared, for example, according to the methods described in P. Glafkides' *Chimie et Phisique Photographique* (Paul Montel, 1967); G. F. Duffin's *Photographic Emulsion Chemistry* (Focal Press, 1966); V. L. Zelikman et al's *Making and Coating Photographic Emulsion* (Focal Press, 1964). Briefly, they may be prepared in any of acid method, neutral method or ammonia method. For reacting a soluble silver salt with a soluble halide to prepare an emulsion, employable is any of single-jet method or double-jet method or their combination. Also employable is a reverse-mixing method in which the grains are formed in a silver ion-rich atmosphere. One example of the double-jet method is a controlled double-jet method in which the pAg of the liquid phase where silver halide grains are formed is kept constant. According to this method, the silver halide grains formed may have a regular crystal shape and an almost uniform grain size.

The emulsions for use in the present invention are preferably so designed that at least 50%, more preferably at least 70%, even more preferably at least 80% of all the projected area of the silver halide grains in the emulsions are tabular grains having an aspect ratio of at least 2. More preferably, the aspect ratio of the tabular grains falls between 4 and 1000, further more preferably between 6 and 500, still more preferably between 8 and 300, most preferably between 15 and 200. For example, for color print paper, preferred are tabular silver chlorobromide grains; and for color films, preferred are tabular silver iodobromide grains.

One tabular grain generally has two parallel planes, and its "thickness" is represented by the distance between the two parallel planes thereof. On the other hand, the diameter of one silver halide grain corresponds to the diameter of the circle of which the area is equivalent to the projected area of the grain, and the ratio of diameter/thickness of the grain is called the aspect ratio of the grain.

Tabular silver chlorobromide grains for color print paper are described in detail. Preferably, they are silver chloride-rich grains (i.e., high silver chloride grains) having a silver chloride content of at least 80 mol %, more preferably at least 95 mol %.

Also preferably, the silver chlorobromide grains are core/shell grains in which the shell portion (outermost layer) contains an iodide and its iodide content is higher than that of the core. Preferably, at least 90% of the core is silver chloride. The core portion may have two or more different halogen compositions. Preferably, the shell portion accounts for 50% or less, more preferably 20% or less of the overall volume of the core/shell grain. Also preferably, the silver iodide content of the shell portion falls between 0.5 and 13 mol %, more preferably between 1 and 6 mol %. Also preferably, the overall silver iodide content of the whole grain falls between 0.1 and 5 mol %, more preferably between 0.1 and 2 mol %. Also preferably, the silver iodide content of the core portion is 1 mol % or less, more preferably 0%.

The silver bromide content may differ between the core portion and the shell portion of the grain. Preferably, the silver bromide content of the grain falls between 0 and 20 mol %, more preferably between 0.1 and 5 mol % of the overall amount of silver in the grain.

Preferably, the diameter of the silver chloride-rich tabular grain falls between 0.2 and 1.0 $\mu$m; the thickness thereof is preferably 0.2 $\mu$m or less, more preferably 0.15 $\mu$m or less, further more preferably 0.1 $\mu$m or less; and the aspect ratio thereof preferably falls between 3 and 20, more preferably between 5 and 15.

Regarding their grain size distribution, the silver chloride-rich tabular grains may be poly-dispersed or mono-dispersed, but are preferably mono-dispersed. Also preferably, the grain size distribution coefficient of the grains falls between 5 and 25%, more preferably between 5 and 20%.

Also preferably, the grain thickness distribution coefficient falls between 5 and 25%, more preferably between 5 and 15%.

In case where silver chloride-rich tabular grains for color print paper are specifically so designed that their outer surfaces are of {111} faces, a crystal phase-controlling agent is used. Such tabular grains are completed by forming two parallel twin-crystal faces, and the twin-crystal face formation depends on the ambient temperature, the dispersion medium (gelatin) and the halogen concentration, of which, therefore, the conditions must be suitably determined. For example, when a crystal phase-controlling agent is present in the system during nuclei formation therein, the gelatin concentration preferably falls between 0.1 and 10%. The chloride concentration is preferably at least 0.01 mol/liter, more preferably at least 0.03 mol/liter.

The details of the crystal phase-controlling agent and the method of using it for forming silver chloride-rich {111} tabular grains are described in JP-A 2000-29156, which is hereby incorporated by reference.

The tabular grains for use in the present invention may also be those of which the main plane is {100} face. Regarding its geometric morphology, the main plane of the tabular grains maybe in any form of rectangles, or triangles to pentagons derived from rectangles by deleting any one of four angles of rectangles (the deleted part is a right triangle of which the vertex is the deleted angle of the rectangle, and the two legs extending from the vertex forms the right triangle), or quadrilaterals to octagons derived from rectangles by deleting from 2 to 4 angles of rectangles.

Methods for forming {100} tabular silver halide grains are described, for example, in JP-A 6-301129, JP-A 6-347929, JP-A 9-34045, JP-A 9-96881, JP-A 8-122954 and JP-A 9-189977.

Regarding their halogen composition, tabular silver iodobromide grains for color films are preferably of silver iodobromide, silver iodochloride or silver iodochlorobromide having a silver iodide content of 30 mol % or less. More preferably, they are of silver iodobromide or silver iodochlorobromide having a silver iodide content of from 2 to 10 mol %. They may contain silver chloride, but their silver chloride content is preferably 8 mol % or less, more preferably 3 mol % or less, further more preferably 0 mol %.

Preferably, the diameter of the tabular silver iodobromide grains falls between 0.3 and 5.0 $\mu$m, and the thickness thereof falls between 0.05 and 0.5 $\mu$m. Also preferably, the aspect ratio of the tabular grains falls between 4 and 50, more preferably between 5 and 30, further more preferably between 6 and 25.

The silver halide emulsions for use in the present invention are generally subjected to chemical sensitization. The chemical sensitization includes gold sensitization with a gold compound (e.g., as in U.S. Pat. Nos. 2,448,060, 3,320, 069); sensitization with metal of, for example, iridium, platinum, rhodium or palladium (e.g., as in U.S. Pat. Nos. 2,448,060, 2,566,245, 2,566,263), sulfur sensitization with a sulfur-containing compound (e.g., as in U.S. Pat. No. 2,222, 264), selenium sensitization with a selenium compound, tellurium sensitization with a tellurium compound, and reduction sensitization with any of tin salts, thiourea dioxide orpolyamines (e.g., as in U.S. Pat. Nos. 2,487,850, 2,518, 698, 2,521,925). These sensitizations may be effected individually or as combined.

Preferably, the emulsions for use in the present invention are chemically sensitized with a selenium sensitizer. For the selenium sensitizer, usable are known selenium compounds such as those disclosed in laid-open or published patent specifications. Concretely, in general, a labile selenium compound and/or a non-labile selenium compound are added to an emulsion and stirred at high temperature, preferably at 40° C. or higher for a predetermined period of time to sensitize the emulsion. For the labile selenium compound, for example, preferred are those described in JP-B 44-15748, JP-B 43-13489, JP-A4-25832,and JP-A4-109240. Examples of the labile selenium sensitizer are isoselenocyanates (e.g., aliphatic isoselenocyanates such as allyl isoselenocyanate), selenoureas, selenoketones, selenamides, selenocarboxylic acids (e.g., 2-selenopropionic acid, 2-selenobutyric acid), selenoesters, diacylselenides (e.g., bis(3-chloro-2,6-dimethoxybenzoyl) selenide), selenophosphates, phosphine selenides, colloidal metal selenium.

Some preferred examples of labile selenium compounds usable herein are mentioned above, but these are not limitative. Anyone skilled in the art has a general understanding that the structure of labile selenium compounds that serve as sensitizers for photographic emulsions is of little importance so far as selenium in the compounds is labile and that the organic part of selenium sensitizer molecule has no other function than carries selenium to make it exist in emulsions while kept labile therein. In the present invention, any and every labile selenium compound of such a broad and generic concept is favorably used for sensitizer for emulsions.

Non-labile selenium compounds are also usable in the present invention, and their examples are described in, for example, JP-B 46-4553, JP-B 52-34492 and JP-B 52-34491.

Concretely, non-labile selenium compounds usable herein are selenious acid, potassium selenocyanide, selenazoles, quaternary salts of selenazoles, diarylselenides, diaryldiselenides, dialkylselenides, dialkyldiselenides, 2-selenazolidinedione, 2-selenoxazolidinethione, and their derivatives.

For selenium compounds for use herein, especially preferred are those of formulae (VII) and (VIII) in JP-A11-15115.

The selenium sensitizer may be dissolved in water or in an organic solvent of, for example, methanol or ethanol alone or in a mixed solvent of such solvents, and added to emulsions that are to be chemically sensitized. Preferably, it is added to emulsions before the start of chemical sensitization of emulsions. The selenium sensitizer to be used is not limited to only one type, but two or more different types of selenium sensitizers may be combined for use herein. Preferably, an labile selenium compound is combined with a non-labile selenium compound.

The amount of the selenium sensitizer to be added to emulsions varies, depending on the activity of the selenium sensitizer, the type and the size of silver halide to be in emulsions, and on the ripening temperature and time. Preferably, it is at least $1 \times 10^{-8}$ mols, more preferably from $1 \times 10^{-7}$ to $5 \times 10^{-5}$ mols per mol of silver halide in emulsions. The temperature for chemical sensitization with the selenium sensitizer is preferably 45° C. or hither, more preferably from 50 to 80° C. The pAg and the pH for selenium sensitization are not specifically defined, and may be determined in any desired manner. For example, the pH may vary within a broad range of from 4 to 9 to attain the object of the present invention.

Various compounds and their precursors may be added to the silver halide emulsions for use in the present invention for preventing the photographic material from being fogged while it is fabricated, stored or processed and for stabilizing the photographic properties of the photographic material. Specific examples of such compounds are described, for example, on pp. 39–72 of JP-A 62-215272 mentioned above, and they are preferred for use in the present invention. In addition, also preferred for use herein are 5-arylamino-1,2,3,4-thiatriazole compounds (in which the aryl residue has at least one electron-attracting group) such as those described in EP 0447647.

The silver halide emulsion prepared according to the present invention is applicable to both color photographic materials and black and white photographic materials. Typical examples of color photographic materials are color print paper, color negative films and color reversal films; and typical examples of black and white photographic materials are X-ray films, ordinary photographic films, and films for printing plates.

Regarding the method for formulating the photographic emulsions for use in the present invention, for example, referred to is the disclosure in JP-A 10-239789, from column 63, line 36 to column 65, line 2.

Regarding additives such as color couplers and others to the photographic material of the present invention, as well as the type of the photographic material and the mode of processing it, for example, referred to is the disclosure in JP-A10-239789, from column 65, line 3 to column 73, line 13.

Various additive such as those mentioned hereinabove may be used in the silver halide photographic material of the present invention. In addition to these, any other various additives may also be in the material in accordance with their object.

These additives are described in more detail in *Research Disclosure*, Item 17643 (December 1978), ibid., Item 18716 (November 1979), and ibid., Item 308119 (December 1989), as listed in the following Table.

| Additives | RD 17643 | RD 18716 | RD 308119 |
|---|---|---|---|
| 1 Chemical Sensitizers | p. 23 | p. 648 right column | p. 996 |
| 2 Sensitivity-increasing Agent | | p. 648 right column | |
| 3 Spectral Sensitizers, Supersensitizers | pp. 23–24 | p. 648 right column to p. 649 right column | 996 right to 998 right |
| 4 Brighteners | p. 24 | | 998 right |
| 5 Antifoggants, Stabilizers | pp. 24–25 | p. 649 right column | 998 right to 1000 right |
| 6 Light Absorbents, Filters, UV Absorbents | pp. 25–26 | p. 659 right column to p. 650 left column | 1003 left to 1003 right |
| 7 Stain Inhibitors | p. 25 right column | 650 left to right column | 1002 right |
| 8 Color Image Stabilizers | p. 25 | | 1002 right |
| 9 Hardeners | p. 26 | p. 651 left column | 1004 right to 1005 left |
| 10 Binders | p. 26 | p. 651 left column | 1003 right to 1004 right |
| 11 Plasticizers, Lubricants | p. 27 | p. 650 right column | 1006 left to 1006 right |
| 12 Coating Aids, Surfactants | pp. 26–27 | p. 650 right column | 1005 left to 1006 left |
| 13 Antistatic Agents | p. 27 | p. 650 right column | 1006 right to 1007 left |
| 14 Matting Agents | | | 1008 left to 1009 left |

Other various techniques relating to emulsions for use in the present invention and emulsion layer configuration in fabricating photographic materials, as well as other silver halide emulsions, dye-forming couplers, functional couplers such as DIR couplers, other various additives and development of photographic materials are described in EP 0565096A1 (laid-open on Oct. 13, 1993) and in other patent publications refereed to in that EP publication. The technical matters and the parts of the EP publication that disclose them are listed in the following Table.

| | | |
|---|---|---|
| 1 | Layer Construction | p. 61 lines 23–35; p. 61 line 41 to p. 62 line 14 |
| 2 | Interlayer | p. 61 lines 36–40 |

-continued

| | | |
|---|---|---|
| 3 | Layers for Interlayer Effect | p. 62 lines 15–18 |
| 4 | Halogen Compositions of Silver Halides | p. 62 lines 21–25 |
| 5 | Crystal Habit of Silver Halide Grains | p. 62 lines 26–30 |
| 6 | Grain Size of Silver Halide | p. 62 lines 31–34 |
| 7 | Emulsion Preparation | p. 62 lines 35–40 |
| 8 | Silver Halide Grain Size Distribution | p. 62 lines 41–42 |
| 9 | Tabular Grains | p. 62 lines 43–46 |
| 10 | Internal Structure of Grains | p. 62 lines 47–53 |
| 11 | Latent Image Formation Type of Emulsions | p. 62 line 54 to p. 63 line 5 |
| 12 | Physical Ripening and Chemical Sensitization of Emulsions | p. 63 lines 6–9 |
| 13 | Mixed Use of Emulsions | p. 63 lines 10–13 |
| 14 | Fogged Emulsions | p. 63 lines 14–31 |
| 15 | Non-photosensitive Emulsions | p. 63 lines 32–43 |
| 16 | Amount of Coating Silver | p. 63 lines 49–50 |
| 17 | Formaldehyde Scavengers | p. 64 lines 54–57 |
| 18 | Mercapto-type Antifoggants | p. 65 lines 1–2 |
| 19 | Foggant-releasing Agents | p. 65 lines 3–7 |
| 20 | Dyes | p. 65 lines 7–10 |
| 21 | General Description of Color Couplers | p. 65 lines 11–13 |
| 22 | Yellow, Magenta and Cyan Couplers | p. 65 lines 14–25 |
| 23 | Polymer Couplers | p. 65 lines 26–28 |
| 24 | Diffusive Dye-forming Couplers | p. 65 lines 29–31 |
| 25 | Colored Couplers | p. 65 lines 32–38 |
| 26 | General Description of Function Couplers | p. 65 liens 39–44 |
| 27 | Bleaching Promoter-releasing Couplers | p. 65 lines 45–48 |
| 28 | Development Promoter-releasing Couplers | p. 65 lines 49–53 |
| 29 | Other DIR Couplers | p. 65 line 54 to p. 66 line 4 |
| 30 | Method of Coupler Dispersion | p. 66 lines 5–28 |
| 31 | Preservatives, Antiseptics | p. 66 lines 29–3 |
| 32 | Type of Photographic Materials | p. 66 lines 34–36 |
| 33 | Thickness and Swelling Rate of Photosensitive Layers | p. 66 line 40 to p. 67 line 1 |
| 34 | Backing Layer | p. 67 lines 3–8 |
| 35 | General Description of Development | p. 67 lines 9–11 |
| 36 | Developers and Developing Agents | p. 67 lines 12–30 |
| 37 | Additives to Developers | p. 67 lines 31–44 |
| 38 | Reversal Treatment | p. 67 lines 45–56 |
| 39 | Opening Rate for Processing Solution | p. 67 line 57 to p. 68, line 12 |
| 40 | Developing Time | p. 68 lines 13–15 |
| 41 | Blix, Bleaching, Fixation | p. 68, line 16 to p. 69, line 31 |
| 42 | Automatic Processor | p. 69 lines 32–40 |
| 43 | Washing, Rinsing, Stabilization | p. 69 line 41 to p. 70 line 18 |
| 44 | Replenishment and Recycle of Processing Solution | p. 70 lines 19–23 |
| 45 | Developer-in-Emulsion type Photographic Materials | p. 70 lines 24–33 |
| 46 | Developing Temperature | p. 70 lines 34–38 |
| 47 | Use in Lens-combined Films | p. 70 lines 39–41 |

EXAMPLE

The present invention is described more concretely with reference to the following Examples, which, however, are not intended to restrict the scope of the present invention.

Example 1

(Preparation of High Silver Chloride {111} Tabular Grains)

2.0 g of NaCl and 2.4 g of inactive gelatin were put into 1.2 liters of water in a reactor kept at 33° C., to which were added 60 ml of aqueous $AgNO_3$ (9 g of $AgNO_3$) and 60 ml of aqueous NaCl (3.2 g of NaCl) in the double-jet method taking 1 minute. One minute after the addition, 1 mmol of crystal phase-controlling agent 1 mentioned below was added to it. Further, one minute after the addition, 3.0 g of NaCl was added. In the next 25 minutes, the reactor was heated up to 60° C., at which the reaction mixture therein was ripened for 16 minutes. Then, 290 g of aqueous 10% phtalated gelatin and 0.8 mmols of crystal phase-controlling agent 1 were added to it. Next, 754 ml of aqueous $AgNO_3$ (113 g of $AgNO_3$) and 768 ml of aqueous NaCl (41.3 g of NaCl) were added to it in the accelerated flow rate taking 28 minutes. After 21 minutes but before 28 minutes during this, 30 ml of aqueous 0.25 M NaCl that contains KI (its amount is to make the outermost layer have an iodide content of 0.5%), 11 mg of yellow prussiate and $1.5 \times 10^{-8}$ mols of iridium hexachloride was added to it.

After the addition, 5.6 ml of 1% potassium thiocyanate and sensitizing dyes shown in Table 1 below were added to it. Next, the resulting emulsion was heated up to 75° C. and kept stirred for 10 minutes.

It was cooled to 40° C., and then desalted through ordinary flocculation with precipitant 1 mentioned below.

After this was thus desalted, 67 g of gelatin, 80 ml of phenol (5%) and 150 ml of distilled water were added to it. Then, this was controlled to have pH of 6.2 and pAg of 7.5 with sodium hydroxide and $AgNO_3$ added thereto. The process gave emulsions 101 to 109 in which 96% of the overall projected area of all grains are tabular grains having a mean equivalent sphere diameter of 0.65 μm, a mean equivalent circle diameter of 1.19 μM, a mean thickness of 0.13 μm a mean aspect ratio of 9.1.

(Chemical Sensitization)

At 60° C., the emulsions 101 to 109 were subjected to optimal chemical sensitization with sodium thiosulfonate, 1-(5-methylureidophenyl)-5-mercaptotetrazole, selenium compound 1, sodium thiosulfate and chloroauric acid.

Crystal Phase-Controlling Agent 1:

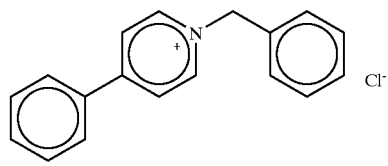

Precipitant 1:

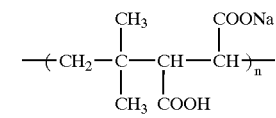

mean molecular weight: 120,000

Selenium Compound 1:

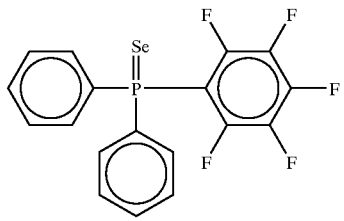

(Preparation of Coated Samples)

The surface of a support prepared by coating both surfaces of paper with polyethylene resin was subjected to corona discharge treatment, and then this was first coated with a gelatin subbing layer that contains sodium dodecylbenzenesulfonate, and then further coated with photographic layers of 1st to 7th layers mentioned below. The process gave silver halide color photographic material samples 101 to 109 of which the layer constitution is shown below. On the other hand, emulsions 101 to 109 were dissolved at 40° C., and then aged with stirring for 12 hours. Using these, samples 101A to 109A were also fabricated in the same manner as herein.

The coating solutions for the photographic layers were prepared as follows:

Preparation of Coating Solutions:

Coupler, color image stabilizer and UV absorbent were dissolved in solvent and ethyl acetate, and the resulting solution was emulsified and dispersed in a surfactant-containing, aqueous 10% by weight gelatin solution using a high-performance dissolver. Water was added to it to prepare an emulsified dispersion.

The emulsified dispersion was mixed with a silver chloride-rich emulsion (i.e., a high silver chloride emulsion) to prepare a coating solution of which the composition is mentioned below. 1-Hydroxy-3,5-dichloro-s-triazine sodium salt was used as a gelatin hardener in every layer. Ab-1, Ab-2 and Ab-3 of 15.0 mg/m$^2$, 60.0 mg/m$^2$ and 5.0 mg/m$^2$, respectively, were added to each layer.

(Ab-1) Antibacterial:

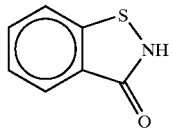

(Ab-2) Antibacterial:

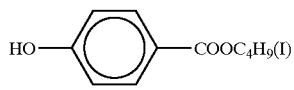

(Ab-3) Antibacterial:

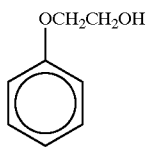

Silver chloride-rich photosensitive emulsion layers that constitute the photographic material samples are mentioned below.

(Blue-sensitive Emulsion Layer)

This is the silver chloride-rich tabular grain emulsion prepared as in the above.

(Green-sensitive Emulsion Layer)

Sensitizing dye G1 was added to a silver chlorobromide emulsion (of cubic grains—this is a ⅓ mixture (by mol of silver) of a large-size (grain) emulsion having a mean grain size of 0.45 μm and a small-size (grain) emulsion having a mean grain size of 0.35 μm; the grain size variation coefficient of the two emulsions is 10% and 8%, respectively; and the silver chloride-based cubic grains that constitute the two types of emulsions have 0.4 mol % of silver bromide locally in a part of every grain surface). Its amount added to the large-size (grain) emulsion was $3.0 \times 10^{-4}$ mols per mol of silver halide, and was $3.6 \times 10^{-4}$ mols to the small-size (grain) emulsion. In addition, sensitizing dye G2 was also added to the mixed silver chlorobromide emulsion, and its amount added to the large-size (grain) emulsion was $4.0 \times 10^{-5}$ mols per mol of silver halide, and was $2.8 \times 10^{-4}$ mols to the small-size (grain) emulsion.

Sensitizing Dye G1:

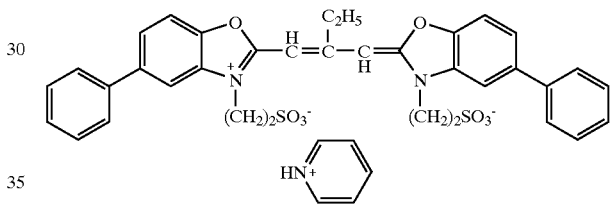

Sensitizing Dye G2:

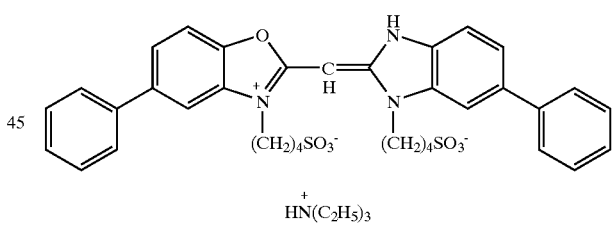

(Red-sensitive Emulsion Layer)

This is a silver chlorobromide emulsion (of cubic grains—this is a ¼ mixture (by mol of silver) of a large-size (grain) emulsion A having a mean grain size of 0.50 μm and a small-size (grain) emulsion having a mean grain size of 0.41 μm the grain size variation coefficient of the two emulsions is 0.09 and 0.11, respectively; and the silver chloride-based cubic grains that constitute the two types of emulsions have 0.8 mol % of silver bromide locally in a part of every grain surface). Sensitizing dye R1 and sensitizing dye R2 were added to the emulsion. Their amount added to the large-size (grain) emulsion was $6.0 \times 10^{-5}$ mols per mol of silver halide, and was $9.0 \times 10^{-5}$ mols to the small-size (grain) emulsion.

Sensitizing Dye R1:

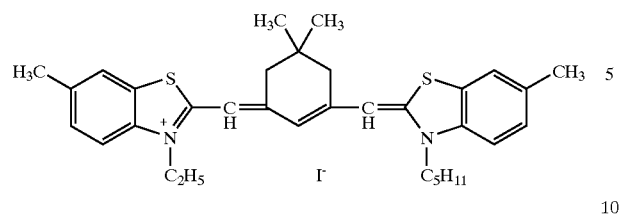

Sensitizing Dye R2:

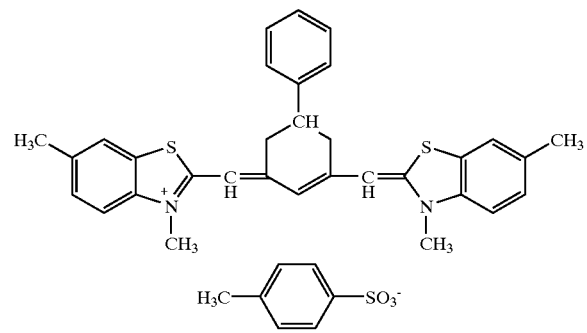

In addition, compound I mentioned below was added to the emulsion layers, and its amount added was $2.6 \times 3.0^{-3}$ mols per mol of silver halide.

Compound 1:

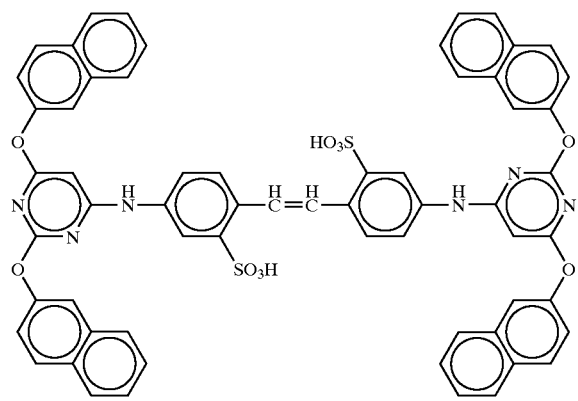

Further, 1-(3-methylueidophenyl)-5-mercaptotetrazole was added to the constitution layers. Its amount added to the blue-sensitive, green-sensitive and red-sensitive emulsion layers was $3.3 \times 10^{-4}$ mols, $1.0 \times 10^{-3}$ mols and $5.9 \times 10^{-4}$ mols, respectively, per mol of silver halide; and was 0.2 mg/m$^2$, 0.2 mg/m$^2$, 0.6 mg/m$^2$ and 0.1 mg/m$^2$, respectively, to the second, fourth, sixth and seventh layers.

To the red-sensitive emulsion layer, added was a copolymer of methacrylic acid and butyl acrylate (1/1 by weight; its mean molecular weight is from 200,000 to 400,000), and its amount added was 0.05 g/m$^2$. To the second, fourth and sixth layers, added was disodium catechol-3,5-disulfonate, and its amount added was 6 mg/m$^2$, 6 mg/m$^2$ and 18 mg/m$^2$, respectively.

For anti-irradiation, the following dyes were added to the emulsion layers. The parenthesized data are the amount of the dye in each layer.

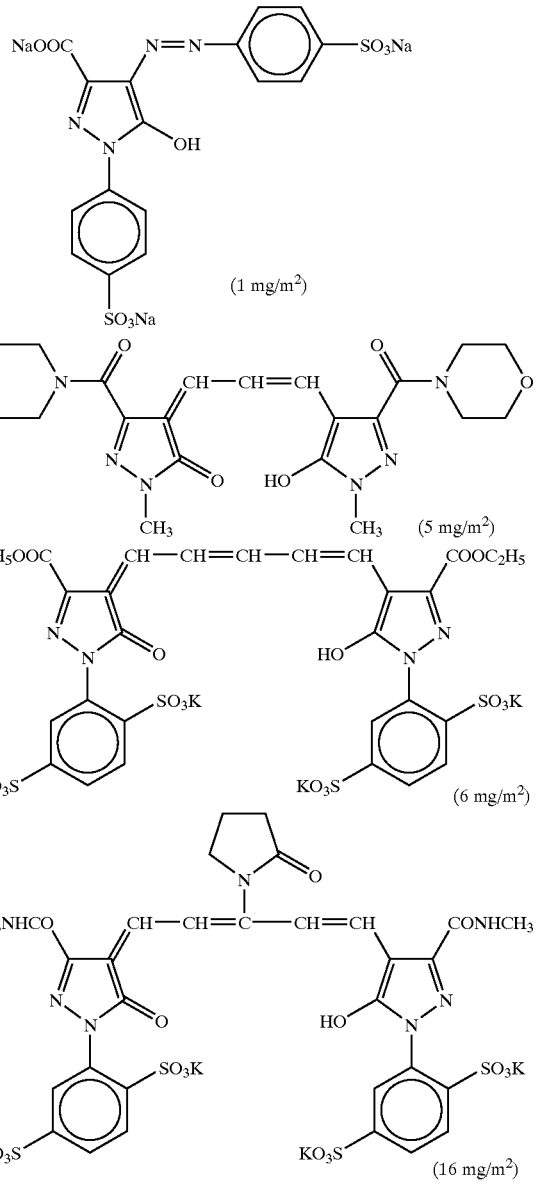

(Layer Constitution)

The layer constitution of the samples fabricated herein is shown below. The numeral data indicate the amount of the component in each layer (g/m$^2$). The amount of the silver halide emulsion is in terms of the coating amount of silver therein.

Support: Polyethylene Resin-laminated Paper

[In this, the polyethylene resin on which the first layer is to be formed contains white pigments (TiO$_2$, its content is 16% by weight; ZnO, its content is 4% by weight), a fluorescent brightener (4,4'-bis(5-methylbenzoxazolyl)stilbene, its content is 13 mg/m$^2$), and a bluish dye (ultramarine, its content is 96 mg/m$^2$).]

| First Layer (blue-sensitive emulsion layer): | |
|---|---|
| Emulsion | 0.24 |
| Gelatin | 1.25 |
| Yellow coupler (ExY) | 0.57 |
| Color image stabilizer (Cpd-1) | 0.07 |
| Color image stabilizer (Cpd-2) | 0.04 |
| Color image stabilizer (Cpd-3) | 0.07 |
| Color image stabilizer (Cpd-4) | 0.02 |
| Solvent (Solv-1) | 0.21 |
| Second Layer (color mixing preventing layer): | |
| Gelatin | 0.60 |
| Color mixing preventing agent (Mid-1) | 0.10 |
| Color mixing preventing agent (Mid-2) | 0.18 |
| Color mixing preventing agent (Mid-3) | 0.02 |
| UV absorbent (UV-C) | 0.05 |
| Solvent (Solv-5) | 0.11 |
| Third Layer (green-sensitive emulsion layer): | |
| Emulsion | 0.14 |
| Gelatin | 0.73 |
| Magenta coupler (ExM) | 0.15 |
| UV absorbent (UV-A) | 0.05 |
| Color image stabilizer (Cpd-2) | 0.02 |
| Color mixing preventing agent (Cpd-3) | 0.008 |
| Color image stabilizer (Cpd-4) | 0.08 |
| Color image stabilizer (Cpd-5) | 0.02 |
| Color image stabilizer (Cpd-9) | 0.009 |
| Color image stabilizer (Cpd-7) | 0.0001 |
| Solvent (Solv-3) | 0.06 |
| Solvent (Solv-4) | 0.11 |
| Solvent (Solv-5) | 0.06 |
| Fourth Layer (color mixing preventing layer): | |
| Gelatin | 0.48 |
| Color mixing preventing agent (Mid-4) | 0.07 |
| Color mixing preventing agent (Mid-2) | 0.006 |
| Color mixing preventing agent (Mid-3) | 0.006 |
| UV absorbent (UV-C) | 0.04 |
| Solvent (Solv-1) | 0.09 |
| Fifth Layer (red-sensitive emulsion layer): | |
| Emulsion | 0.12 |
| Gelatin | 0.59 |
| Cyan coupler (ExC-A) | 0.13 |
| Cyan coupler (ExC-B) | 0.03 |
| Color mixing preventing agent (Mid-3) | 0.01 |
| Color image stabilizer (Cpd-5) | 0.04 |
| Color image stabilizer (Cpd-8) | 0.19 |
| Color image stabilizer (Cpd-9) | 0.04 |
| Solvent (Solv-5) | 0.09 |
| Sixth Layer (UV absorbent layer): | |
| Gelatin | 0.32 |
| UV absorbent (UV-C) | 0.42 |
| Solvent (Solv-7) | 0.08 |
| Seventh Layer (protective layer): | |
| Gelatin | 0.70 |
| Acryl-modified polyvinyl alcohol (degree of modification, 17%) | 0.04 |
| Liquid paraffin | 0.01 |
| Surfactant (Cpd-13) | 0.01 |
| Polydimethylsiloxane | 0.01 |
| Silicon dioxide | 0.003 |

(ExY) Yellow Coupler:

70:30 (by mol) mixture of:

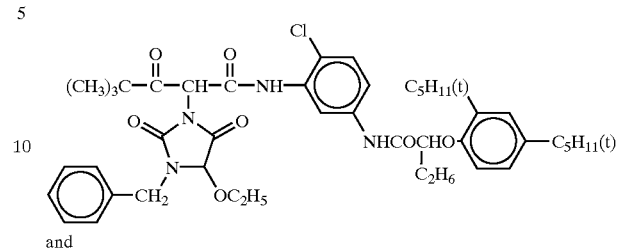

and

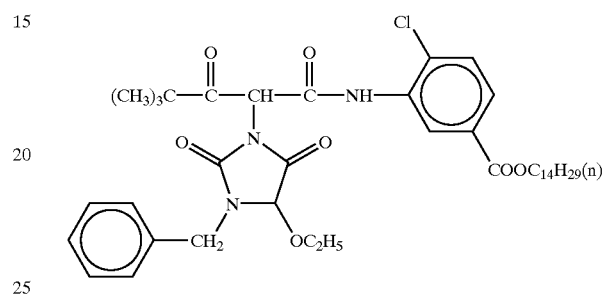

(ExM) Magenta Coupler:

40:40:20 (by mol) mixture of:

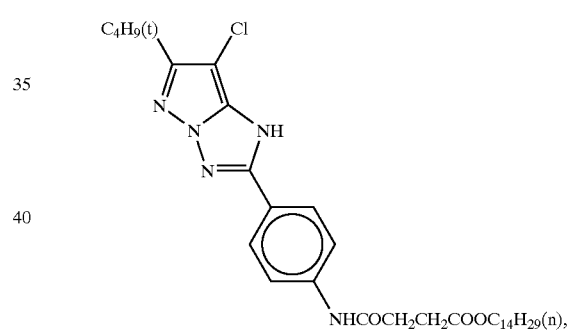

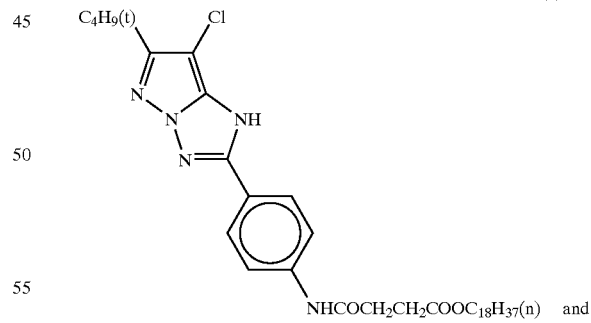

and

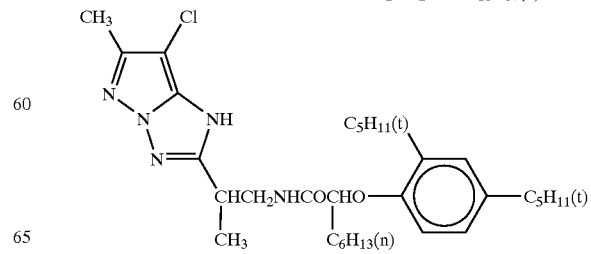

(ExC-A) Cyan Coupler:
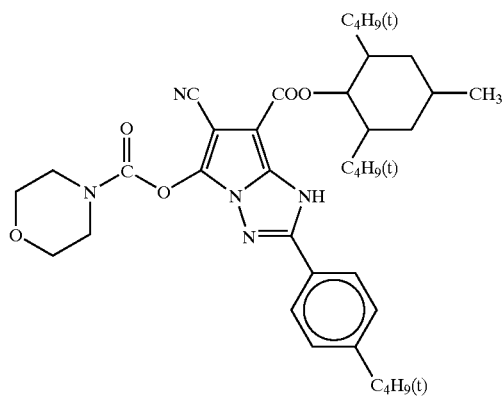
(ExC-B) Cyan Coupler:
50:25:25 (by mol) mixture of:
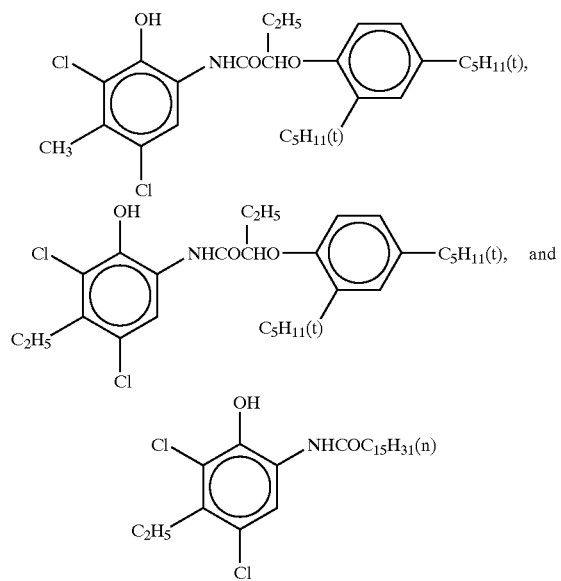
(Cpd-1) Color Image Stabilizer:
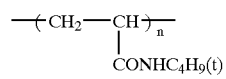
number-average molecular weight, 60,000
(Cpd-2) Color Image Stabilizer:
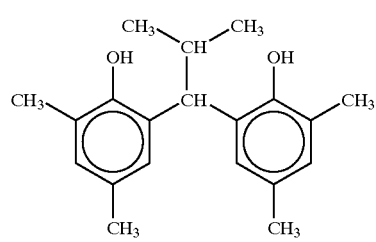
(Cpd-3) Color Image Stabilizer:
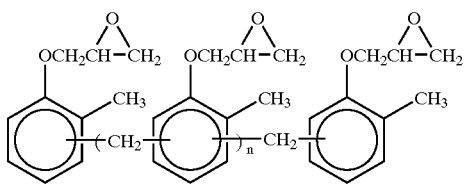
(Cpd-4) Color Image Stabilizer:
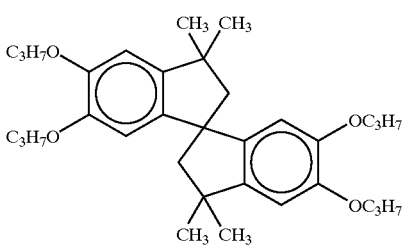
(Cpd-5) Color Image Stabilizer:
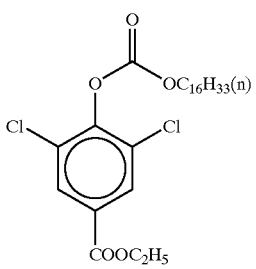
(Cpd-6) Color Image Stabilizer:
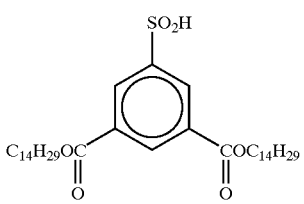
(Cpd-7) Color Image Stabilizer:
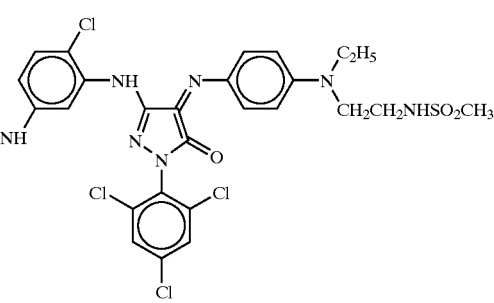

(Cpd-8) Color Image Stabilizer:
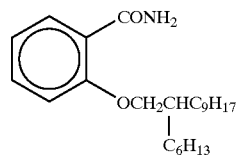
(Cpd-9) Color Image Stabilizer:
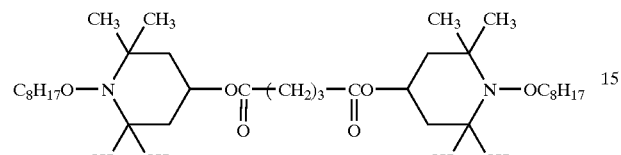
(Cpd-13) Surfactant:
7.3 (by mol) mixture of:
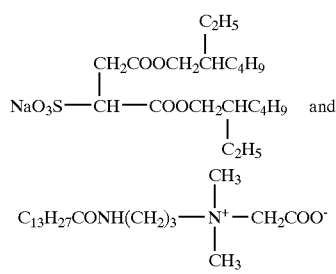
(Mid-1) Color-mixing Preventing Agent:
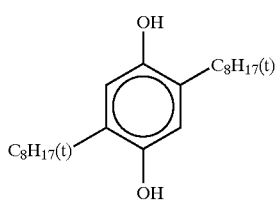
(Mid-2) Color-mixing Preventing Agent:
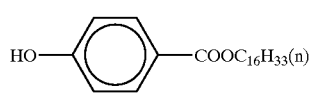
(Mid-3) Color-mixing Preventing Agent:
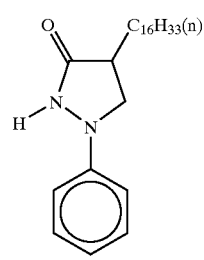
(Mid-4) Color-mixing Preventing Agent:
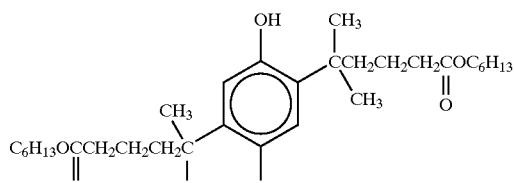
 (Solv-1)
 (Solv-3)
 (Solv-4)
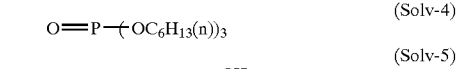 (Solv-5)
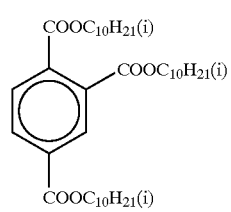 (Solv-7)
(UV-1) UV Absorbent:
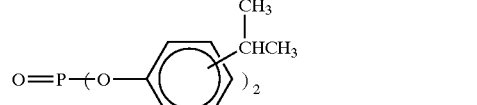
(UV-2) UV Absorbent:
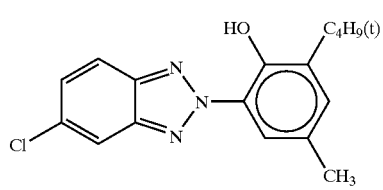
(UV-3) UV Absorbent:
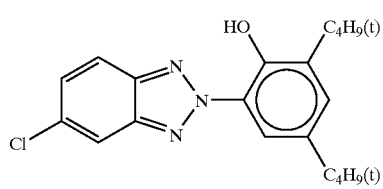

(UV-4) UV Absorbent:

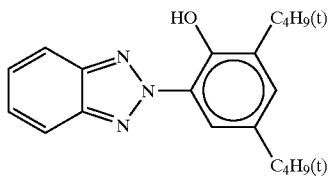

(UV-6) UV Absorbent:

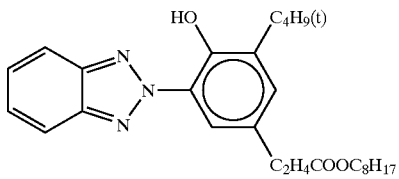

(UV-7) UV Absorbent:

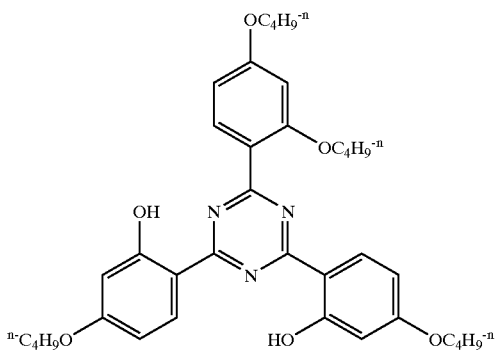

(UV-A): Mixture of UV-1/UV-2/UV-3/UV-4=4/2/2/3 (by weight)
(UV-C): Mixture of UV-2/UV-3/UV-6/UV-7=1/1/1/2 (by weight)

Coated samples 101 to 109 and 101A and 109A were fabricated in the manner as above.

(Exposure)

Using an apparatus for exposure mentioned below, the samples were exposed to three laser colors of B, G and R for three color separation gradation. The laser output was so corrected that every sample could receive the optimum color gradation from it.

On the other hand, the samples were stored at 60° C. and 80% RH for 90 hours, and then exposed and processed to evaluate their sensitivity, like the fresh samples. (This is referred to as the aged sensitivity (i.e., the sensitivity after storage).)

(Apparatus for Exposure)

In the exposure apparatus, the light source is so designed as to give 472 nm light from an excitation source of semiconductor laser GaAlAs (oscillation wavelength 808.5 nm) combined with an YAG solid laser (oscillation wavelength 946 nm) for wavelength conversion through SHG crystal of $LiNbO_3$ having a reversal domain structure; 532 nm light from an excitation source of semiconductor laser GaAlAs (oscillation wavelength 808.5 nm) combined with an $YVO_4$ solid laser (oscillation wavelength 1064 nm) for wavelength conversion through SHG crystal of $LiNbO_3$ having a reversal domain structure; and 680 nm from AlGaInP (oscillation wavelength 680 nm; Matsushita Densan's Type No. LN9R20). The light intensity of the three laser colors is modulated through AOM, and reflected on a polygonal mirror, the thus modulated three colors are scanned in order relative to the sample of color print paper moving in the direction perpendicular to the scanning direction. To prevent the light quantity fluctuation depending on the ambient temperature, the temperature of the semiconductor lasers is kept constant by the use of a Peltier device. The power of the scanning exposure is 600 dpi. Measured with a beam analyzer [1180GP by Beam Scan of USA], the diameter of each beam of B, G, R was 65 $\mu$m (this is a circular beam of which the difference between the diameter in the main scanning direction and the diameter in the side scanning direction is at most 1%).

(Development: Dry-to-dry Time, 55 Seconds)

The thus exposed samples were subjected to color development according to the process mentioned below. The processing solution used are mentioned below.

| Processing Step | Temperature | Time | Replenisher* | Tank Volume |
|---|---|---|---|---|
| Color Development | 45° C. | 15 seconds | 35 ml | 2 liters |
| Bliz | 40° C. | 15 seconds | 38 ml | 3 liter |
| Rinsing (1) | 40° C. | 5 seconds | — | 1 liter |
| Rinsing (2) | 40° C. | 5 seconds | — | 1 liter |
| Rinsing (3) | 40° C. | 5 seconds | 90 ml | 1 liter |
| Drying | 80° C. | 10 seconds | — | — |

(The rinsing system is a three-bath countercurrent system from the rinse bath (3) to the rinse bath (1).)
*The amount of the replenisher is per $m^2$ of the photographic material.

In the above-mentioned process, the water used in the rinse bath (3) was led to a reverse osmosis module membrane under pressure, and the water having passed through the membrane was again led into the rinse bath (3) while that not having passed through the membrane was returned back to the rinse bath (2). For shortening the crossover time between the neighboring rinse tanks, a blade was disposed to connect the neighboring tanks, and the photographic material being processed was made to run on the blade. In every step, the photographic material being processed was sprayed with the circulating processing solution through a spray unit as in JP-A 8-314088. The amount of the processing solution sprayed on the photographic material was from 4 to 6 liters/min in every tank.

The composition of each processing solution is mentioned below.

| Color Developer | Tank Solution | Replenisher |
|---|---|---|
| Water | 700 ml | 700 ml |
| Sodium triisopropyl-naphthalene($\beta$)sulfonate | 0.1 g | 0.1 g |
| Ethylenediamine-tetraacetic acid | 3.0 g | 3.0 g |
| Disodium 1,2-dihydroxybenzene-4,6-disulfonate | 0.5 g | 0.5 g |
| Triethanolamine | 12.0 g | 12.0 g |
| Potassium chloride | 15.8 g | — |
| Potassium bromide | 0.04 g | — |
| Potassium carbonate | 27.0 g | 27.0 g |
| Sodium sulfite | 0.1 g | 0.1 g |
| Disodium N,N-bis(sulfonatoethyl) hydroxylamine | 18.0 g | 18.0 g |
| N-ethyl-N-($\beta$-methanesulfonamidoethyl)-3-methyl-4-aminoaniline | 8.0 g | 23.0 g |

-continued

| Color Developer | Tank Solution | Replenisher |
|---|---|---|
| sulfate | | |
| Sodium bis(2,4-disulfonatoethyl-1,3,5-triazin-6-yl)-diaminostilbene-2,2-disulfonate | 5.0 g | 6.0 g |
| Water to make | 1000 ml | 1000 ml |
| pH (25° C.) | 10.35 | 12.80 |

The blix solution was prepared by mixing the following two replenishers.

| Blix Solution | Tank Solution | Amount of Replenisher (the following two replenishers are totaled to be 38 ml per m² of the photographic material) |
|---|---|---|
| First Replenisher | 260 ml | 18 ml |
| Second Replenisher | 290 ml | 20 ml |
| Water to make | 1000 ml | |
| PH (25° C.) | 5.0 | |

The composition of the first and second replenishers is mentioned below.

| (First Replenisher) | |
|---|---|
| Water | 150 ml |
| Ethylenebisguanidine nitrate | 30 g |
| Ammonium sulfite monohydrate | 226 g |
| Ethylenediamine-tetraacetic acid | 7.5 g |
| Triazinylaminostilbene brightener (Showa Chemical's Hakkol WFA-SF) | 1.0 g |
| Ammonium bromide | 30 g |
| Ammonium thiosulfate (700 g/liter) | 340 ml |
| Water to make | 1000 ml |
| pH (25° C.) | 5.82 |

| (Second Replenisher) | |
|---|---|
| Water | 140 ml |
| Ethylenediamine-tetraacetic acid | 11.0 g |
| Ammonium ethylenediaminetetraacetato-iron (III) | 384 g |
| Acetic acid (50%) | 230 ml |
| Water to make | 1000 ml |
| pH (25° C.) | 3.35 |

(Rinsing Solution)

Ion-exchanged Water (Ca, Mg not more than 3 ppm each)

(Comparative Treatment)

For comparison, the rinsing time was shortened in Fuji Photo Film's Processor CP45-X (dry-to-dry time, 130 seconds).

In this, color development and blix treatment took 45 seconds each; and rinse (1) and rinse (2) took 20 seconds each.

Thus processed, the reflection density of each sample was measured with a Fuji Photo Film's densitometer, Model TCD. The sensitivity of each sample was derived from the exposure amount needed for giving a color density higher by 1.0 than the fog density of the sample. The blue sensitivity of sample No. 101 processed for 130 seconds is 100, and the blue sensitivity of the other samples is indicated in terms of the relative value of the standard blue sensitivity 100 of sample No. 101. The fog comprise the color formation from the developed coupler in the non-exposed area and the residual color of the sensitizing dye.

The results of the processed samples are shown in Table 1.

TABLE 1

| Coated Sample No. | Sensitizing Dye (amount added) ($\times 10^{-1}$ mol/mol Ag) | Processed for 130 seconds | | Processed for 130 seconds (dissolution after aging) | | Processed for 55 seconds | | Stored* | | Remarks |
|---|---|---|---|---|---|---|---|---|---|---|
| | | Blue Sensitivity | Fog | Blue Sensitivity | Fog | Blue Sensitivity | Fog | Blue Sensitivity | Fog | |
| 101/101A | II-3 (10.0) | 100 (standard) | 0.22 | 88 | 0.26 | 104 | 0.34 | 65 | 0.51 | Comparison |
| 102/102A | s-1 (10.0) | 125 | 0.43 | 105 | 0.51 | 132 | 0.81 | 70 | 0.71 | " |
| 103/103A | II-3 (6.0), s-1 (4.0) | 111 | 0.30 | 95 | 0.35 | 115 | 0.51 | 67 | 0.62 | " |
| 104/104A | (I-1) (10.0) | 126 | 0.25 | 112 | 0.28 | 131 | 0.36 | 70 | 0.65 | " |
| 105/105A | II-3 (6.0), (I-1) (4.0) | 208 | 0.08 | 206 | 0.10 | 210 | 0.15 | 203 | 0.14 | Invention |
| 106/106A | (I-3) (10.0) | 126 | 0.24 | 112 | 0.26 | 131 | 0.35 | 71 | 0.62 | Comparison |
| 107/107A | II-3(6.0), (I-3)(4.0) | 210 | 0.06 | 209 | 0.07 | 211 | 0.10 | 207 | 0.10 | Invention |
| 108/108A | (I-8) (10.0) | 126 | 0.23 | 114 | 0.24 | 130 | 0.33 | 72 | 0.60 | Comparison |

TABLE 1-continued

| Coated Sample No. | Sensitizing Dye (amount added) ($\times 10^{-1}$ mol/mol Ag) | Processed for 130 seconds Blue Sensitivity | Fog | Processed for 130 seconds (dissolution after aging) Blue Sensitivity | Fog | Processed for 55 seconds Blue Sensitivity | Fog | Stored* Blue Sensitivity | Fog | Remarks |
|---|---|---|---|---|---|---|---|---|---|---|
| 109/ 109A | II-3 (6.0), (I-9) (4.0) | 212 | 0.05 | 211 | 0.06 | 213 | 0.08 | 210 | 0.08 | Invention |

Stored*: The samples were stored at 60° C. and 80% RH for 90 hours, and then exposed and processed (for 130 seconds), and their blue sensitivity and fog are shown.

S-1:

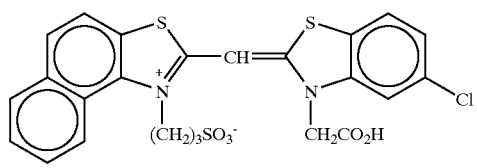

As is apparent from the results of Table 1, the sensitivity of the samples that contain any one of the compound of formula (Ia), (Ib) or (Ic), or the compound of formula (II), or S-1 (this falls within the scope of formula (II)) alone is low, and, in addition, the sensitivity of the samples greatly lowered and the fog thereof greatly increased after the emulsions for the samples were aged and the silver halide grains therein dissolved to aggregate. Moreover, the fog of the samples (caused by residual color of sensitizing dye) increased, and it is more serious in rapid processing. Further, the sensitivity reduction in the stored samples was also noticeable. This problem could not be solved by the combination of (II) and (S-1).

On the other hand, the samples of the present invention that contain the specific combination of sensitizing dyes of the present invention attained significant sensitivity increase. In addition, since their dissolution-resistant storage stability is good, their photographic properties did not worsen even after they were stored. Moreover, the residual color in the processed samples is reduced, and the sensitivity of the stored samples did not lower.

As concretely demonstrated in the above, we, the present inventors have found the following: Only when the photographic emulsion for photographic materials contains a combination of specific sensitizing dyes as defined herein, its sensitivity is specifically high and the residual color to be caused by the sensitizing dyes is negligible. Even when the silver halide grains in the emulsion have dissolved while stored, the sensitivity of the emulsion does not lower and the fog of the photographic material that comprises the emulsion does not increase. Further, even after the emulsion has been stored, its sensitivity does not lower.

Example 2

(Fabrication of Sample 201)

According to the method for forming sample 101 in Example 1 in JP-A11-119365, a multi-layered color photographic material was fabricated. This is sample 201.

The photosensitive emulsions used in sample 201 are shown in Table 2 below.

TABLE 2

(Silver Halide Grains and Sensitizing Dyes in Emulsions)

| Emulsion | Equivalent Sphere Diameter ($\mu$m) | Equivalent Circle Diameter Variation coefficient (%) | Mean Aspect Ratio of All Grains | Iodide Content (mol %) | Sensitizing Dye Compound | amount added ($\times 10^{-1}$ mol/ mol Ag) | Sensitizing Dye Compound | amount added ($\times 10^{-1}$ mol/ mol Ag) | Sensitizing Dye Compound | amount added ($\times 10^{-1}$ mol/ mol Ag) |
|---|---|---|---|---|---|---|---|---|---|---|
| A | 0.20 | 16 | 1.6 | 4.0 | II-23 | 8.1 | | | II-26 | 0.3 |
| B | 0.25 | 15 | 3.0 | 4.0 | II-23 | 8.9 | | | II-26 | 0.3 |
| C | 0.22 | 14 | 2.5 | 4.0 | II-23 | 8.8 | s-2 | 0.2 | II-26 | 0.2 |
| D | 0.35 | 10 | 3.6 | 4.0 | II-23 | 9.8 | s-2 | 0.3 | II-26 | 0.2 |
| E | 0.49 | 16 | 5.0 | 2.0 | II-23 | 6.7 | s-2 | 0.5 | II-26 | 0.2 |
| F | 0.15 | 15 | 1.0 | 3.5 | II-13 | 15.1 | II-20 | 1.5 | | |
| G | 0.23 | 14 | 1.9 | 3.5 | II-13 | 10.4 | II-20 | 2.0 | | |
| H | 0.32 | 11 | 2.4 | 3.5 | II-13 | 7.5 | II-20 | 1.4 | | |
| I | 0.28 | 11 | 4.5 | 3.3 | II-13 | 7.7 | II-20 | 1.4 | | |
| J | 0.40 | 16 | 4.0 | 3.3 | II-13 | 7.2 | II-20 | 1.4 | | |
| K | 0.59 | 20 | 5.9 | 2.8 | II-13 | 6.4 | II-20 | 1.2 | | |
| L | 0.24 | 14 | 3.4 | 4.6 | s-3 | 6.5 | s-4 | 2.5 | | |
| M | 0.30 | 10 | 3.0 | 4.6 | s-3 | 6.2 | s-4 | 2.0 | | |

TABLE 2-continued (Silver Halide Grains and Sensitizing Dyes in Emulsions)

| Emulsion | Equivalent Sphere Diameter ($\mu$m) | Equivalent Circle Diameter Variation coefficient (%) | Mean Aspect Ratio of All Grains | Iodide Content (mol %) | Compound | Sensitizing Dye amount added ($\times 10^{-1}$ mol/mol Ag) | Compound | Sensitizing Dye amount added ($\times 10^{-1}$ mol/mol Ag) | Compound | Sensitizing Dye amount added ($\times 10^{-1}$ mol/mol Ag) |
|---|---|---|---|---|---|---|---|---|---|---|
| N | 0.40 | 9 | 4.5 | 1.6 | s-3 | 5.6 | s-4 | 1.8 | | |
| O | 0.60 | 15 | 5.5 | 1.0 | s-3 | 4.0 | s-4 | 1.5 | | |
| P | 0.80 | 18 | 2.5 | 1.0 | s-3 | 3.4 | s-4 | 1.1 | | |

Note 1)
The emulsions are silver iodobromide emulsions all chemically sensitized with gold, sulfur and selenium.
Note 2)
The sensitizing dye is added to the emulsions before chemical sensitization.
Note 3)
The emulsions contain any of compounds F-5, F-7, F-8, F-9, F-10, F-11, F-12, F-13 or F-14 described in JP-A11-119365.
Note 4)
In the emulsions A, B, I and J, the grains are three-layered tabular grains of which the main face is (100); and the grains in the other emulsions are three-layered tabular grains of which the main face is {111}.
Note 5)
The emulsions A, B, E, F, I and P are so designed that their inner sensitivity is higher than their surface sensitivity.
Note 6)
In the emulsions E, I and P, silver chloride is epitaxially grown on the grains after chemical sensitization.
Note 7)
The grains except those in the emulsions A, E and F each have at least 50 dislocation lines/grain, when observed with a transmission electronic microscope.
(Formation and Evaluation of Samples 200, 202 to 204)
Samples 202 to 204 are the same as sample 201 except that the sensitizing dye S-2 in the emulsions C to E are replaced by the same molar amount of a different sensitizing dye as in Table 3. Sample 200 is the same as sample 201 except that all the sensitizing dyes in the emulsions A to E are omitted, and this is a dye blank sample. These samples were exposed for 1/100 seconds to white light through a gray wedge, for which the exposure amount was 20 CMS. The thus exposed samples were processed according to the process mentioned below for sensitometry. On the other hand, the samples were stored at 60° C. and 80% RH for 120 hours, and exposed and processed in the same manner as herein also for sensitometry. (The sensitivity is referred to as aged sensitivity.)
The magenta to cyan stain density of the color blank sample 200 was detracted from the magenta to cyan density of the'stains in each processed sample to determine the residual color in the processed samples. The stain density was measured with an X-RITE's densitometer, Status A.
In addition, the samples were exposed to a halogen lamp having a color temperature of 3200° K through an RMS pattern, and then processed according to the process mentioned below. Thus processed, the samples were analyzed with a micro-densitometer (aperture diameter: 48 $\mu$m) to obtain the RMS value thereof.

(Process for Photographic Processing)

| Step | Time | Temperature | Tank Volume | Replenishment Amount |
|---|---|---|---|---|
| First Development | 6 min | 38° C. | 12 liters | 2200 ml/m² |
| First Rinsing | 2 min | 38° C. | 4 liters | 7500 ml/m² |
| Reversal | 2 min | 38° C. | 4 liters | 1100 ml/m² |
| Color Development | 6 min | 38° C. | 12 liters | 2200 ml/m² |
| Pre-bleaching | 2 min | 38° C. | 4 liters | 1100 ml/m² |
| Bleaching | 6 min | 38° C. | 2 liters | 220 ml/m² |
| Fixation | 4 min | 38° C. | 8 liters | 1100 ml/m² |
| Second Rinsing | 2 min | 38° C. | 8 liters | 7500 ml/m² |
| Final Rinsing | 1 min | 25° C. | 2 liters | 1100 ml/m² |

The composition of each processing solution is the same as in Example 1 in JP-A11-119365.

Table 3 below shows the data of sensitometry, residual color, graininess, and red sensitivity (i.e., sensitivity after storage). The relative red sensitivity is based on the relative exposure that gives a density higher by 1.0 than the minimum density of each sample. (The sensitivity of the sample 201 is 100, and this is the standard for the sensitivity of the other samples.) The RMS value is for the cyan image having a density of 0.7, and this is relative to the value 100 of the sample 201. (The samples having a smaller RMS value have better graininess.)

TABLE 3

| Coated Sample No. | Sensitizing Dye | Red Sensitivity | Residual Color | RMS Value (graininess) | Aged Sensitivity | Remarks |
|---|---|---|---|---|---|---|
| 200 | no | — | 0 (standard) | — | — | Blank |
| 201 | S-2 | 100 (standard) | 0.090 | 100 (standard) | 65 | Comparison |
| 202 | I-29 | 193 | 0.024 | 60 | 175 | Invention |
| 203 | I-31 | 195 | 0.022 | 58 | 180 | Invention |
| 204 | I-34 | 194 | 0.023 | 59 | 177 | Invention | s-2:
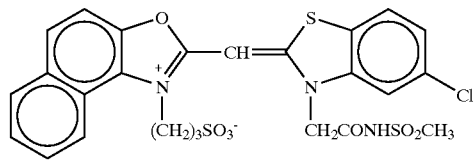

s-3:
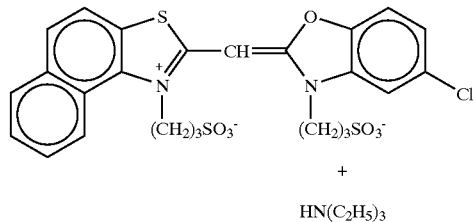

s-4:
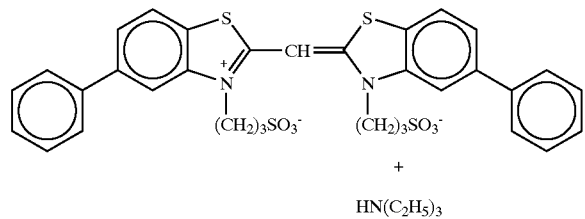

As is apparent from the results of Table 3, the sensitivity of the sample that contain the compound of formula (II) alone (S-2 falls within the scope of formula (II)) is low, and, in addition, the graininess of the sample is also low probably because of the aggregation of the silver halide grains in the emulsions used for the sample. Further, the sensitivity of the sample greatly lowered after stored. On the other hand, the samples of the present invention that contain both the dye of formula (Ia), (Ib) or (Ic) and the dye of formula (II) are all good in that their sensitivity is high and their graininess is good. In addition, little residual color caused by the sensitizing dyes was seen in these samples. Further, even after stored, the sensitivity of these samples did not lower.

On the other hand, the present inventors have found the following: Only when the photographic emulsion contains a combination of specific sensitizing dyes as defined herein, the photographic material that comprises the emulsion is good as its sensitivity is high and its graininess is good, and little residual color caused by the sensitizing dyes therein is seen in the processed photographic material. In addition, even after the emulsion has been stored, its sensitivity does not lower.

Example 3

(Fabrication of Sample 301)

According to the method for forming sample 101 in Example 1 in JP-A11-305396, a multi-layered color photographic material was fabricated. This is sample 301.

The AgI content, the grain size and the surface iodide content of the emulsions used in sample 301 are shown in Table 4 below.

TABLE 4

(Emulsions Use)

| Emulsion | Mean Iodide Content (mol %) | Intergranular Distribution Variation coefficient (%) | Mean Grain Size (equivalent sphere diameter, μm) | Equivalent Sphere Diameter Variation coefficient (%) | Projected Area Diameter (equivalent circle diameter, μm) | Ratio of Diameter/ Thickness | Surface Iodide Content (mol %) | Grain Shape |
|---|---|---|---|---|---|---|---|---|
| A | 3.9 | 20 | 0.37 | 19 | 0.40 | 2.7 | 2.3 | tabular grains |
| B | 5.1 | 17 | 0.52 | 21 | 0.67 | 5.2 | 3.5 | tabular grains |
| C | 7.0 | 18 | 0.86 | 22 | 1.27 | 5.9 | 5.2 | tabular grains |
| D | 4.2 | 17 | 1.00 | 18 | 1.53 | 6.5 | 2.8 | tabular grains |
| E | 7.2 | 22 | 0.87 | 22 | 1.27 | 5.7 | 5.3 | tabular grains |
| F | 2.6 | 18 | 0.28 | 19 | 0.28 | 1.3 | 1.7 | tabular grains |
| G | 4.0 | 17 | 0.43 | 19 | 0.58 | 3.3 | 2.3 | tabular grains |
| H | 5.3 | 18 | 0.52 | 17 | 0.79 | 6.5 | 4.7 | tabular grains |
| I | 5.5 | 16 | 0.73 | 15 | 1.03 | 5.5 | 3.1 | tabular grains |
| J | 7.2 | 19 | 0.93 | 18 | 1.45 | 5.5 | 5.4 | tabular grains |
| K | 1.7 | 18 | 0.40 | 16 | 0.52 | 6.0 | 2.1 | tabular grains |
| L | 8.7 | 22 | 0.64 | 18 | 0.86 | 6.3 | 5.8 | tabular grains |
| M | 7.0 | 20 | 0.51 | 19 | 0.82 | 5.0 | 4.9 | tabular grains |
| N | 6.5 | 22 | 1.07 | 24 | 1.52 | 7.3 | 3.2 | tabular grains |
| O | 1.0 | — | 0.07 | — | 0.07 | 1.0 | — | uniform structure |
| P | 0.9 | — | 0.07 | — | 0.07 | 1.0 | — | uniform structure |

In Table 4;

(1) the emulsions L to O are subjected to reduction sensitization with thiourea dioxide and thiosulfonic acid while the grains are formed, according to the Examples in JP-A2-191938;

(2) the emulsions A to O are subjected to gold sensitization, sulfur sensitization and selenium sensitization in the presence of the color sensitizing dyes and sodium thiocyanate in every photosensitive layer, according to the Examples in JP-A3-237450;

(3) low-molecular gelatin is used in forming the tabular grains, according to the Examples in JP-A 1-158426; and (4) the tabular grains are seen to have dislocation lines through observation with a high-pressure electronic microscope, as in JP-A 3-237450.

(Fabrication of Samples 302 and 303)

Samples 302 and 303 were fabricated in the same manner as that for fabricating sample 301, except that the sensitizing dyes in the tenth and eleventh layers were changed as in Table 5 below.

(Fabrication of Samples 304 to 306)

Samples 304 to 306 were fabricated in the same manner as that for fabricating samples 301 to 303, respectively, except that the coating solutions for the tenth and eleventh layers were stored with stirring for 12 hours after their preparation and then used in fabricating the samples.

The samples as above were tested for the sensitivity and the fog thereof and for the influence of emulsion dissolution on their photographic properties, according to the methods mentioned below. In addition, the samples were stored at 60° C. and 80% RH for 120 hours, then exposed and processed in the same manner as herein, and evaluated for the sensitivity also in the same manner as herein. (The sensitivity is aged sensitivity.)

Concretely, the samples were exposed for 1/100 seconds for sensitivity at a color temperature of 4800° K, through a continuous wedge and a Fuji Photo Film's gelatin filter, SC-50, and then subjected to color development according to the process mentioned below.

(Process of Color Development)

| Step | Processing Time | Processing Temperature |
|---|---|---|
| Color Development | 3 min 15 sec | 38° C. |
| Bleaching | 3 min 00 sec | 38° C. |

-continued

| Step | Processing Time | Processing Temperature |
|---|---|---|
| Rinsing | 30 sec | 24° C. |
| Fixation | 3 min 00 sec | 38° C. |
| Rinsing (1) | 30 sec | 24° C. |
| Rinsing (2) | 30 sec | 24° C. |
| Stabilization | 30 sec | 38° C. |
| Drying | 4 min 20 sec | 55° C. |

The composition of each processing solution is the same as that in Example 1 in JP-A 11-305396.

Thus the processed samples 301 to 306 were analyzed for the magenta density.

The sensitivity of each s was derived from the exposure amount needed for giving a color density higher by 0.2 than the fog density of the sample, precisely, the sensitivity is indicated by the reciprocal of the exposure amount needed for it. Thus calculated, the sensitivity of sample 301 is 100, and that of the other samples is a relative value based on the sensitivity 100 of sample 301. The fog comprises the color from the developed coupler in the non-exposed area and the residual color of the sensitizing dye. The results of the processed samples are shown in Table 1.

TABLE 5

| Sample | Dyes in 10th and 11th Layers (amount, x $10^{-4}$ mol/mol Ag) | | | Green Sensitivity (relative value) | Magenta Fog | Aged Sensitivity | Remarks |
|---|---|---|---|---|---|---|---|
| 301 | II-20 (0.53) | s-5 (1.5) | II-13 (6.3) | 100 (standard) | 0.098 | 61 | Comparison |
| 304 (emulsion dissolved after aging) | | | | 84 | 0.130 | — | |
| 302 | II-20 (0.53) | I-38 (1.5) | II-13 (6.3) | 145 | 0.034 | 129 | Invention |
| 305 (emulsion dissolved after aging) | | | | 142 | 0.038 | | |
| 303 | II-20 (0.53) | I-40 (1.5) | II-13 (6.3) | 151 | 0.032 | 141 | Invention |
| 306 (emulsion dissolved after aging) | | | | 149 | 0.034 | | | s-5:

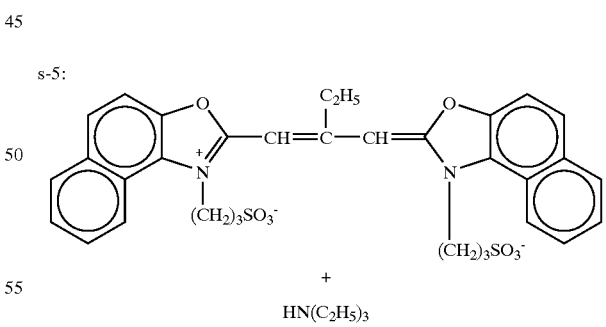

As is apparent from the results of Table 5, the silver halide photographic material in which the emulsion contains the compound of formula (Ia), (Ib) or (Ic) in place of the comparative compound S-5 (this falls within the scope of formula (II)), along with the compound of formula (II) has increased sensitivity and has little residual color after processed. In addition, even after the emulsion for the photographic material of the present invention has been dissolved after stored, the material still keeps high sensitivity and is fogged little. This will be because the silver halide grains in the emulsion are prevented from aggregating even after stored. Moreover, the sensitivity of the photographic material does not lower even after stored.

As concretely demonstrated in the above, we, the present inventors have found the following: Only when the photographic emulsion contains a combination of specific sensitizing dyes as defined herein, the photographic material that comprises the emulsion has the specific advantages of high sensitivity and little residual color after processed. In addition, even after the emulsion has been stored, it dissolves little, therefore not lowering the sensitivity and not increasing the fog. Specifically, the sensitivity of the emulsion lowers little even after stored.

Example 4

Preparation of Octahedral Silver Bromide emulsion (Emulsion A), and Tabular Silver Bromide Emulsions (Emulsion B, Emulsion C, Emulsion D, and Emulsion E):

1000 ml of water, 25 g of deionized ossein gelatin, 15 ml of aqueous 50% $NH_4NO_3$ solution and 7.5 ml of aqueous 25% $NH_3$ solution were put into a reactor, and well stirred at 50° C. With that, 750 ml of aqueous 1 N silver nitrate solution and 1 mol/liter of aqueous potassium bromide were added thereto within 50 minutes, and the silver potential of the reaction system was kept at −40 mV. Thus formed, the resulting silver bromide grains were octahedral, and have a sphere-corresponding diameter of 0.846+/−0.036 μm. The emulsion was cooled, and a copolymer of isobutene and monosodium maleate that serves as a coagulant was added thereto. This was then washed with water through flocculation and then de-salted. Next, 95 g of deionized ossein gelatin and 430 ml of water were added to it, and this was controlled to have a pH of 6.5 and a pAg of 8.3 at 50° C. Next, potassium thiocyanate, chloroauric acid and sodium thiosulfate were added to it so as to make it have the optimum sensitivity, and this was then ripened at 55° C. for 50 minutes. This is emulsion A.

6.4 g of potassium bromide and 6.2 g of low-molecular gelatin having a mean molecular weight of not larger than 15,000 were dissolved in 1.2 liters of water. While this was kept at 30° C., 8.1 ml of aqueous 16.4% silver nitrate solution and 7.2 ml of aqueous 23.5% potassium bromide solution were added thereto in the double-jet method that takes 10 seconds. Next, aqueous 11.7% gelatin solution was further added thereto, and then this was heated up to 75° C. and ripened for 40 minutes. With that, 370 ml of aqueous 3.2% silver nitrate solution and aqueous 20% potassium bromide solution were added to it while its silver potential was kept at −20 mV within 10 minutes. Then, this was physically ripened for 1 minutes and thereafter cooled to 35° C. The process gave a mono-dispersed, pure silver bromide tabular emulsion (specific gravity, 1.15) having a mean protected area diameter of 2.32 μm, a thickness of 0.09 μm (aspect ratio, 25.8) and a diameter variation coefficient of 15.1%. Soluble salts were removed from the emulsion through coagulation flocculation. Then, the emulsion was again kept at 40° C., and 45.6 g of gelatin, 10 ml of aqueous 1 mol/liter sodium hydroxide solution, 167 ml of water, and 1.66 ml of 35% phenoxyethanol were added to it, which was then controlled to have a pAg of 8.3 and a pH of 6.20. To the emulsion, added were potassium thiocyanate, chloroauric acid and sodium thiosulfate so as to make the emulsion have the optimum sensitivity, and the emulsion was ripened at 55° C. for 50 minutes. This is emulsion B.

On the other hand, the emulsion was chemically sensitized with potassium thiocyanate, chloroauric acid, pentafluorophenyl-diphenylphophine selenide and sodium thiosulfate, in place of potassium thiocyanate, chloroauric acid and sodium thiosulfate. This is emulsion C.

In the process of preparing the emulsion B, the silver potential was specifically controlled so as to produce a mono-dispersed, pure silver bromide tabular emulsion (specific gravity, 1.16) having a mean projected area diameter of 1.56 μm, a thickness of 0.625 μm (aspect ratio, 2.5), and a diameter variation coefficient of 15.1%. This was then processed and chemically sensitized in the same manner as herein. This is emulsion D.

In the process of preparing the emulsion B, the silver potential was specifically controlled so as to produce a mono-dispersed, pure silver bromide tabular emulsion (specific gravity, 1.16) having a mean projected area diameter of 2.12 μm, a thickness of 0.341 μm (aspect ratio, 6.2), and a diameter variation coefficient of 15.0%. This was then processed and chemically sensitized in the same manner as herein. This is emulsion E.

In the process of preparing the emulsion B, the silver potential was specifically controlled so as to produce a mono-dispersed, pure silver bromide tabular emulsion (specific gravity, 1.15) having a mean projected area diameter of 2.36 μm, a thickness of 0.274 μm (aspect ratio, 8.6), and a diameter variation coefficient of 15.1%. This was then processed and chemically sensitized in the same manner as herein. This is emulsion F.

While the emulsions produced in the manner as above were kept at 50° C., a dye shown in Table 6 was added thereto and stirred for 60 minutes.

In addition, a gelatin hardener and a coating aid were added to the resulting emulsions, and the emulsion was applied onto a cellulose acetate film support in a mode of double coating with a gelatin-protective layer and in such a controlled manner that the amount of silver in the emulsion layer formed could be 3.0 g-Ag/m². Thus coated, the film samples (fresh samples) were exposed to a tungsten lamp (color temperature 2845° K) via a continuous wedge color filter for 1 second. The color filter is a Fuji Gelatin Filter SC-40 (by Fuji Photo Film) for minus blue exposure of which the dye side is excited, and this blocks light not longer than 400 nm. Thus exposed via the color filter, the samples were developed with a surface developer MAA-1 mentioned below, at 20° C. for 10 minutes. Next, these were fixed, then rinsed and dried according to the process mentioned below. On the other hand, the fresh film samples were stored at 60° C. and 80% RH for 60 hours (aged samples), and these were exposed and processed in the same manner as herein.

Surface Developer MRA-1:

| | |
|---|---|
| Methol | 2.5 g |
| L-ascorbic acid | 10 g |
| Nabox (by Fuji Photo Film) | 35 g |
| Potassium bromide | 1 g |
| Water to make | 1 liter |
| pH | 9.8 |

Formulation of Fixing Solution:

| | |
|---|---|
| Ammonium thiosulfate | 170 g |
| Sodium sulfite (anhydride) | 15 g |
| Boric acid | 7 g |
| Glacial acetic acid | 15 ml |
| Potassium alum | 20 g |
| Ethylenediamine-tetraacetic acid | 0.1 g |
| Tartaric acid | 3.5 g |
| Water to make | 1 liter |

Thus developed and processed in the manner as above, the film samples were analyzed with a Fuji automatic densitometer to measure the optical density thereof. The sensitivity is indicated by the reciprocal of the quantity of light needed for giving an optical density of (fog+0.2). The sensitivity of each fresh sample is 100, and the sensitivity of the aged samples is represented by a relative value based on the sensitivity 100 of the fresh samples.

TABLE 6

| Sample | Dye | Emulsion | Aged Sensitivity | Remarks |
|---|---|---|---|---|
| 61 | II-24 | No | A | 73 | Comparison |
| 62 | no | S-6 | " | 72 | " |
| 63 | no | I-30 | " | 71 | " |
| 64 | II-24 | S-6 | " | 71 | " |
| 65 | II-24 | I-30 | " | 80 | Invention |
| 66 | II-24 | No | D | 70 | Comparison |
| 67 | no | S-6 | " | 70 | " |
| 68 | no | I-30 | " | 70 | " |
| 69 | II-24 | S-6 | " | 69 | " |
| 70 | II-24 | I-30 | " | 84 | Invention |
| 71 | II-24 | No | E | 69 | Comparison |
| 72 | no | S-6 | " | 69 | " |
| 73 | no | I-30 | " | 70 | " |
| 74 | II-24 | S-6 | " | 68 | " |
| 75 | II-24 | I-30 | " | 85 | Invention |
| 76 | II-24 | No | F | 66 | Comparison |
| 77 | no | S-6 | " | 65 | " |
| 78 | no | I-30 | " | 66 | " |
| 79 | II-24 | S-6 | " | 64 | " |
| 80 | II-24 | I-30 | " | 92 | Invention |
| 81 | II-24 | No | B | 64 | Comparison |
| 82 | no | S-6 | " | 64 | " |
| 83 | no | I-30 | " | 65 | " |
| 84 | II-24 | S-6 | " | 63 | " |
| 85 | II-24 | I-30 | " | 93 | Invention |
| 86 | II-24 | No | C | 63 | Comparison |
| 87 | no | S-6 | " | 62 | " |
| 88 | no | I-30 | " | 64 | " |
| 89 | II-24 | S-6 | " | 62 | " |
| 90 | II-24 | I-30 | " | 96 | Invention |
| 91 | II-24 | I-41 | " | 90 | " |
| 92 | II-24 | I-44 | " | 81 | " |

The overall amount of the dye added to the samples is as follows:

Samples 61 to 65: $2.1 \times 10^{-4}$ mol/mol Ag (in samples 64 and 65, the dyes are in a ratio of 1:1).

Samples 66 to 70: $3.3 \times 10^{-4}$ mol/mol Ag (in samples 69 and 70, the dyes are in a ratio of 1:1).

Samples 71 to 75: $4.3 \times 10^{-4}$ mol/mol Ag (in samples 74 and 75, the dyes are in a ratio of 1:1).

Samples 76 to 80: $5.2 \times 10^{-4}$ mol/mol Ag (in samples 79 and 80, the dyes are in a ratio of 1:1).

Samples 81 to 92: $9.2 \times 10^{-4}$ mol/mol Ag (in samples 84, 85, 90, 91 and 92, the dyes are in a ratio of 1:1).

s-6:

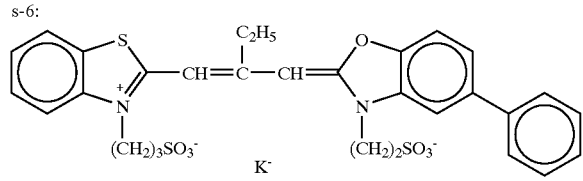

*S-6 is within the scope of formula (II).

As is apparent from the results of Table 6, the sensitivity of the samples of the present invention in which specific dyes are combined is higher than that of other comparative samples.

In addition, it is understood that the sensitivity reduction of the aged comparative samples that contain emulsion A of octahedral grains is lower than that of the aged comparative samples that contain any of emulsion D, E, F or B of tabular grains, and the sensitivity reduction is greater in the samples in which the aspect ratio of the grains is higher (especially the aspect ratio of the grains is 8 or more).

On the other hand, surprisingly, the sensitivity reduction in the aged samples of the present invention in which specific dyes are combined and which contain emulsion A of octahedral grains is lower than that in the other aged samples which contain any of emulsion D, E, F or B of tabular grains, and the sensitivity reduction is lower in the samples in which the aspect ratio of the grains is higher (especially the aspect ratio of the grains is 8 or more).

When emulsion B is compared with emulsion C, it is understood that the shelf life of the emulsion C sensitized with selenium is significantly better.

EFFECT OF THE INVENTTION

The constitution of the present invention realizes a silver halide photographic material having the advantages of good dissolution-storage stability, high sensitivity, good graininess and rapid processability. After processed, the silver halide photographic material of the present invention has little residual color caused by sensitizing dyes added thereto. Even after stored, the sensitivity of the photographic material lowers little.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising a support having thereon at least one silver halide photographic emulsion layer, wherein the emulsion layer contains at least one compound selected from the group consisting of compounds represented by formulae (Ia), (Ib) and (Ic) and at least one compound represented by formula (II):

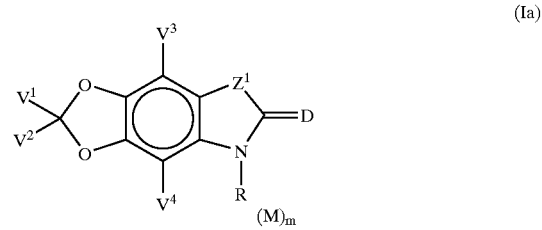

(Ic)

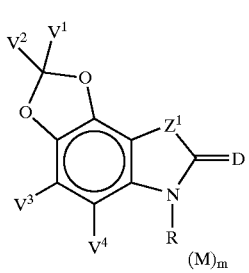

wherein $Z^1$ represents a sulfur, oxygen, selenium, tellurium, nitrogen or carbon atom; R represents a substituted or unsubstituted alkyl, aryl or heterocyclic group; D represents a group necessary for forming the methine dye; $V^1$, $V^2$, $V^3$ and $V^4$ each represent a hydrogen atom or a monovalent substituent; M represents a charge-balancing counter ion; and m indicates a number of 0 or more necessary for neutralizing the charge of the molecule;

(II)

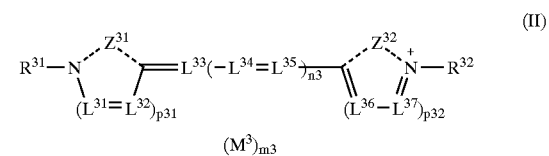

wherein $Z^{31}$ and $Z^{32}$ each represent an atomic group necessary for forming the nitrogen-containing hetero-ring that may be optionally condensed with any other ring and may be optionally substituted; $R^{31}$ and $R^{32}$ each represent an alkyl, aryl or heterocyclic group; $L^{31}$, $L^{32}$, $L^{33}$, $L^{34}$, $L^{35}$, $L^{36}$ and $L^{37}$ each represent a methine group; $p^{31}$ and $p^{32}$ each indicate 0 or 1; $n^3$ indicates 0, 1, 2, 3 or 4; $M^3$ represents a charge-balancing counter ion; $m^3$ indicates a number of 0 or more necessary for neutralizing the charge of the molecule; but the compound represented by formula (II) does not include the compounds of formulae (Ia), (Ib) and (Ic).

2. The silver halide photographic material as claimed in claim 1, wherein D in formulae (Ia), (Ib) and (Ic) is $D^1$ represented by the following formula:

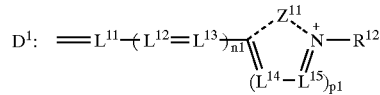

wherein $R^{12}$ represents an alkyl, aryl or heterocyclic group; $Z^{11}$ represents an atomic group necessary for forming the nitrogen-containing hetero-ring that may be optionally condensed with any other ring and may be optionally substituted; $L^{11}$, $L^{12}$, $L^{13}$, $L^{14}$ and $L^{15}$ each represent a methine group; $p^1$ indicates 0 or 1; and $n^1$ indicates 0, 1, 2, 3 or 4.

3. The silver halide photographic material as claimed in claim 1, wherein D in formulae (Ia), (Ib) and (Ic) is a group necessary for forming a merocyanine dye or a cyanine dye.

4. The silver halide photographic material as claimed in claim 1, wherein D in formulae (Ia), (Ib) and (Ic) is a group necessary for forming a cyanine dye.

5. The silver halide photographic material as claimed in claim 1, wherein D in formulae (Ia), (Ib) and Ic) is $D^2$ represented by the following formula:

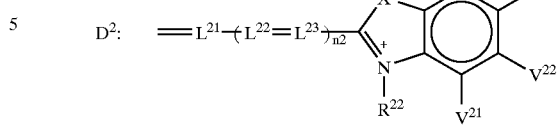

wherein $D^2$, $R^{22}$ represents an alkyl, aryl or heterocyclic group; $X^{22}$ represents a sulfur, oxygen, selenium, tellurium, nitrogen or carbon atom; $V^{21}$, $V^{22}$, $V^{23}$ and $V^{24}$ each represent a hydrogen atom or a substituent, provided that the two adjacent substituents do not bond to each other to form a saturated or unsaturated condensed ring; $L^{21}$, $L^{22}$ and $L^{23}$ each represent a methine group; and $n^2$ indicates 0, 1, 2, 3 or 4.

6. The silver halide photographic material as claimed in claim 1, wherein R in formulae (Ia), (Ib) and (Ic) is an alkyl group substituted with an acid group.

7. The silver halide photographic material as claimed in claim 1, wherein the emulsion layer contains at least one compound of formula (Ia) or (Ib) and at least one compound of formula (II).

8. The silver halide photographic material as claimed in claim 1, wherein $V^1$, $V^2$, $V^3$ and $V^4$ in formulae (Ia), (Ib) and (Ic) are all hydrogen atoms.

9. The silver halide photographic material as claimed in claim 1, wherein the compounds of formula (II) are selected from the group consisting of compounds represented by formula (IIa):

(IIa)

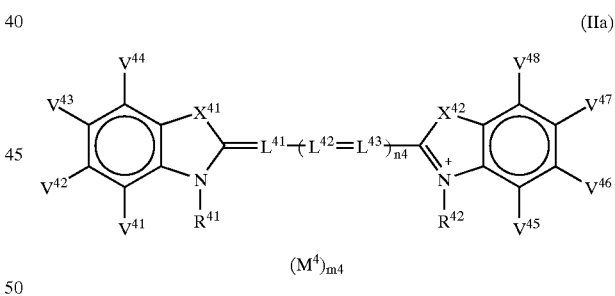

wherein $X^{41}$ and $X^{42}$ each represent a sulfur, oxygen, selenium, tellurium, nitrogen or carbon atom; $V^{41}$, $V^{42}$, $V^{43}$, $V^{44}$, $V^{45}$, $V^{46}$, $V^{47}$ and $V^{48}$ each represent a hydrogen atom or a substituent, provided that the two adjacent substituents may bond to each other to form a saturated or unsaturated condensed ring; $R^{41}$ and $R^{42}$ each represent an alkyl, aryl or heterocyclic group; $L^{41}$ $L^{42}$ and $L^{43}$ each represent a methine group; $n^4$ indicates 0, 1, 2, 3 or 4; $M^4$ represents a counter ion; and $m^4$ indicates a number of 0 or more necessary for neutralizing the charge of the molecule.

10. The silver halide photographic material as claimed in claim 1, wherein the compounds of formula (II) are selected from the group consisting of compounds represented by formula (III) and (IV):

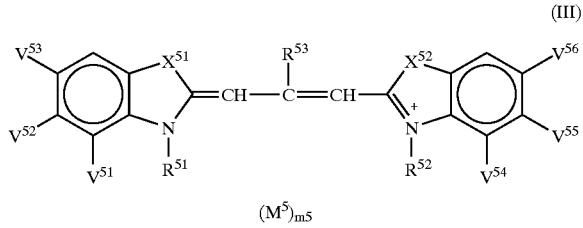

(III)

wherein $X^{51}$ and $X^{52}$ each represent an oxygen or sulfur atom; $V^{51}$, $V^{52}$, $V^{53}$, $V^{54}$, $V^{55}$ and $V^{56}$ each represent a hydrogen atom or a substituent, provided that the two adjacent substituents do not bond to each other to form a saturated or unsaturated condensed ring; $R^{51}$, $R^{52}$ and $R^{53}$ each represent an alkyl, aryl or heterocyclic group; $M^5$ represents a counter ion; and $m^5$ indicates a number of 0 or more necessary for neutralizing the charge of the molecule:

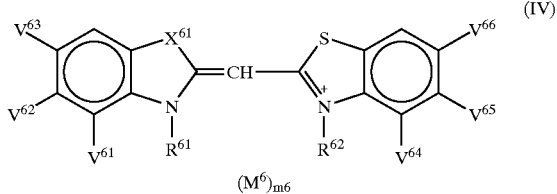

(IV)

wherein (IV), $X^{61}$ represents an oxygen or sulfur atom; $V^{61}$, $V^{62}$, $V^{63}$, $V^{64}$, $V^{65}$ and V66 each represent a hydrogen atom or a substituent, provided that the two adjacent substituents do not bond to each other to form a saturated or unsaturated condensed ring; $R^{61}$ and $R^{62}$ each represent an alkyl, aryl or heterocyclic group; $M^6$ represents a counter ion; and $m^6$ indicates a number of 0 or more necessary for neutralizing the charge of the molecule.

11. The silver halide photographic material as claimed in claim 1, wherein tabular grains having an aspect ratio of at least 2 account for at least 50% of the overall projected area of all the silver halide grains in the emulsion.

12. The silver halide photographic material as claimed in claim 1, wherein the emulsion for the emulsion layer is sensitized with selenium.

13. The silver halide photographic material as claimed in claim 1, wherein silver chloride accounts for at least 95 mol % of the emulsion for the emulsion layer.

14. The silver halide photographic material as claimed in claim 1, wherein silver bromide accounts for at least 95 mol % of the emulsion for the emulsion layer.

* * * * *